United States Patent
Fukagawa et al.

(10) Patent No.: US 7,651,743 B2
(45) Date of Patent: Jan. 26, 2010

(54) CELLULOSE ACYLATE FILM, MANUFACTURING METHOD OF CELLULOSE ACYLATE FILM, OPTICALLY COMPENSATORY SHEET, POLARIZING PLATE AND LIQUID CRYSTAL DISPLAY DEVICE

(75) Inventors: Nobutaka Fukagawa, Minami-Ashigara (JP); Mitsuo Yoshikane, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 606 days.

(21) Appl. No.: 11/445,222

(22) Filed: Jun. 2, 2006

(65) Prior Publication Data

US 2006/0286313 A1 Dec. 21, 2006

(30) Foreign Application Priority Data

Jun. 2, 2005 (JP) ............................. 2005-162612

(51) Int. Cl.
- G02F 1/1333 (2006.01)
- G02F 1/1335 (2006.01)
- G02F 1/13363 (2006.01)

(52) U.S. Cl. .................. 428/1.33; 428/1.54; 349/96; 349/117; 349/122; 264/208

(58) Field of Classification Search ............... 428/1.33, 428/1.54; 349/117–118, 122, 96; 264/208
See application file for complete search history.

(56) References Cited

U.S. PATENT DOCUMENTS 6,881,457 B2 * 4/2005 Tasaka et al. .............. 428/1.3

| | | | |
|---|---|---|---|
| 2003/0020208 A1 * | 1/2003 | Tasaka et al. | 264/217 |
| 2003/0170482 A1 * | 9/2003 | Murakami | 428/615 |
| 2003/0215608 A1 * | 11/2003 | Bermel | 428/141 |
| 2005/0106334 A1 * | 5/2005 | Kubo et al. | 428/1.31 |
| 2007/0146887 A1 * | 6/2007 | Ikeda et al. | 359/586 |

FOREIGN PATENT DOCUMENTS

| EP | 0 911 656 A2 | 4/1999 |
|---|---|---|
| JP | 2003-170492 | 6/2003 |

OTHER PUBLICATIONS

Gong, B. et. al (PNAS, vol. 99, No. 18, 2002, p. 11583-11588).*

* cited by examiner

Primary Examiner—David R Sample
Assistant Examiner—Sophie Hon
(74) Attorney, Agent, or Firm—Buchanan Ingersoll & Rooney PC

(57) ABSTRACT

A cellulose acylate film that has a crystallization index expressed by expression (A) as defined in the specification of from 0.70 to 1.02 and a modulus of elasticity in every arbitrary direction of an in-plane of the cellulose acylate film of from 3,800 MPa to 6,000 MPa; a manufacturing method of a cellulose acylate film comprising: casting a dope on a support; drying the dope on the support, so as to form a film; peeling the film from the support; and subjecting the film to a stretching treatment, wherein a crystallization index expressed by expression (A) of the film after peeling and before stretching is from 0.70 to 1.00; an optically compensatory sheet comprising the cellulose acylate film; and a polarizing plate and a liquid crystal display device using the optically compensatory sheet.

16 Claims, 1 Drawing Sheet

CELLULOSE ACYLATE FILM, MANUFACTURING METHOD OF CELLULOSE ACYLATE FILM, OPTICALLY COMPENSATORY SHEET, POLARIZING PLATE AND LIQUID CRYSTAL DISPLAY DEVICE

BACKGROUND OF THE INVENTION

1. Field of the Invention

The present invention relates to a cellulose acylate film, a manufacturing method of a cellulose acylate film by stretching, an optically compensatory sheet, a polarizing plate and a liquid crystal display device, specifically relates to a cellulose acylate film having excellent optical characteristics by the specification of a crystallization index and a modulus of elasticity of the in-plane of a film, a manufacturing method of a cellulose acylate film by stretching having excellent optical characteristics by the specification of a crystallization index before stretching, a cellulose acylate film manufactured by the manufacturing method, an optically compensatory sheet containing the cellulose acylate film, and a polarizing plate and a liquid crystal display device using the optically compensatory sheet.

2. Description of the Related Art

Cellulose acylate films have been widely used as the protective film of a polarizing plate for a liquid crystal display device for the reasons of having proper water permeability and high optical isotropy (a retardation value is low).

In recent years, a method of giving phase difference to a cellulose acylate film to provide an optical compensation function in addition to the function as the protective film of a polarizing plate is proposed. For example, a method of adding a triazine type compound high in flatness to cellulose acylate to thereby reveal retardation is disclosed in European Patent Application No. 911656. However, with the increase of the requirement for high grade display devices mainly for liquid crystal television use, higher precise retardation control is also required of optically compensatory films.

As one problem of the control of retardation of a cellulose acylate film, the control of the ratio of in-plane retardation Re and retardation in the thickness direction Rth is exemplified. In-plane retardation Re is generally given to a cellulose acylate film by stretching by means of a tenter that is high in productivity. However, according to this method, not only Re but also Rth increase, so that a desired Re/Rth ratio cannot be obtained. In contrast to this, a manufacturing method of a cellulose acylate film having characteristics of retardation of high Re/Rth ratio by controlling the residual amount of solvent at the time of beginning stretching to a specific range is disclosed in JP-A-2003-170492 (the term "JP-A" as used herein refers to an "unexamined published Japanese patent application"). However, although the Re/Rth ratio becomes high according to this method, revealing of Re is insufficient to make a display device in high contrast and high grade, and there is a problem that the contrast variation tends to occur. Therefore, the improvement has been required.

SUMMARY OF THE INVENTION

An object of the invention is to provide a cellulose acylate film having high retardation and also high Re/Rth ratio, particularly a stretched cellulose acylate film.

Another object of the invention is to provide a polarizing plate and a liquid crystal display device having high contrast and high display grade by the use of an optically compensatory sheet containing the cellulose acylate film.

As a result of earnest examination, the present inventors have been found that the hindrance of cellulose acylate orientation by crystallite can be excluded by the stretching treatment with a cellulose acylate film low in crystallite content (hereinafter referred to as a crystallization index) and having a specific range of a modulus of elasticity of the in-plane of the film or with a cellulose acylate film low in a crystallization index, and the orientation of the cellulose acylate can be conspicuously improved, so that the Re retardation of a cellulose acylate film can be sharply increased.

That is, the objects of the invention are achieved by the following means.

(1) A cellulose acylate film that has a crystallization index expressed by expression (A) of from 0.70 to 1.02 and a modulus of elasticity in every arbitrary direction of an in-plane of the cellulose acylate film of from 3,800 MPa to 6,000 MPa.

Crystallization index=(X-ray diffraction intensity at 2θ of 27°)/(X-ray diffraction intensity at 2θ of 25°)   (A)

(2) A manufacturing method of a cellulose acylate film comprising:
casting a dope on a support;
drying the dope on the support, so as to form a film;
peeling the film from the support; and
subjecting the film to a stretching treatment,
wherein a crystallization index expressed by expression (A) of the film after peeling and before stretching is from 0.70 to 1.00.

Crystallization index=(X-ray diffraction intensity at 2θ of 27°)/(X-ray diffraction intensity at 2θ of 25°)   (A)

(3) The manufacturing method of a cellulose acylate film as described in (2) above,
wherein a content of a residual solvent in the film at a time of beginning of the stretching treatment expressed by following expression is from 1 to 40 mass %.

Residual solvent content=(mass of residual solvent)/(mass of solids content)

(4) A cellulose acylate film obtained by a manufacturing method as described in (2) or (3) above.

(5) The cellulose acylate film as described in (4) above, wherein the crystallization index of the film after peeling and before stretching is from 0.75 to 0.95.

(6) The cellulose acylate film as described in (5) above, wherein a modulus of elasticity in every arbitrary direction of an in-plane of the cellulose acylate film is from 3,800 MPa to 6,000 MPa.

(7) The cellulose acylate film as described in any of (1) and (4) to (6) above,
wherein the cellulose acylate is a cellulose acetate.

(8) The cellulose acylate film as described in any of (1) and (4) to (7) above, which comprises a retardation developer.

(9) The cellulose acylate film as described in (8) above, wherein the retardation developer is a compound represented by formula (1):

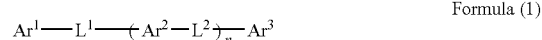

Formula (1)

wherein $Ar^1$, $Ar^2$ and $Ar^3$ each independently represents an aryl group or an aromatic heterocyclic ring;

$L^1$ and $L^2$ each independently represents a single bond or a divalent linking group; and n represents an integer of 3 or more, and a plurality of $Ar^2$'s and a plurality of $L^2$'s each may be the same or different.

(10) The cellulose acylate film as described in (9) above, wherein the compound represented by formula (1) is a compound represented by formula (2):

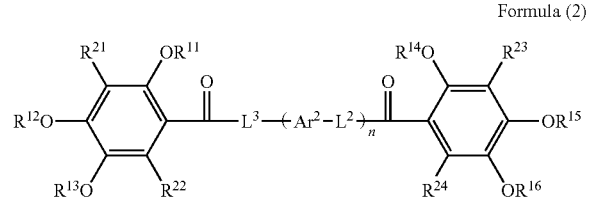

Formula (2)

wherein $R^{11}, R^{12}, R^{13}, R^{14}, R^{15}, R^{16}, R^{21}, R^{22}, R^{23}$ and $R^{24}$ each independently represents a hydrogen atom or a substituent;

$Ar^2$ represents an aryl group or an aromatic heterocyclic ring;

$L^2$ and $L^3$ each independently represents a single bond or a divalent linking group; and n represents an integer of 3 or more, and each a plurality of $Ar^2$'s and a plurality of $L^2$'s each may be the same or different.

(11) The cellulose acylate film as described in (8) above, wherein the retardation developer is at least one compound selected from compounds represented by any of formulae (I), (II), (III) and (IV):

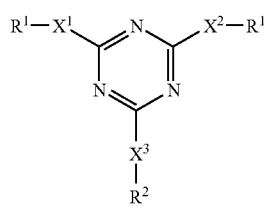

Formula (I)

wherein $R^1$ represents an aromatic ring having a substituent on at least one of ortho- and meta-positions, or a heterocyclic ring;

$R^2$ represents an aromatic ring having a substituent, or a heterocyclic ring, provided that when $R^1$ represents an aromatic ring having a substituent on at least one of ortho- and meta-positions and $R^2$ represents an aromatic ring having a substituent, $R^1$ and $R^2$ are not the same;

$X^1$ represents a single bond or —$NR^3$—;
$X^2$ represents a single bond or —$NR^4$—;
$X^3$ represents a single bond or —$NR^5$—; and
$R^3$, $R^4$ and $R^5$ each independently represents a hydrogen atom, a substituted or unsubstituted alkyl group, alkenyl group, aryl group or heterocyclic group;

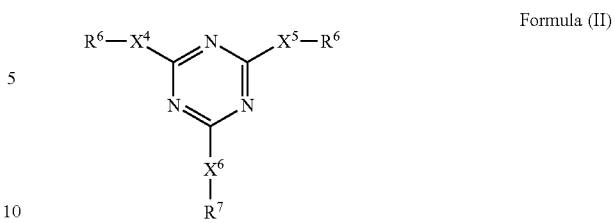

Formula (II)

wherein $R^6$ represents an aromatic ring having a substituent on para-position, or a heterocyclic ring;

$R^7$ represents an aromatic ring having a substituent, or a heterocyclic ring, provided that when $R^6$ represents an aromatic ring having a substituent on para-position and $R^7$ represents an aromatic ring having a substituent, $R^6$ and $R^7$ are not the same;

$X^4$ represents a single bond or —$NR^{13}$—;
$X^5$ represents a single bond or —$NR^{14}$—;
$X^6$ represents a single bond or —$NR^{15}$—; and
$R^{13}, R^{14}$ and $R^{15}$ each independently represents a hydrogen atom, a substituted or unsubstituted alkyl group, alkenyl group, aryl group or heterocyclic group;

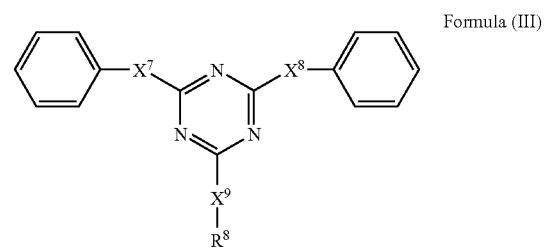

Formula (III)

wherein $R^8$ represents an aromatic ring having a substituent on at least one of ortho- and meta-positions, or a heterocyclic ring;

$X^7$ represents a single bond or —$NR^{23}$—;
$X^8$ represents a single bond or —$NR^{24}$—;
$X^9$ represents a single bond or —$NR^{25}$—; and
$R^{23}, R^{24}$ and $R^{25}$ each independently represents a hydrogen atom, a substituted or unsubstituted alkyl group, alkenyl group, aryl group or heterocyclic group;

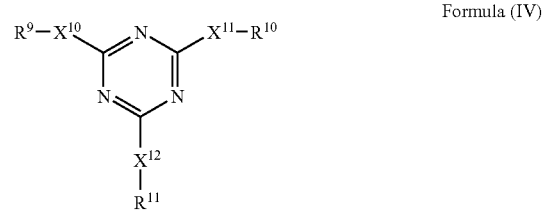

Formula (IV)

wherein $R^9$, $R^{10}$ and $R^{11}$ each independently represents a different aromatic ring or heterocyclic ring;

$X^{10}$ represents a single bond or —$NR^{33}$—;
$X^{11}$ represents a single bond or —$NR^{34}$—;
$X^{12}$ represents a single bond or —$NR^{35}$—; and
$R^{33}, R^{34}$ and $R^{35}$ each independently represents a hydrogen atom, a substituted or unsubstituted alkyl group, alkenyl group, aryl group or heterocyclic group.

(12) The cellulose acylate film as described in any of (1) and (4) to (11) above,
wherein the cellulose acylate film has an in-plane retardation value (Re) of from 20 to 200 nm and a retardation value in a thickness direction (Rth) of from 70 to 400 nm.

(13) The cellulose acylate film as described in any of (1) and (4) to (12) above,
wherein a difference between a maximum value and a minimum value of an orientation angle in an arbitrary 60 mm×60 mm square in the cellulose acylate film is from 0° to 0.40°.

(14) An optically compensatory sheet comprising a cellulose acylate film as described in any of (1) and (4) to (13) above.

(15) An optically compensatory sheet as described in (14) above, which further comprises an optically anisotropic layer directly or indirectly on the cellulose acylate film.

(16) A polarizing plate comprising:
a polarizing film; and
at least two transparent protective films disposed on both sides of the polarizing film,
wherein at least one of the at least two transparent protective films is an optically compensatory sheet as described in (14) or (15) above.

(17) A liquid crystal display device comprising:
a liquid crystal cell; and
at least two polarizing plates disposed on both sides of the liquid crystal cell,
wherein at least one of the at least two polarizing plates is a polarizing plate as described in (16) above.

(18) The liquid crystal display device as described in (17) above,
wherein a display mode of the liquid crystal display device is a VA mode.

DETAILED DESCRIPTION OF THE INVENTION

Figure 1:
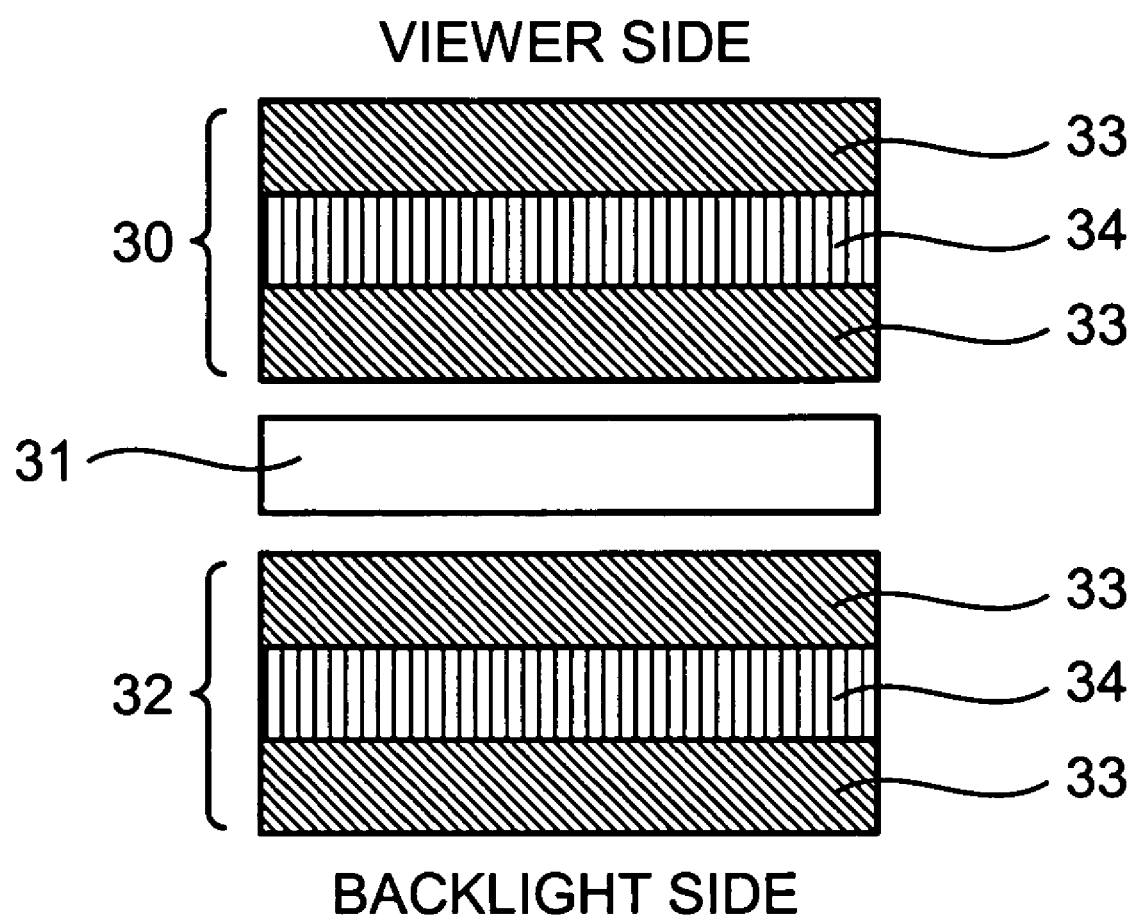
FIG. 1 is a diagram showing an exemplary embodiment of the liquid crystal display of the invention.

The contents of the invention are described in detail below. The following description of the constitutional requisites of the invention is performed on the basis of the representative embodiments, but the invention is not restricted to these embodiments. Incidentally, in the specification of the invention, the description of numerical values "from a number to a number" means the range including the former and the latter numbers as the greatest lower bound value and the least upper bound value.

[Cellulose Acylate Film]

Characteristics:

The cellulose acylate film in the invention is characterized in: that the cellulose acylate film has a crystallization index of from 0.70 to 1.02 and a modulus of elasticity in every arbitrary direction of the in-plane of the film of from 3,800 MPa to 6,000 MPa; or that a film having a crystallization index of from 0.70 to 1.0 after casting a dope on a support, drying, peeling and before stretching is subjected to stretching treatment. The crystallization index of a cellulose acylate film can be controlled by the degree of polymerization and the molecular weight distribution of the cellulose acylate, the kinds and amounts of additives (in particular, a retardation developer), and the drying temperature on a band or a drum after casting a dope.

Retardation developers, cellulose acylate, and film-forming methods are described below.

Retardation developer:

Retardation developers for use in the cellulose acylate film in the invention are described. It is preferred to use a retardation developer in proportion of from 0.01 to 20 mass parts per 100 mass parts of the cellulose acylate, more preferably from 0.1 to 20 mass parts, and still more preferably from 0.5 to 20 mass parts. (In this specification, mass ratio is equal to weight ratio.)

The kinds of retardation developers are not especially restricted so long as they have a function of increasing the retardation of a cellulose acylate film when added to cellulose acylate. Of such retardation developers, a compound represented by the following formula (1) has an effect of preventing cellulose acylate from being crystallized at the film forming time, so that especially preferred. The compound represented by formula (1) is described in detail below.

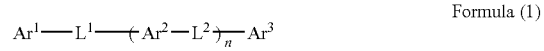

Formula (1)

In formula (1), $Ar^1$, $Ar^2$ and $Ar^3$ each independently represents an aryl group or an aromatic heterocyclic ring; $L^1$ and $L^2$ each independently represents a single bond or a divalent linking group; n represents an integer of 3 or more, and each $Ar^2$ and $L^2$ may be the same or different.

$Ar^1$, $Ar^2$ and $Ar^3$ each independently represents an aryl group or an aromatic heterocyclic ring. The aryl group represented by $Ar^1$, $Ar^2$ and $Ar^3$ is preferably an aryl group having from 6 to 30 carbon atoms, which may be monocyclic or may be condensed with other rings. $Ar^1$, $Ar^2$ and $Ar^3$ may have a substituent, if possible, and substituent T described later can be applied to the substituent.

In formula (1), the aryl group represented by $Ar^1$, $Ar^2$ and $Ar^3$ is more preferably an aryl group having from 6 to 20 carbon atoms, especially preferably from 6 to 12 carbon atoms, e.g., a phenyl group, a p-methylphenyl group and a naphthyl group can be exemplified.

In formula (1), the aromatic heterocyclic ring represented by $Ar^1$, $Ar^2$ and $Ar^3$ may be any heterocyclic ring so long as it is an aromatic heterocyclic ring containing at least one of an oxygen atom, a nitrogen atom and a sulfur atom, preferably a 5- or 6-membered aromatic heterocyclic ring containing at least one of an oxygen atom, a nitrogen atom and a sulfur atom. If necessary, the aromatic heterocyclic ring may further have a substituent, and substituent T described later can be applied to the substituent.

As the specific examples of the aromatic heterocyclic rings represented by $Ar^1$, $Ar^2$ and $Ar^3$, a furan ring, a pyrrole ring, a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, an oxadiazole ring, a quinoline ring, an isoquinoline ring, a phthalazine ring, a naphthylidine ring, a quinoxaline ring, a quinazoline ring, a cimnoline ring, a pteridine ring, an acridine ring, a phenanthroline ring, a phenazine ring, a tetrazole ring, a benzimidazole ring, a benzoxazole ring, a benzothiazole ring, a benzotriazole ring, a tetraazaindene ring, a pyrrolotriazole ring, and a pyrazolotriazole ring are exemplified. The preferred rings as the aromatic heterocyclic rings are a benzimidazole ring, a benzoxazole ring, a benzothiazole ring, and a benzotriazole ring.

In formula (1), $L^1$ and $L^2$ each independently represents a single bond or a divalent linking group. As the examples of the divalent linking groups, a group represented by —$NR^7$— ($R^7$ represents a hydrogen atom, an alkyl group or an aryl group which may have a substituent), —$SO_2$—, —CO—, an alkylene group, a substituted alkylene group, an alkenylene group, a substituted alkenylene group, an alkynylene group, —O—, —S—, —SO—, and groups obtained by combining two or more of these divalent groups are preferably exemplified, among all, —O—, —CO—, —$SO_2NR^7$—, —$NR^7SO_2$—, —$CONR^7$—, —$NR^7CO$—, —COO—, —OCO—, and an alkynylene group are more preferred, and —$CONR^7$—, —$NR^7CO$—, —COO—, —OCO—, and an alkynylene group are most preferred.

In the compound represented by formula (1), $Ar^2$ is bonded to $L^1$ and $L^2$, and in the case where $Ar^2$ is a phenylene group, it is most preferred that $L^1$-$Ar^2$-$L^2$ and $L^2$-$Ar^2$-$L^2$ are in the relationship of para-positions (1-, 4-positions).

n represents an integer of 3 or more, preferably from 3 to 7, and more preferably from 3 to 5.

The compound represented by formula (1) is preferably a compound represented by the following formula (2). Formula (2) is described in detail below.

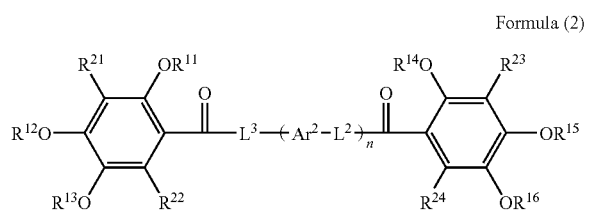

Formula (2)

In formula (2), $R^{11}$, $R^{12}$, $R^{13}$, $R^{14}$, $R^{15}$, $R^{16}$, $R^{21}$, $R^{22}$, $R^{23}$ and $R^{24}$ each independently represents a hydrogen atom or a substituent; $Ar^2$ represents an aryl group or an aromatic heterocyclic ring; $L^2$ and $L^3$ each independently represents a single bond or a divalent linking group; n represents an integer of 3 or more, and each $Ar^2$ and $L^2$ may be the same or different.

The examples of $Ar^2$, $L^2$ and n are the same as the examples in formula (1). $L^3$ represents a single bond or a divalent linking group, and the preferred examples of the divalent linking groups include a group represented by —$NR^7$— (where $R^7$ represents a hydrogen atom, an alkyl group or an aryl group which may have a substituent), an alkylene group, a substituted alkylene group, —O—, and groups obtained by combining two or more of these divalent groups, and —O—, —$NR^7$—, —$NR^7SO_2$—, and —$NR^7CO$— are more preferred.

$R^{11}$, $R^{12}$, $R^{13}$, $R^{14}$, $R^{15}$ and $R^{16}$ each independently represents a hydrogen atom or a substituent, preferably a hydrogen atom, an alkyl group, or an aryl group, more preferably a hydrogen atom, an alkyl group having from 1 to 4 carbon atoms (e.g., a methyl group, an ethyl group, a propyl group, an isopropyl group, etc.), or an aryl group having from 6 to 12 carbon atoms (e.g., a phenyl group, a naphthyl group), and still more preferably an alkyl group having from 1 to 4 carbon atoms.

$R^{22}$, $R^{23}$ and $R^{24}$ each independently represents a hydrogen atom or a substituent, preferably a hydrogen atom, an alkyl group, an alkoxyl group, or a hydroxyl group, and more preferably a hydrogen atom, or an alkyl group (preferably having from 1 to 4 carbon atoms, and more preferably a methyl group).

The above substituent T is described below.

Substituent T preferably represents a halogen atom (e.g., a fluorine atom, a chlorine atom, a bromine atom and an iodine atom), an alkyl group (preferably an alkyl group having from 1 to 30 carbon atoms, e.g., a methyl group, an ethyl group, an n-propyl group, an isopropyl group, a t-butyl group, an n-octyl group, a 2-ethylhexyl group), a cycloalkyl group (preferably a substituted or unsubstituted cycloalkyl group having from 3 to 30 carbon atoms, e.g., a cyclohexyl group, a cyclopentyl group, a 4-n-dodecylcyclohexyl group), a bicycloalkyl group (preferably a substituted or unsubstituted bicycloalkyl group having from 5 to 30 carbon atoms, i.e., a monovalent group remaining after removing one hydrogen atom from a bicycloalkane having from 5 to 30 carbon atoms, e.g., bicyclo [1.2.2]heptan-2-yl, bicyclo[2.2.2]octan-3-yl), an alkenyl-group (preferably a substituted or unsubstituted alkenyl group having from 2 to 30 carbon atoms, e.g., a vinyl group, an allyl group), a cycloalkenyl group (preferably a substituted or unsubstituted cycloalkenyl group having from 3 to 30 carbon atoms, i.e., a monovalent group remaining after removing one hydrogen atom from a bicycloalkene having from 3 to 30 carbon atoms, e.g., a 2-cyclopenten-1-yl group, a 2-cyclohexen-1-yl group), a bicycloalkenyl group (a substituted or unsubstituted bicycloalkenyl group, preferably a substituted or unsubstituted bicycloalkenyl group having from 5 to 30 carbon atoms, i.e., a monovalent group remaining after removing one hydrogen atom from a bicycloalkene having one double bond, e.g., bicyclo[2.2.1]hept-2-en-1-yl, bicyclo [2.2.2]oct-2-en-4-yl), an alkynyl group (preferably a substituted or unsubstituted alkynyl group having from 2 to 30 carbon atoms, e.g., an ethynyl group, a propargyl group), an aryl group (preferably a substituted or unsubstituted aryl group having from 6 to 30 carbon atoms, e.g., a phenyl group, a p-tolyl group, a naphthyl group), a heterocyclic group (preferably a monovalent group remaining after removing one hydrogen atom from a 5- or 6-membered, substituted or unsubstituted, aromatic or non-aromatic heterocyclic compound, more preferably a 5- or 6-membered aromatic heterocyclic group having from 3 to 30 carbon atoms, e.g., a 2-furyl group, a 2-thienyl group, a 2-pyrinidinyl group, a 2-benzothiazolyl group), a cyano group, a hydroxyl group, a nitro group, a carboxyl group, an alkoxy group (preferably a substituted or unsubstituted alkoxy group having from 1 to 30 carbon atoms, e.g., a methoxy group, an ethoxy group, an isopropoxy group, a t-butoxy group, an n-octyloxy group, a 2-methoxyethoxy group), an aryloxy group (preferably a substituted or unsubstituted aryloxy group having from 6 to 30 carbon atoms, e.g., a phenoxy group, a 2-methylphenoxy group, a 4-t-butylphenoxy group, a 3-nitrophenoxy group, a 2-tetradecanoylaminophenoxy group), a silyloxy group (preferably a silyloxy group having from 3 to 20 carbon atoms, e.g., a trimethylsilyloxy group, a tert-butyldimethylsilyloxy group), a heterocyclic oxy group (preferably a substituted or unsubstituted heterocyclic oxy group having from 2 to 30 carbon atoms, e.g., a 1-phenyl-tetrazol-5-oxy group, a 2-tetrahydropyranyloxy group), an acyloxy group-(preferably-a formyloxy group, a substituted or unsubstituted alkylcarbonyloxy group having from 2 to 30 carbon atoms, a substituted or unsubstituted arylcarbonyloxy group having from 6 to 30 carbon atoms, e.g., a formyloxy group, an acetyloxy group, a pivaloyloxy group, a stearoyloxy group, a benzoyloxy group, a p-methoxyphenylcarbonyloxy group), a carbamoyloxy group (preferably a substituted or unsubstituted carbamoyloxy group having from 1 to 30 carbon atoms, e.g., an N,N-dimethylcarbamoyloxy group, an N,N-diethylcarbamoyloxy group, a morpholinocarbonyloxy group, an N,N-di-n-octylamino-carbonyloxy group, an N-n-octylcarbamoyloxy group), an alkoxycarbonyloxy group (preferably a substituted or unsubstituted alkoxycarbonyloxy group having from 2 to 30 carbon atoms, e.g., a methoxycarbonyloxy group, an ethoxy-carbonyloxy group, a tert-butoxycarbonyloxy group, an n-octylcarbonyloxy group), an aryloxycarbonyloxy group (preferably a substituted or unsubstituted aryloxycarbonyloxy group having from 7 to 30 carbon atoms, e.g., a phenoxy-carbonyloxy group, a p-methoxyphenoxycarbonyloxy group, a p-n-hexadecyloxyphenoxycarbonyloxy group), an amino group (preferably an amino group, a substituted or unsubstituted alkylamino group having from 1 to 30 carbon atoms, a substituted or unsubstituted anilino group having from 6 to 30 carbon atoms, e.g., an amino group, a methylamino group, a dimethylamino group, an anilino group, an N-methylanilino group, a diphenyl-amino group), an acylamino group (preferably a formylamino group, a substituted or unsubstituted alkylcarbonylamino group having form 1 to 30 carbon atoms, a substituted or unsubstituted arylcarbonylamino group having from 6 to 30 carbon atoms, e.g., a formylamino group, an acetylamino group, a pivaloylamino group, a lauroylamino group, a benzoylamino group), an aminocarbonylamino group (preferably a substituted or unsubstituted aminocarbonylamino group having from 1 to 30 carbon atoms, e.g., a carbamoylamino group, an N,N-dimethyl-aminocarbonylamino group, an N,N-diethylaminocarbonylamino group, a morpholinocarbonylamino group), an alkoxycarbonyl-amino group (preferably a substituted or unsubstituted alkoxycarbonylamino group having from 2 to 30 carbon atoms, e.g., a methoxycarbonylamino group, an ethoxycarbonylamino group, a tert-butoxycarbonylamino group, an n-octadecyloxy-carbonylamino group, an N-methylmethoxycarbonylamino group), an aryloxycarbonylamino group (preferably a substituted or unsubstituted aryloxycarbonylamino group having from 7 to 30 carbon atoms, e.g., a phenoxycarbonylamino group, a p-chloro-phenoxycarbonylamino group, an m-n-octyloxyphenoxycarbonyl-amino group), a sulfamoylamino group (preferably a substituted or unsubstituted sulfamoylamino group having from 0 to 30 carbon atoms, e.g., a sulfamoylamino group, an N,N-dimethyl-aminosulfonylamino group, an N-n-octylaminosulfonylamino group), an alkyl- or arylsulfonylamino group (preferably a substituted or unsubstituted alkylsulfonylamino having from 1 to 30 carbon atoms, a substituted or unsubstituted arylsulfonylamino group having from 6 to 30 carbon atoms, e.g., a methylsulfonylamino group, a butylsulfonylamino group, a phenylsulfonylamino group, a 2,3,5-trichlorophenylsulfonyl-amino group, a p-methylphenylsulfonylamino group), a mercapto group, an alkylthio group (preferably a substituted or unsubstituted alkylthio group having from 1 to 30 carbon atoms, e.g., a methylthio group, an ethylthio group, an n-hexadecyltio group), an arylthio group (preferably a substituted or unsubstituted arylthio group having from 6 to 30 carbon atoms, e.g., a phenylthio group, a p-chlorophenylthio group, an m-methoxyphenylthio group), a heterocyclic thio group (preferably a substituted or unsubstituted heterocyclic thio group having from 2 to 30 carbon atoms, e.g., a 2-benzo-thiazolylthio group, a 1-phenyltetrazol-5-ylthio group), a sulfamoyl group (preferably a substituted or unsubstituted sulfamoyl group having from 0 to 30 carbon atoms, e.g., an N-thylsulfamoyl group, an N-(3-dodecyloxypropyl)sulfamoyl group, an N,N-dimetylsulfamoyl group, an N-acetylsulfamoyl group, an N-benzoylsulfamoyl group, an N-(N'-phenyl-carbamoyl)sulfamoyl group), a sulfo group, an alkyl- or arylsulfinyl group (preferably a substituted or unsubstituted alkylsulfinyl group having from 1 to 30 carbon atoms, a substituted or unsubstituted arylsulfinyl group having from 6 to 30 carbon atoms, e.g., a methylsulfinyl group, an ethylsulfinyl group, a phenylsulfinyl group, a p-methyl-phenylsulfinyl group), an alkyl- or arylsulfonyl group (preferably a substituted or unsubstituted alkylsulfonyl group having from 1 to 30 carbon atoms, a substituted or unsubstituted arylsulfonyl group having from 6 to 30 carbon atoms, e.g. a methylsulfonyl group, an ethylsulfonyl group,-a phenylsulfonyl group, a p-methylphenylsulfonyl group), an acyl group (preferably a formyl group, a substituted or unsubstituted alkylcarbonyl group having from 2 to 30 carbon atoms, a substituted or unsubstituted arylcarbonyl group having from 7 to 30 carbon atoms, e.g., an acetyl group, a pivaloylbenzoyl group), an aryloxycarbonyl group (preferably a substituted or unsubstituted aryloxycarbonyl group having from 7 to 30 carbon atoms, e.g., a phenoxycarbonyl group, an o-chlorophenoxycarbonyl group, an m-nitrophenoxycarbonyl group, a p-tert-butylphenoxycarbonyl group), an alkoxycarbonyl group (preferably a substituted or unsubstituted alkoxycarbonyl group having from 2 to 30 carbon atoms, e.g., a methoxycarbonyl group, an ethoxycarbonyl group, a t-butoxy-carbonyl group, an n-octadecyloxycarbonyl group), a carbamoyl group (preferably a substituted or unsubstituted carbamoyl group having from 1 to 30 carbon atoms, e.g., a carbamoyl group, an N-methylcarbamoyl group, an N,N-dimethylcarbamoyl group, an N,N-n-octylcarbamoyl group, an N-(methylsulfonyl)-carbamoyl group), an aryl- or heterocyclic azo group (preferably a substituted or unsubstituted arylazo group having from 6 to 30 carbon atoms, a substituted or unsubstituted heterocyclic azo group having from 3 to 30 carbon atoms, e.g., a phenylazo group, a p-chlorophenylazo group, a 5-ethylthio-1,3,4-thiaziazol-2-ylazo group), an imido group (preferably an N-succinimido group, an N-phthalimido group), a phosphino group (preferably a substituted or unsubstituted phosphino group having from 2 to 30 carbon atoms, e.g., a dimethyl-phosphino group, a diphenylphosphino group, a methylphenoxy-phosphino group), a phosphinyl group (preferably a substituted or unsubstituted phosphinyl group having from 2 to 30 carbon atoms, e.g., a phosphinyl group, a dioctyloxyphosphinyl group, a diethoxyphosphinyl group), a phosphinyloxy group (preferably a substituted or unsubstituted phosphinyloxy group having from 2 to 30 carbon atoms, e.g., a diphenoxy-phosphinyloxy group, a dioctyloxyphosphinyloxy group), a phosphinylamino group (preferably a substituted or unsubstituted phosphinylamino group having from 2 to 30 carbon atoms, e.g., a dimethoxyphosphinylanrino group, a dimethyl-aminophosphinylamino group), or a silyl group (preferably a substituted or unsubstituted silyl group having from 3 to 30 carbon atoms, e.g., a trimethylsilyl group, a tert-butyl-dimethylsilyl group, a phenyldimethylsilyl group). In the substituents having a hydrogen atom of the above substituents, the hydrogen atom may be removed, and further they may be substituted with the above groups. The examples of such functional groups include an alkylcarbonylaminosulfonyl group, an arylcarbonylaminosulfonyl group, an alkylsulfonylaminocarbonyl group, and an arylsulfonylaminocarbonyl group. The specific examples of these groups include a methylsulfonyl-aminocarbonyl group, a p-methylphenylsulfonylaminocarbonyl group, an acetylaminosulfonyl group, and a benzoylamino-sulfonyl group.

Furthermore, when there are two or more substituents, these substituents may be the same or different. Further, if possible, the substituents may be linked together to form a ring.

The specific examples of the compounds represented by formula (1) and formula (2) are shown below, but it should not be construed that the invention is restricted to these specific examples.

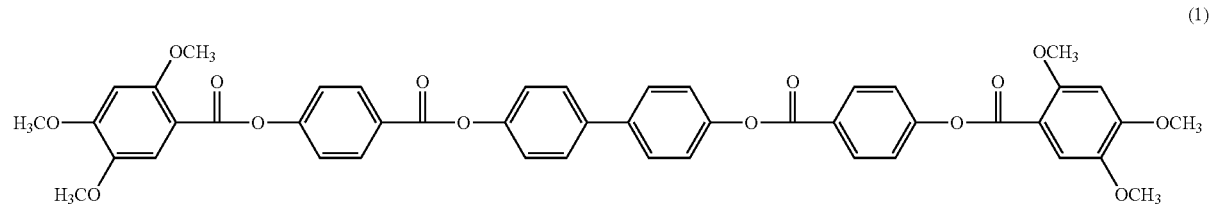
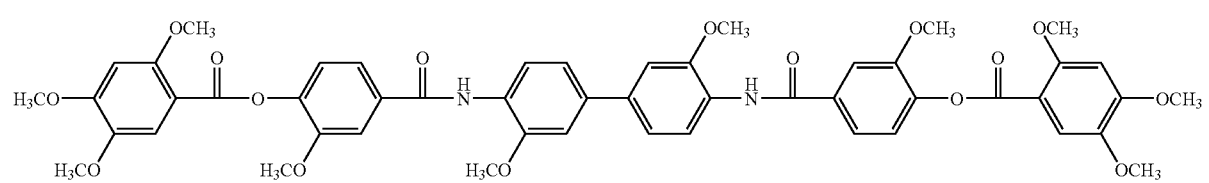
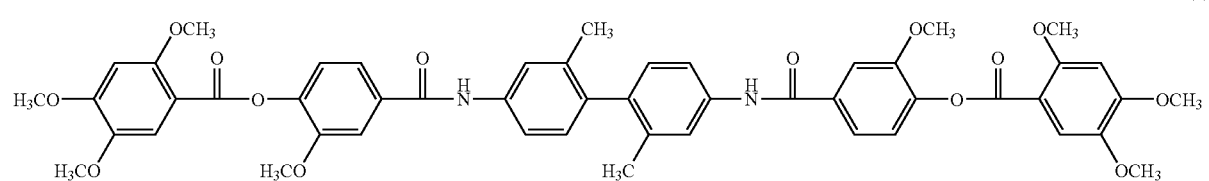
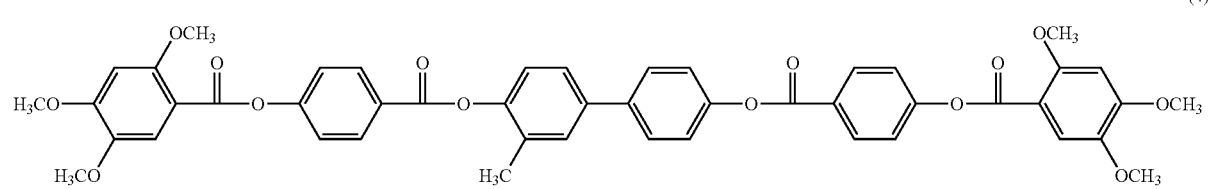
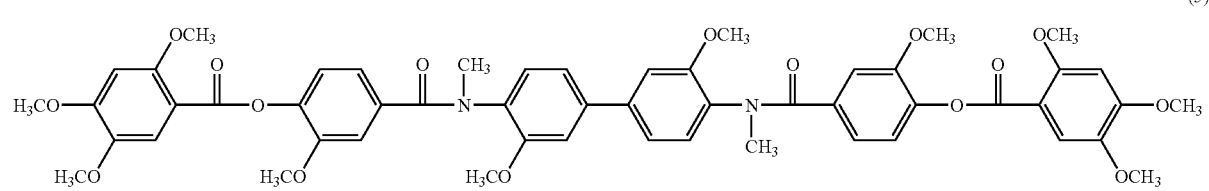
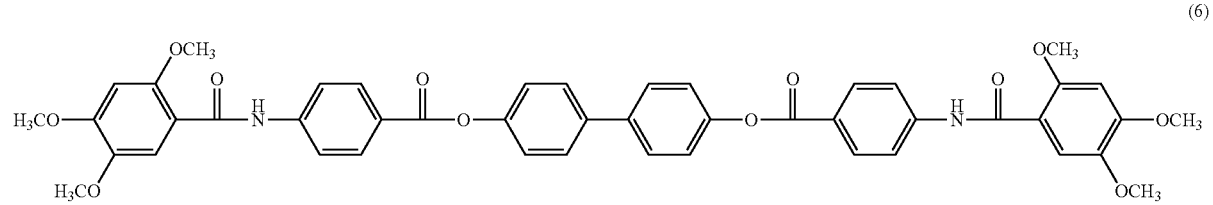
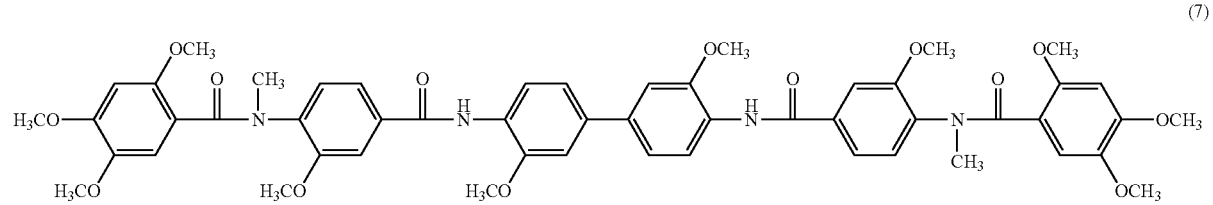
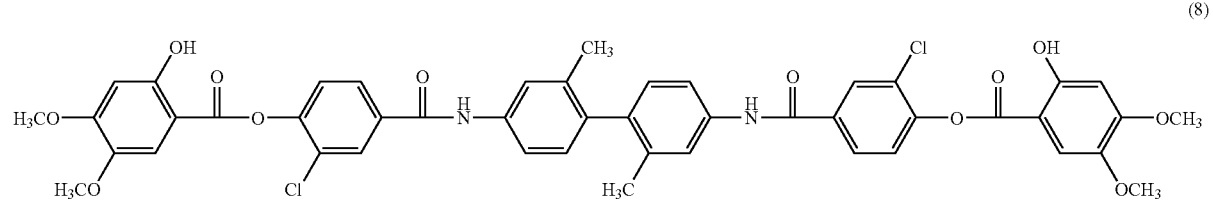

(9)
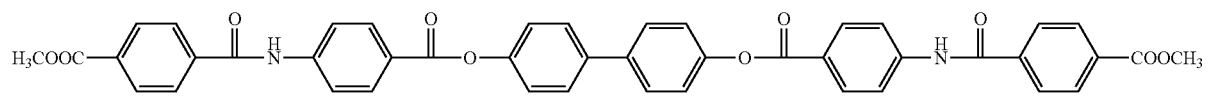
(10)
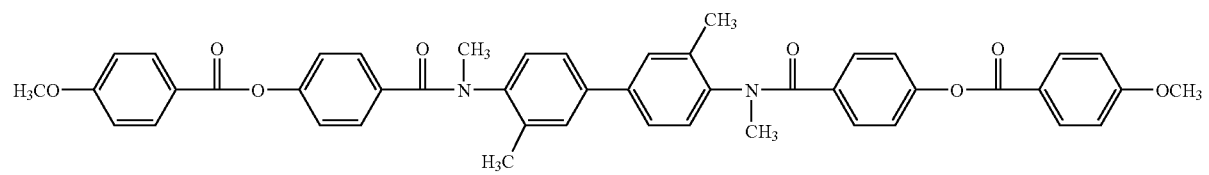
(11)
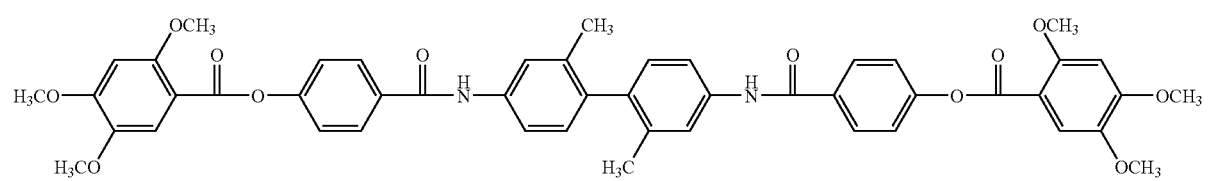
(12)
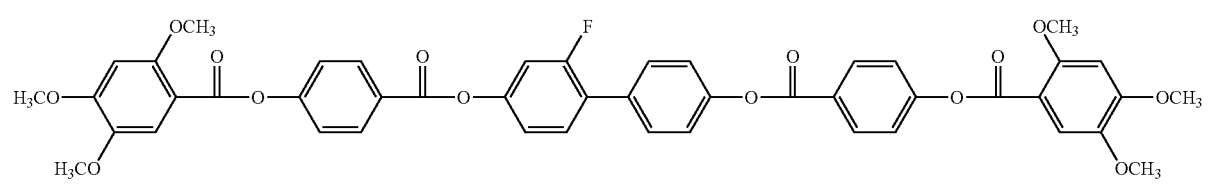
(13)
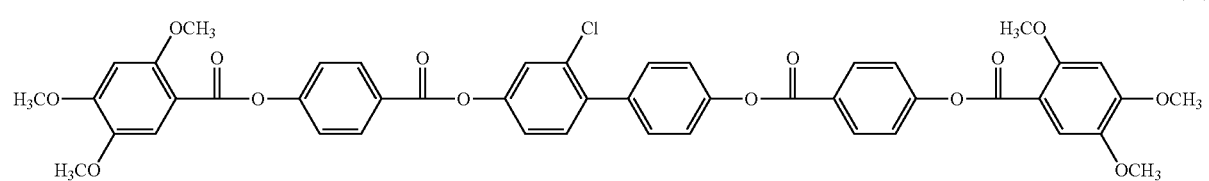
(14)
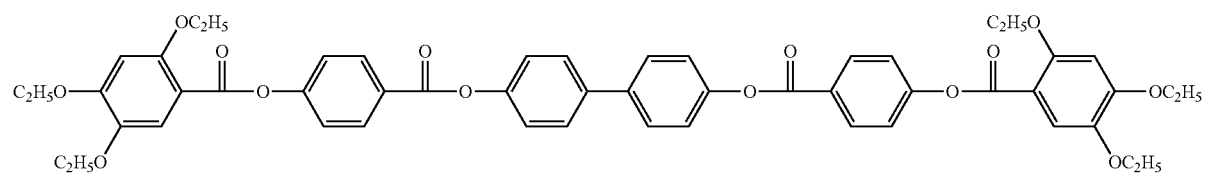
(15)
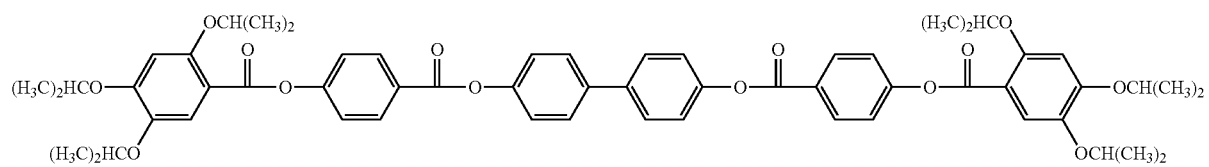
(16)
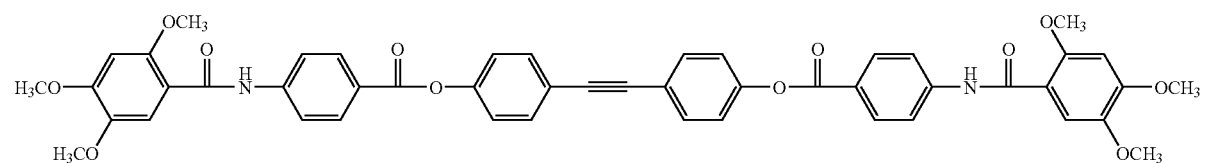

-continued
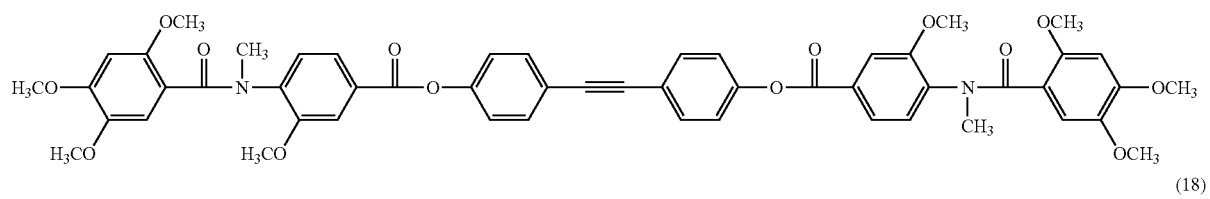
(17)
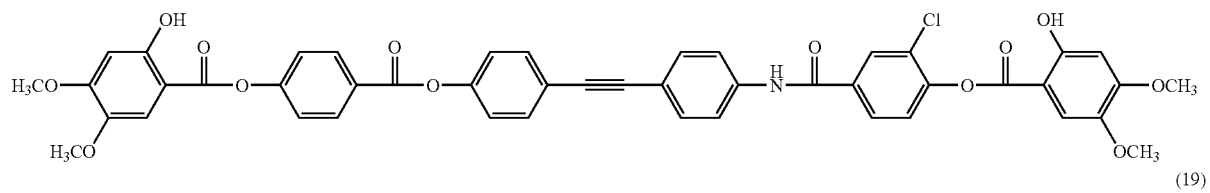
(18)
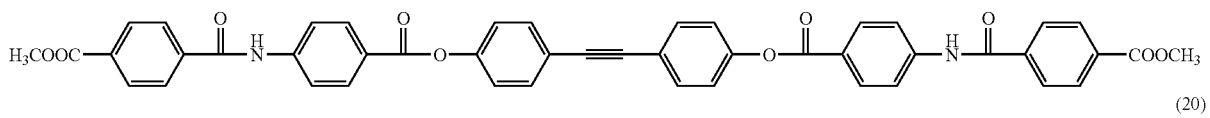
(19)
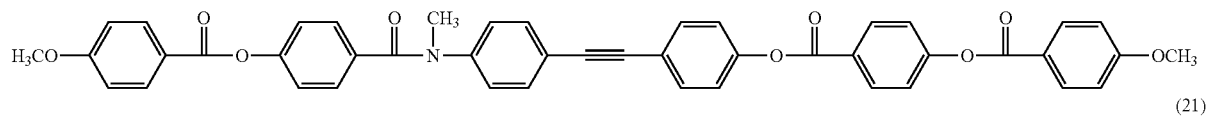
(20)
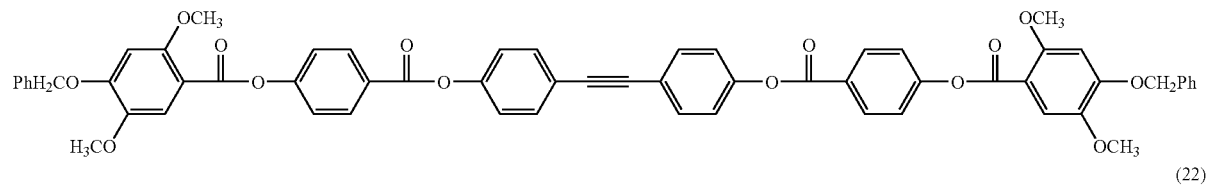
(21)
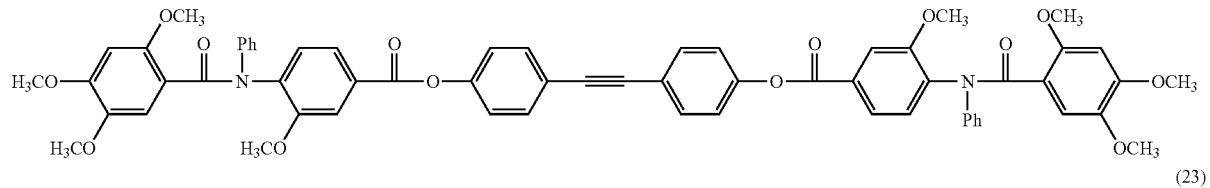
(22)
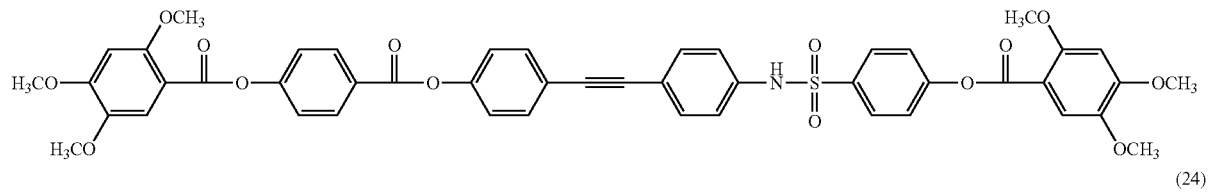
(23)
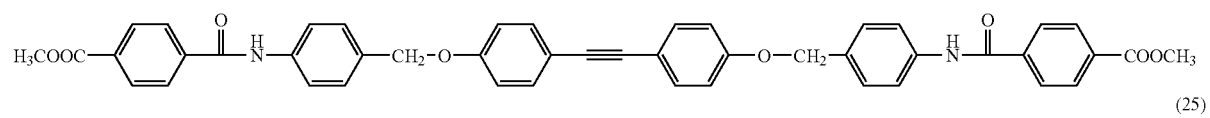
(24)
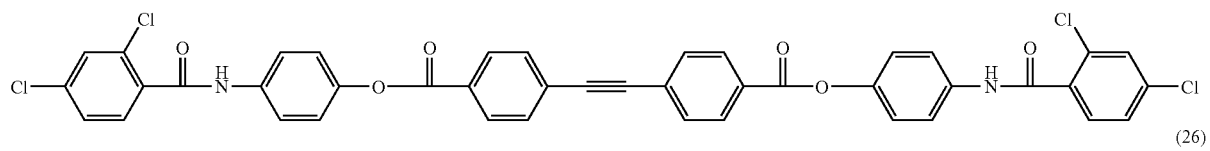
(25)
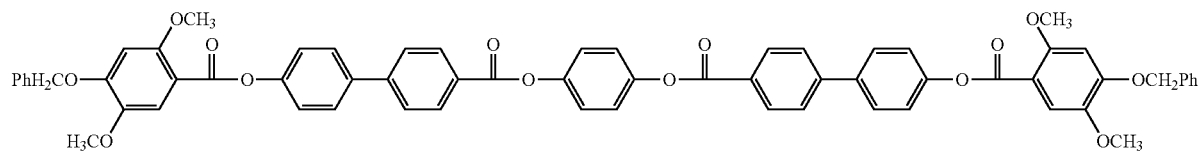
(26)

-continued
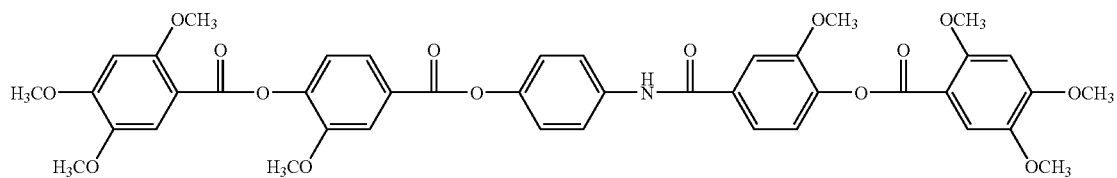
(27)
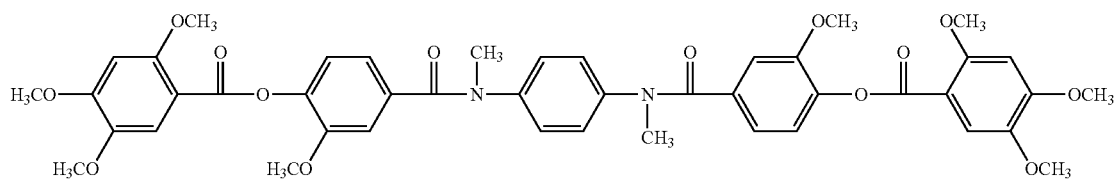
(28)
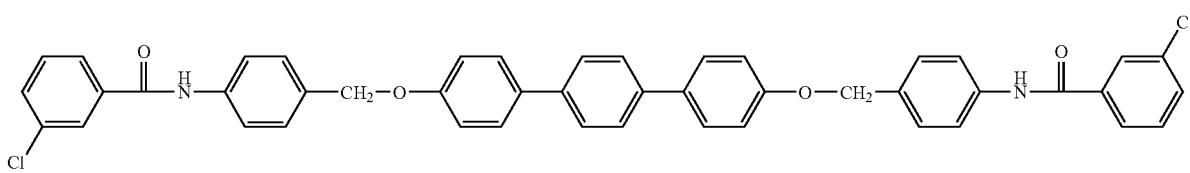
(29)
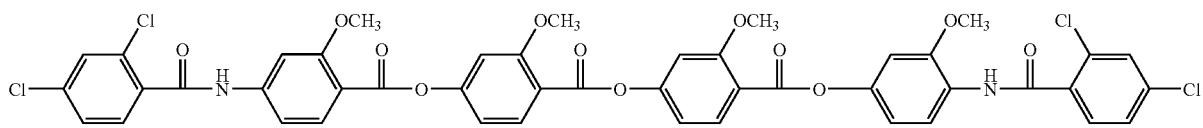
(30)
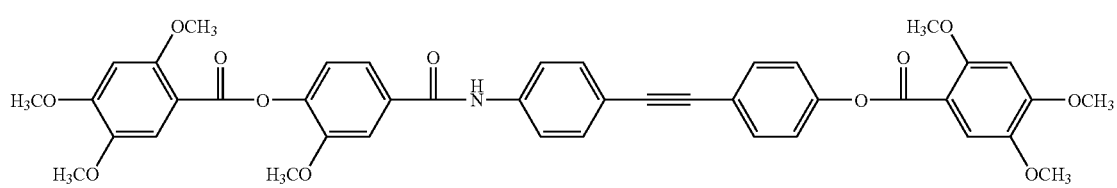
(31)
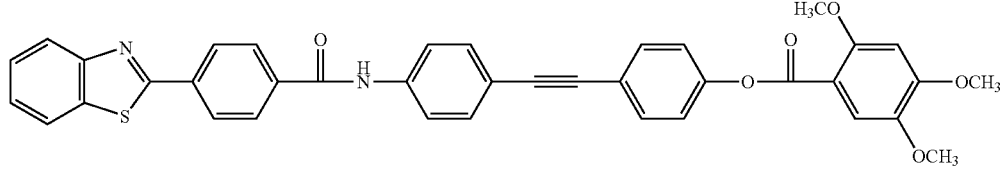
(32)
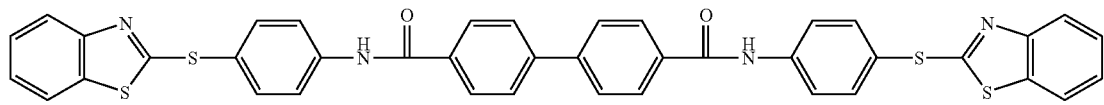
(33)
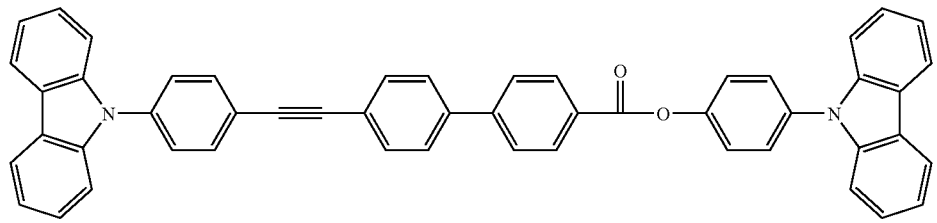
(34)

-continued
(35)
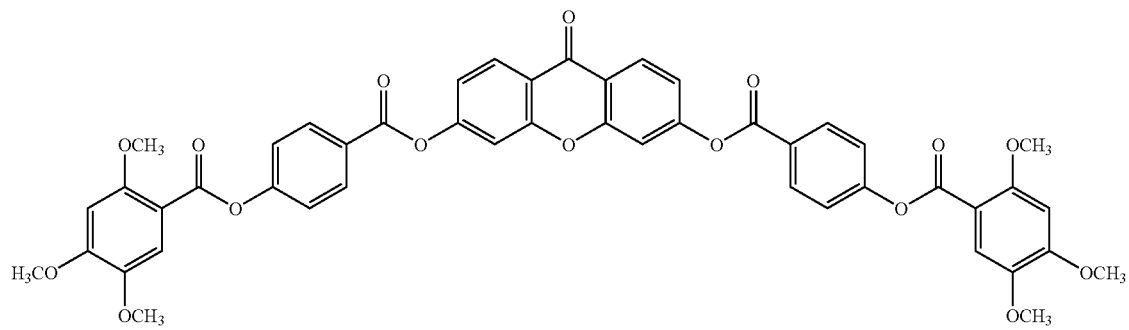
(36)
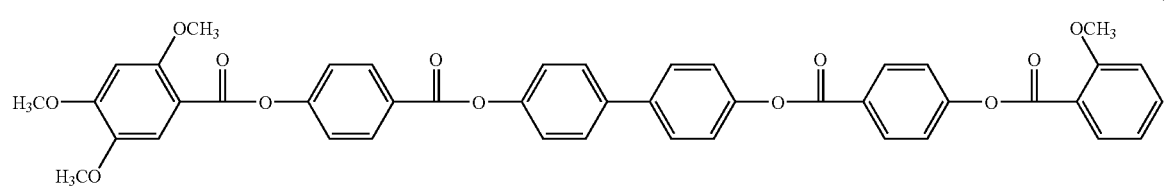
(37)
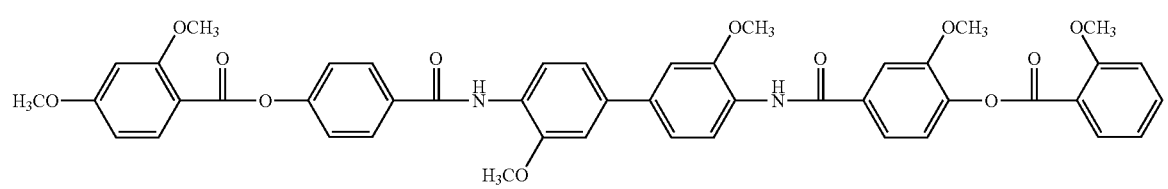
(38)
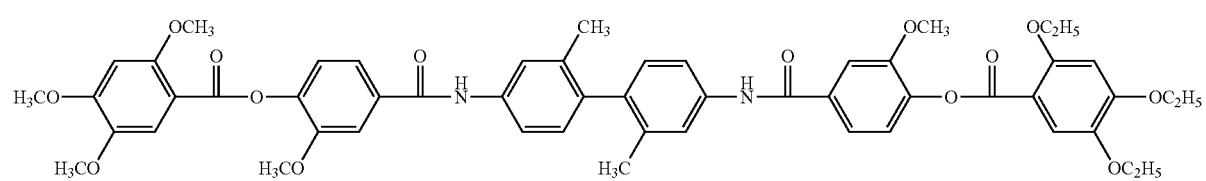
(39)
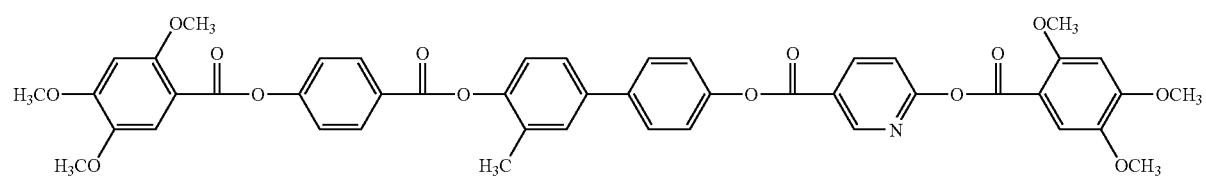
(40)
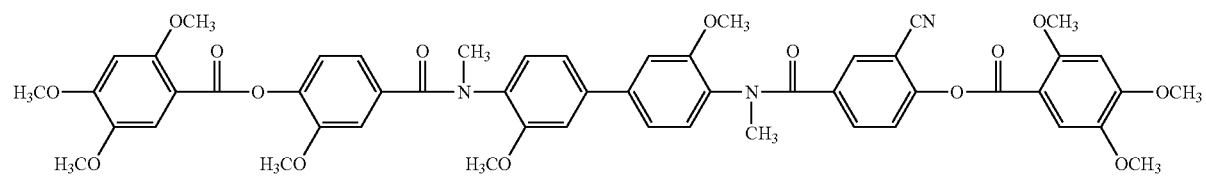
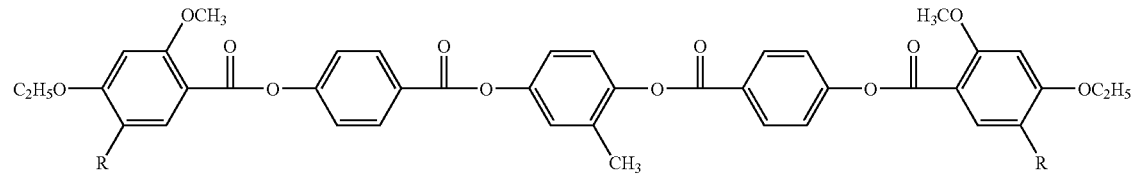
A-1; R = H
B-1; R = OCH₃

-continued
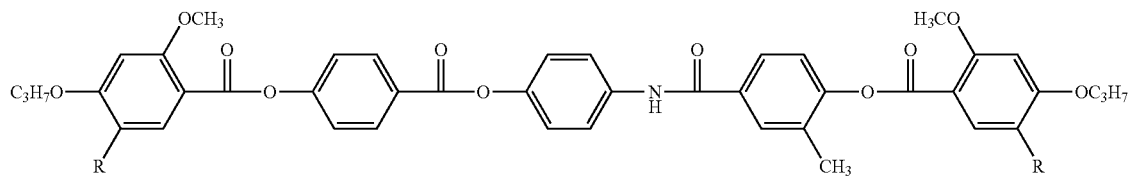
A-2; R = H
B-2; R = OCH₃
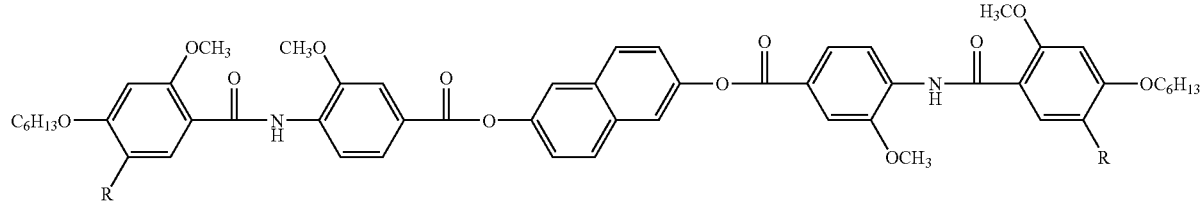
A-3; R = H
B-3; R = OCH₃
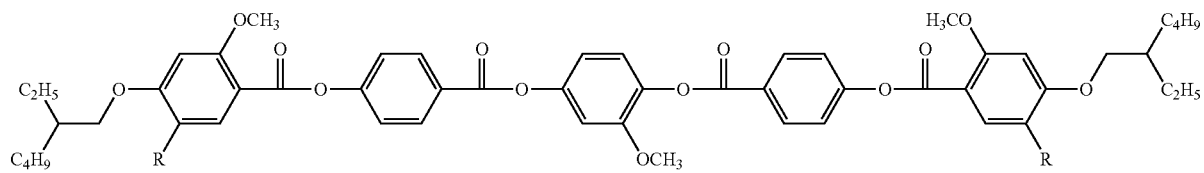
A-4; R = H
B-4; R = OCH₃
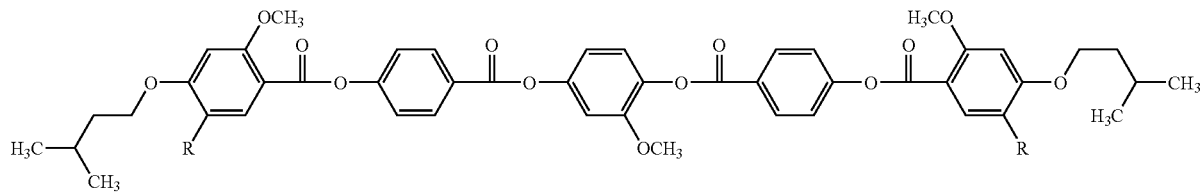
A-5; R = H
B-5; R = OCH₃
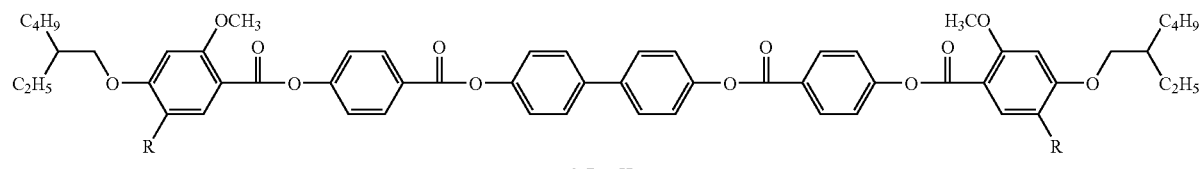
A-6; R = H
B-6; R = OCH₃
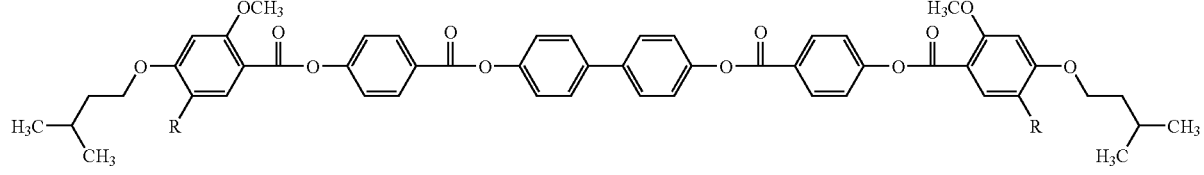
A-7; R = H
B-7; R = OCH₃
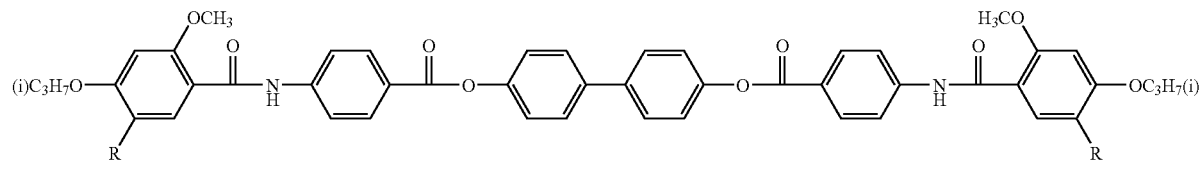
A-8; R = H
B-8; R = OCH₃

-continued
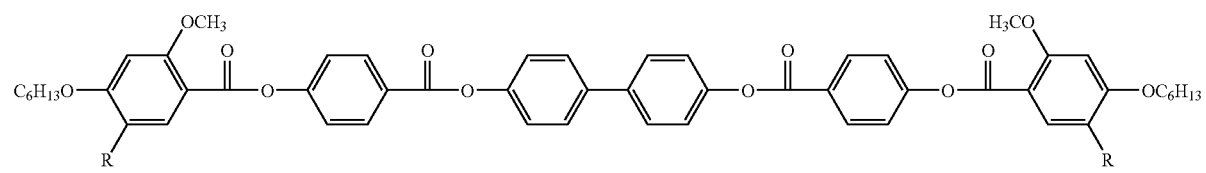
A-9; R = H
B-9; R = OCH₃
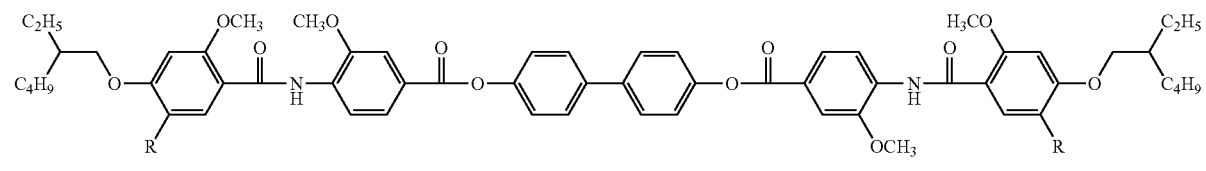
A-10; R = H
B-10; R = OCH₃
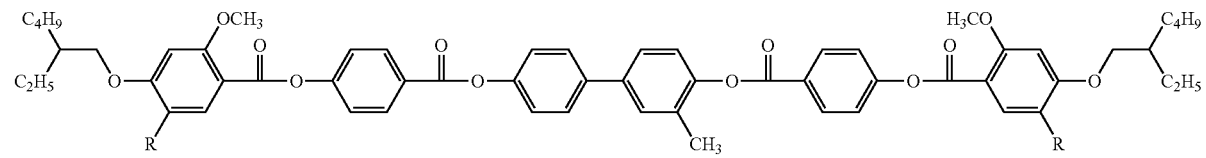
A-11; R = H
B-11; R = OCH₃
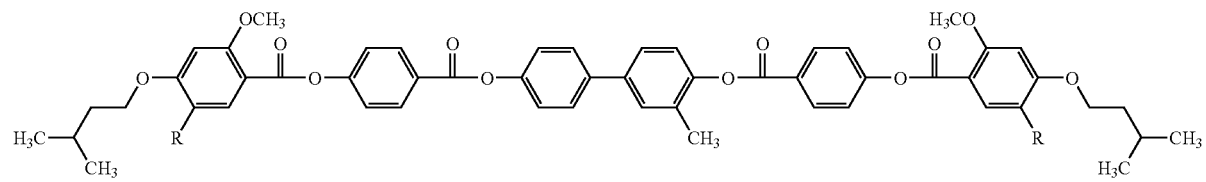
A-12; R = H
B-12; R = OCH₃
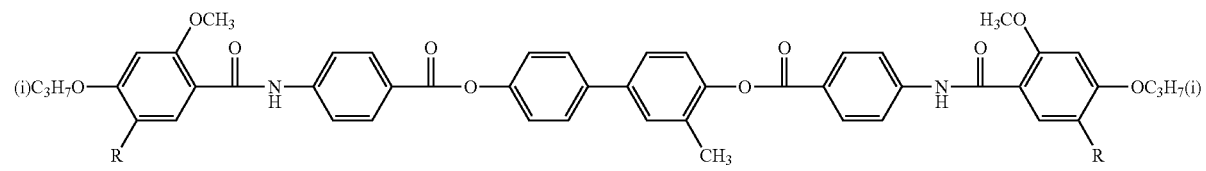
A-13; R = H
B-13; R = OCH₃
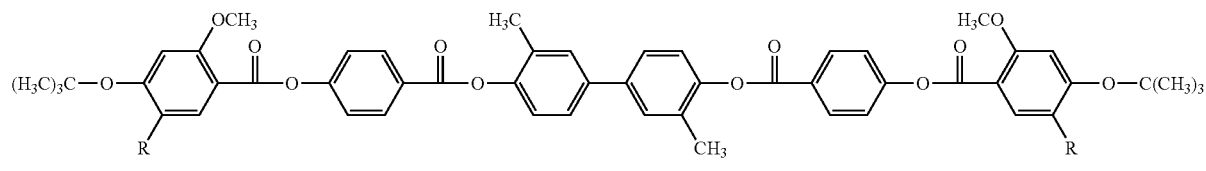
A-14; R = H
B-14; R = OCH₃
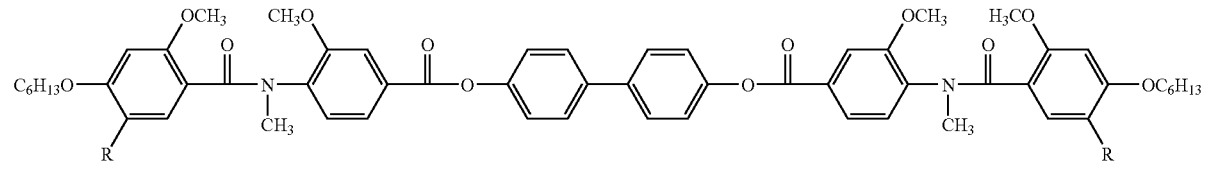
A-15; R = H
B-15; R = OCH₃

-continued
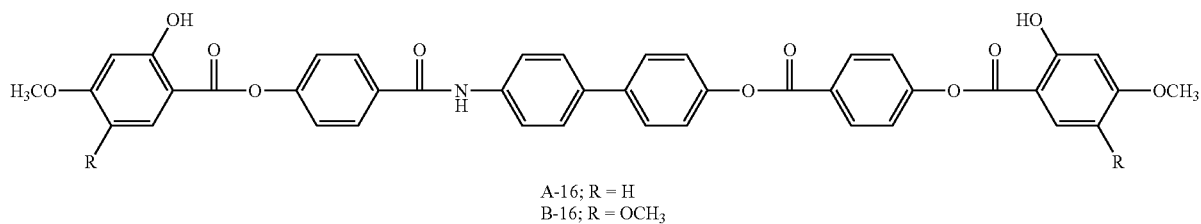
A-16; R = H
B-16; R = OCH₃
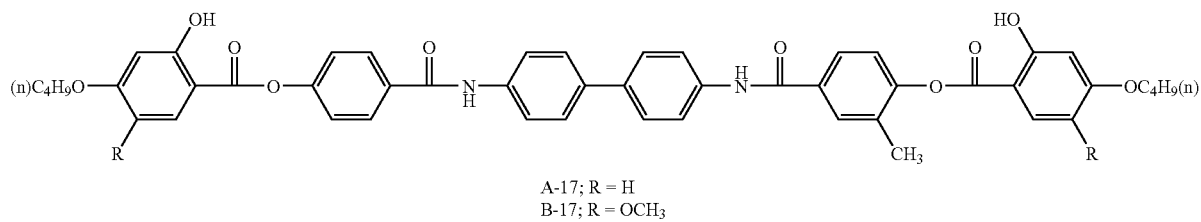
A-17; R = H
B-17; R = OCH₃
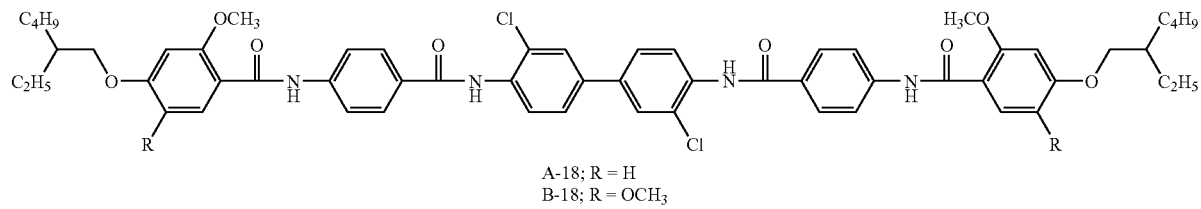
A-18; R = H
B-18; R = OCH₃
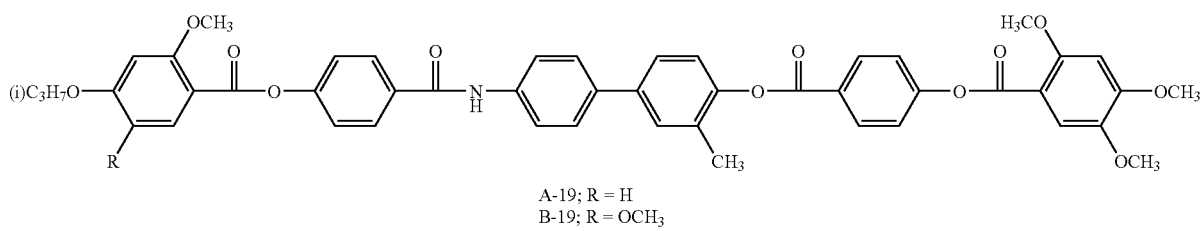
A-19; R = H
B-19; R = OCH₃
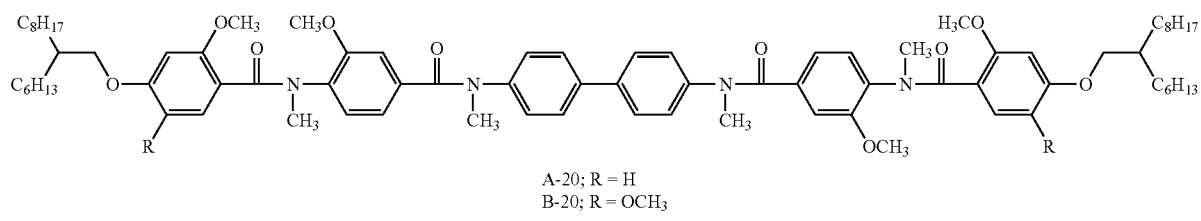
A-20; R = H
B-20; R = OCH₃
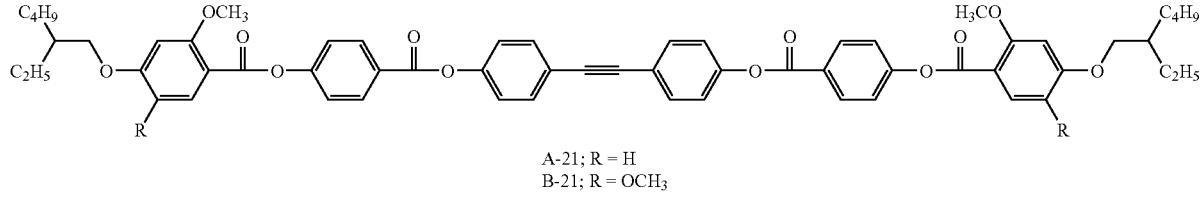
A-21; R = H
B-21; R = OCH₃
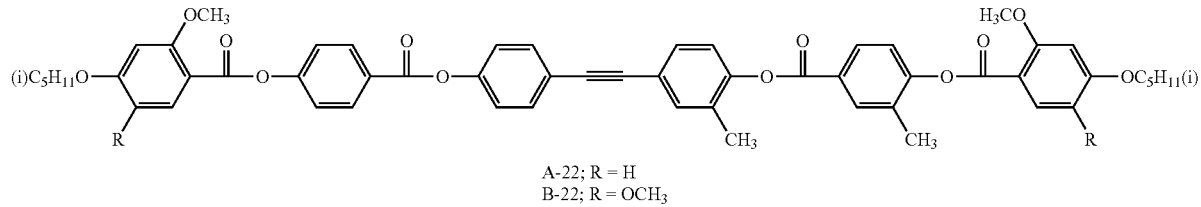
A-22; R = H
B-22; R = OCH₃

-continued
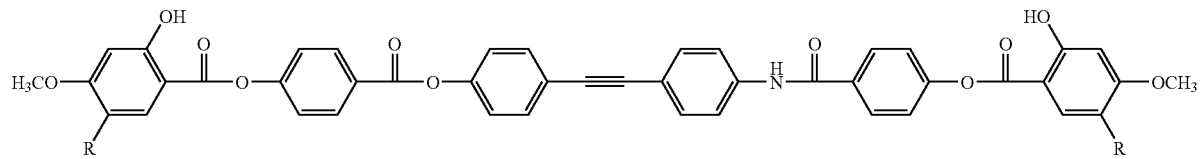
A-23; R = H
B-23; R = OCH₃
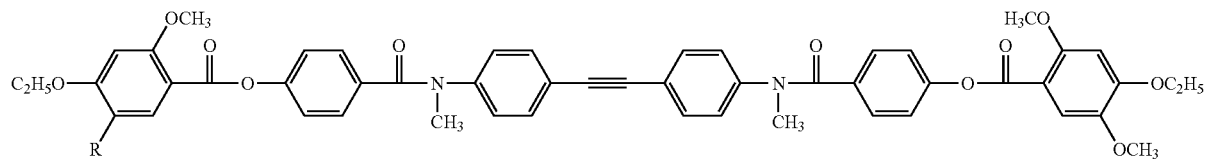
A-24; R = H
B-24; R = OCH₃
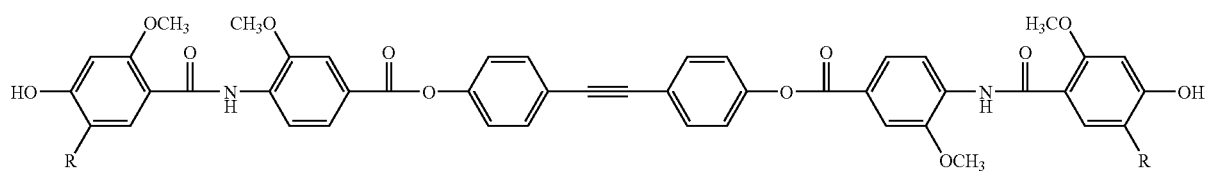
A-25; R = H
B-25; R = OCH₃
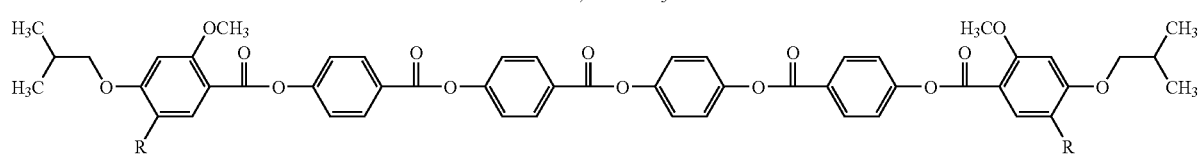
A-26; R = H
B-26; R = OCH₃
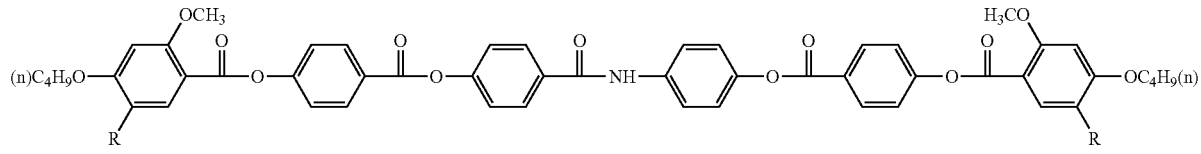
A-27; R = H
B-27; R = OCH₃
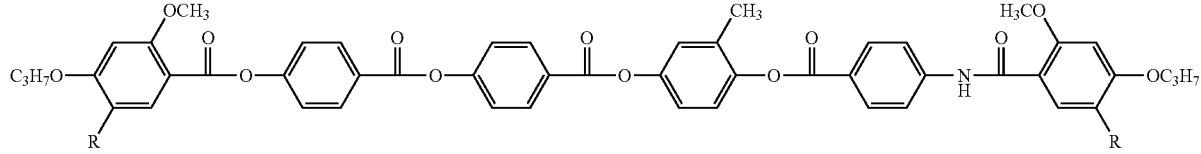
A-28; R = H
B-28; R = OCH₃
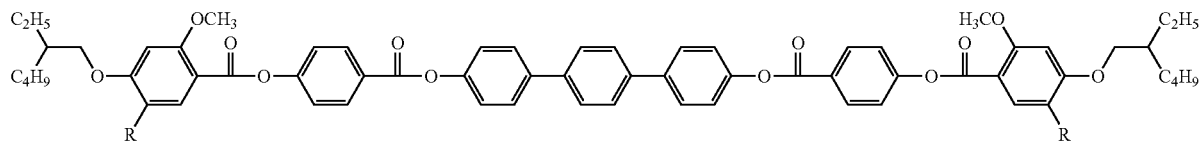
A-29; R = H
B-29; R = OCH₃
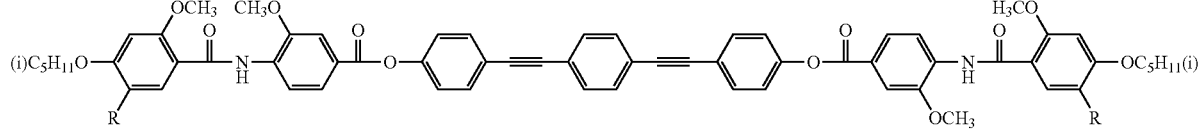
A-30; R = H
B-30; R = OCH₃

-continued
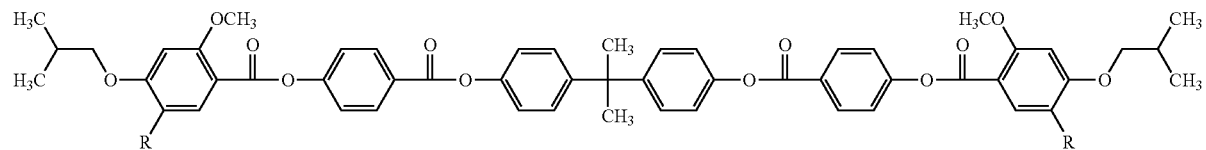
A-31; R = H
B-31; R = OCH₃
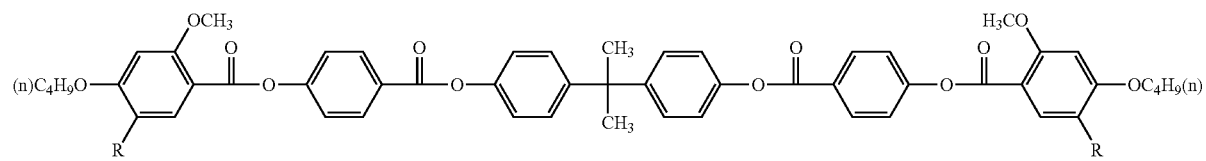
A-32; R = H
B-32; R = OCH₃
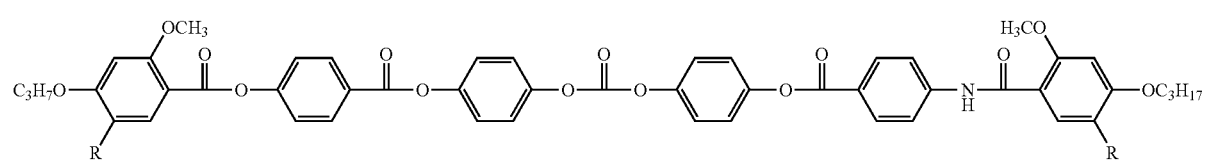
A-33; R = H
B-33; R = OCH₃
C-1
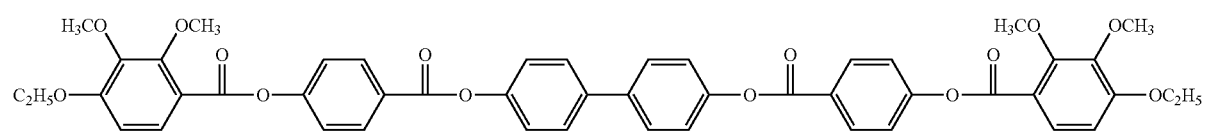
C-2
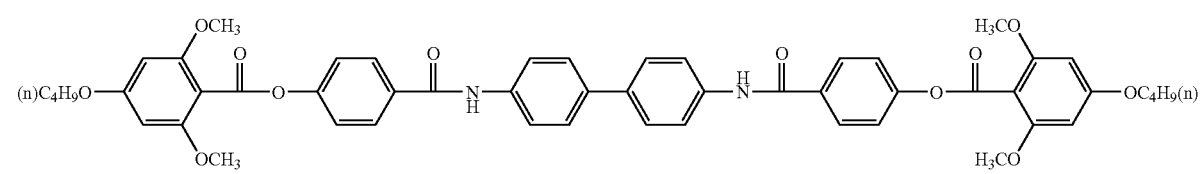
C-3
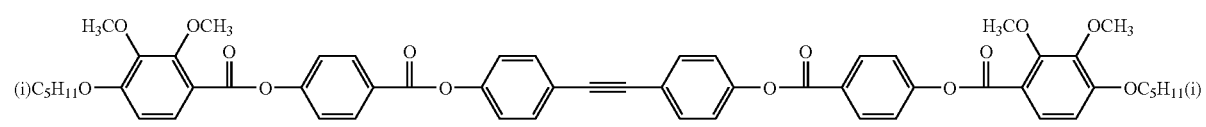
C-4
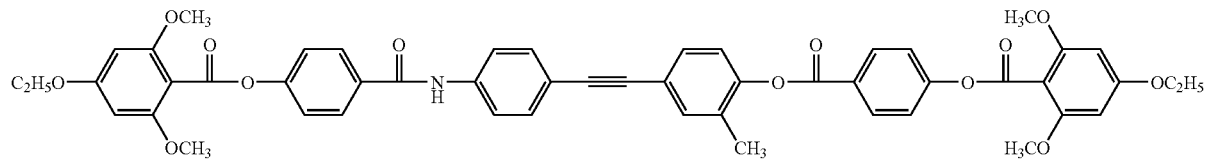
C-5
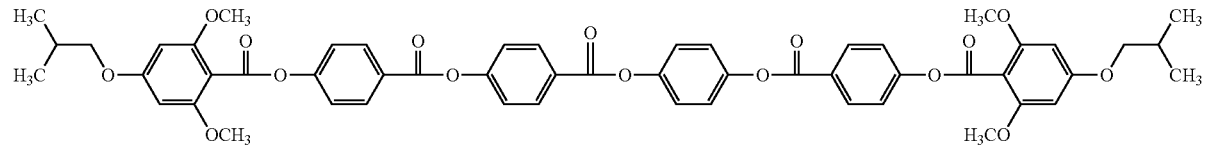

The compound represented by any of formulae (I) to (IV) is also preferred as the retardation developer in the invention. The compounds represented by formulae (I) to (IV) are described in detail below.

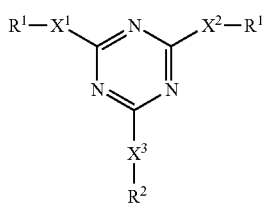

Formula (I)

In formula (I), $R^1$ represents an aromatic ring having a substituent on the ortho- and/or meta-positions, or a heterocyclic ring; $R^2$ represents an aromatic ring having a substituent, or a heterocyclic ring, provided that when $R^1$ represents an aromatic ring having a substituent on the ortho- and/or meta-positions, and $R^2$ represents an aromatic ring having a substituent, $R^1$ and $R^2$ are not the same; $X^1$ represents a single bond or —$NR^3$—; $X^2$ represents a single bond or —$NR^4$—; $X^3$ represents a single bond or —$NR^5$—; and $R^3$, $R^4$ and $R^5$ each independently represents a hydrogen atom, a substituted or unsubstituted alkyl group, alkenyl group, aryl group or heterocyclic group.

More specifically describing, $R^1$ represents an aromatic ring having a substituent on the ortho- and/or meta-positions, or a heterocyclic ring, and $R^2$ represents an aromatic ring having a substituent, or a heterocyclic ring. The aromatic ring represented by $R^1$ and $R^2$ is preferably phenyl or naphthyl, and especially preferably phenyl. The aromatic ring represented by $R^1$ has at least a substituent on the ortho- and/or meta-positions, and the aromatic ring may also have substituents on other positions. The aromatic ring represented by $R^2$ has at least one substituent on any position. The examples of the substituents include a halogen atom, a hydroxyl group, a cyano group, a nitro group, a carboxyl group, an alkyl group, an alkenyl group, an aryl group, an alkoxyl group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group, and an acyl group. When $R^1$ represents an aromatic ring having a substituent on the ortho- and/or meta-positions, and $R^2$ represents an aromatic ring having a substituent, $R^1$ and $R^2$ are not the same. "Not the same" means that they are not the same including the substituents, e.g., the case where the aromatic rings are the same but the substituents are different, and the case where the substituents are the same but the positions-of substitution are different are included in the case of "not the same".

The heterocyclic rings represented by $R^1$ and $R^2$ preferably have aromaticity. Heterocyclic rings having aromaticity are generally unsaturated heterocyclic rings, and preferably they are heterocyclic rings having the most numerous double bonds. The heterocyclic rings are preferably 5-, 6- or 7-membered rings, more preferably 5- or 6-membered rings, and most preferably 6-membered rings. The hetero atom of the heterocyclic rings is preferably a nitrogen atom, a sulfur atom or an oxygen atom, and a nitrogen atom is especially preferred. As the heterocyclic ring having aromaticity, a pyridine ring (as the heterocyclic group, 2-pyridyl or 4-pyridyl) is especially preferred. The heterocyclic group may have a substituent. The examples of the substituents of the heterocyclic group are the same as the examples of the substituents of the above aryl moiety. The heterocyclic group in the case where $X^1$, $X^2$ and $X^3$ each independently represents a single bond is preferably a heterocyclic group having a free valence on the nitrogen atom. The heterocyclic group having a free valence on the nitrogen atom is preferably a 5-, 6- or 7-membered ring, more preferably a 5- or 6-membered ring, and most preferably 5-membered ring. The heterocyclic group may have a plurality of nitrogen atoms. The heterocyclic group may have a hetero atom other than a nitrogen atom (e.g., O, S). The examples of the heterocyclic groups having a free valence on the nitrogen atom are shown below.

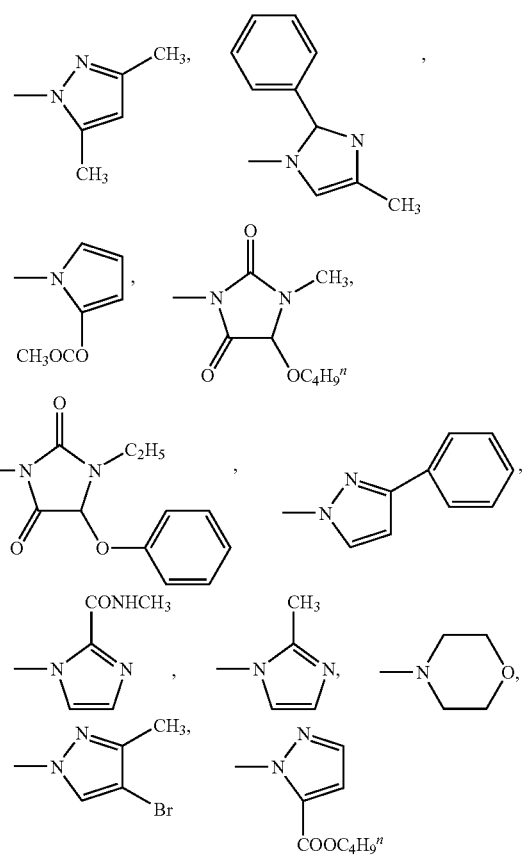

In formula (I), $X^1$ represents a single bond or —$NR^3$—; $X^2$ represents a single bond or —$NR^4$—; $X^3$ represents a single bond or —$NR^5$—; and $R^3$, $R^4$ and $R^5$ each independently represents a hydrogen atom, a substituted or unsubstituted alkyl group, alkenyl group, aryl group or heterocyclic group. The alkyl group represented by $R^3$, $R^4$ and $R^5$ may be a cyclic alkyl group or a chain alkyl group, preferably a chain alkyl group, and a straight chain alkyl group is more preferred to a branched chain alkyl group. The number of carbon atoms of the alkyl group is preferably from 1 to 30, more preferably from 1 to 20, still more preferably from 1 to 10, still yet preferably from 1 to 8, and most preferably from 1 to 6. The alkyl group may have a substituent, and the examples of the substituents include a halogen atom, an alkoxyl group (e.g., methoxy and ethoxy), and an acyloxy group (e.g., acryloyloxy and methacryloyloxy).

The alkenyl group represented by $R^3$, $R^4$ and $R^5$ may be a cyclic alkenyl group or a chain alkenyl group, preferably a chain alkenyl group, and a straight chain alkenyl group is more preferred to a branched chain alkenyl group. The number of carbon atoms of the alkenyl group is preferably from 2 to 30, more preferably from 2 to 20, still more preferably from 2 to 10, still yet preferably from 2 to 8, and most preferably from 2 to 6. The alkenyl group may have a substituent, and the examples of the substituents are the same as the substituents of the alkyl group. The aromatic ring group and the heterocyclic group represented by $R^3$, $R^4$ and $R^5$ are the same as the aromatic ring group and the heterocyclic group represented by $R^1$ and $R^2$, and the preferred ranges are also the same. The aromatic ring group and the heterocyclic group may further have a substituent, and the examples of the substituents are the same as the substituents of the aromatic ring group and the heterocyclic group represented by $R^1$ and $R^2$.

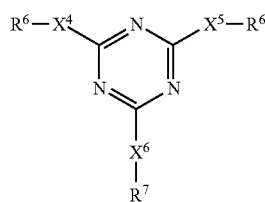

Formula (II)

In formula (II), $R^6$ represents an aromatic ring having a substituent on the para-position, or a heterocyclic ring; $R^7$ represents an aromatic ring having a substituent, or a heterocyclic ring, provided that when $R^6$ represents an aromatic ring having a substituent on the para-position, and $R^7$ represents an aromatic ring having a substituent, $R^6$ and $R^7$ are not the same; $X^4$ represents a single bond or —$NR^{13}$—; $X^5$ represents a single bond or —$NR^{14}$—; $X^6$ represents a single bond or —$NR^{15}$—; and $R^{13}$, $R^{14}$ and $R^{15}$ each independently represents a hydrogen atom, a substituted or unsubstituted alkyl group, alkenyl group, aryl group or heterocyclic group.

The aromatic ring and the heterocyclic ring represented by $R^6$ and $R^7$ are the same as the aromatic ring and the heterocyclic ring represented by $R^1$ and $R^2$ in formula (I), and the preferred ranges are also the same. As the substituents of $R^6$ and $R^7$, the same groups exemplified as the substituents of the aromatic ring group and the heterocyclic group represented by $R^1$ and $R^2$ are exemplified. The aromatic ring represented by $R^6$ has at least a substituent on the para-position, and the aromatic ring may also have substituents on other positions. $R^7$ has at least one substituent on an arbitrary position. When $R^6$ represents an aromatic ring having a substituent on the para-position, and $R^7$ represents an aromatic ring having a substituent, $R^6$ and $R^7$ are not the same. "Not the same" means that they are not the sane including the substituents, e.g., the case where the aromatic rings are the same but the substituents are different, and the case where the substituents are the same but the positions of substitution are different are included in the case of "not the same".

$X^4$ represents a single bond or —$NR^{13}$—; $X^5$ represents a single bond or —$NR^{14}$—; $X^6$ represents a single bond or —$NR^{15}$—; and $R^{13}$, $R^{14}$ and $R^{15}$ each independently represents a hydrogen atom, a substituted or unsubstituted alkyl group, alkenyl group, aryl group or heterocyclic group. The substituted or unsubstituted alkyl group, alkenyl group, aryl group or heterocyclic group represented by $R^{13}$, $R^{14}$ and $R^{15}$ has the same meaning as each group represented by $R^3$, $R^4$ and $R^5$ in formula (I), and the preferred range is also the same.

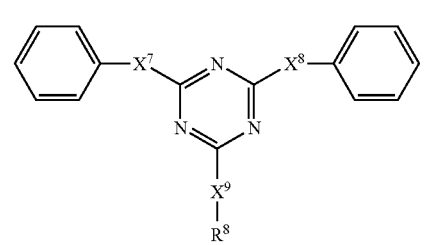

Formula (III)

In formula (III), $R^8$ represents an aromatic ring having a substituent on the ortho- and/or meta-positions, or a heterocyclic ring; $X^7$ represents a single bond or —$NR^{23}$—; $X^8$ represents a single bond or —$NR^{24}$—; $X^9$ represents a single bond or —$NR^{25}$—; and $R^{23}$, $R^{24}$ and $R^{25}$ each independently represents a hydrogen atom, a substituted or unsubstituted alkyl group, alkenyl group, aryl group or heterocyclic group.

The aromatic ring and the heterocyclic ring represented by $R^8$ have the same meaning as the aromatic ring and the heterocyclic ring represented by $R^1$ and $R^2$ in formula (I), and the preferred ranges are also the same. As the substituents, the same groups exemplified as the substituents of the aromatic ring and the heterocyclic ring represented by $R^1$ and $R^2$ are exemplified. The aromatic ring represented by $R^8$ has at least a substituent on the ortho- and/or meta-positions, and the aromatic ring may also have substituents on other positions.

$X^7$ represents a single bond or —$NR^{23}$—; $X^8$ represents a single bond or —$NR^{24}$—; $X^9$ represents a single bond or —$NR^{25}$—; and $R^{23}$, $R^{24}$ and $R^{25}$ each independently represents a hydrogen atom, a substituted or unsubstituted alkyl group, alkenyl group, aryl group or heterocyclic group. The substituted or unsubstituted alkyl group, alkenyl group, aryl group or heterocyclic group represented by $R^{23}$, $R^{24}$ and $R^{25}$ has the same meaning as each group represented by $R^3$, $R^4$ and $R^5$ in formula (I), and the preferred range is also the same.

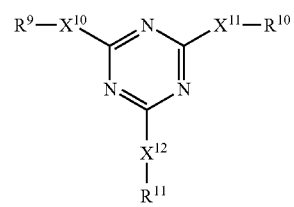

Formula (IV)

In formula (IV), $R^9$, $R^{10}$ and $R^{11}$ each independently represents a different aromatic ring or heterocyclic ring; $X^{10}$ represents a single bond or —$NR^{33}$—; $X^{11}$ represents a single bond or —$NR^{34}$—; $X^{12}$ represents a single bond or —$NR^{35}$—; and $R^{33}$, $R^{34}$ and $R^{35}$ each independently represents a hydrogen atom, a substituted or unsubstituted alkyl group, alkenyl group, aryl group or heterocyclic group.

The aromatic ring and the heterocyclic ring represented by $R^9$, $R^{10}$ and $R^{11}$ have the same meaning as the aromatic ring and the heterocyclic ring represented by $R^1$ and $R^2$ in formula (I), and the preferred ranges are also the same. As the substituents, the same groups exemplified as the substituents of the aromatic ring and the heterocyclic ring represented by $R^1$ and $R^2$ are exemplified. "Different aromatic rings or heterocyclic rings" means that the aromatic rings or heterocyclic rings are not the same including the substituents, e.g., the case where the aromatic rings or heterocyclic rings are the same but the substituents are different, and the case where the substituents are the same but the positions of substitution are different are included in the case of "different aromatic rings or heterocyclic rings".

$X^{10}$ represents a single bond or $-NR^{33}-$; $X^{11}$ represents a single bond or $-NR^{34}-$; $X^{12}$ represents a single bond or $-NR^{35}-$; and $R^{33}$, $R^{34}$ and $R^{35}$ each independently represents a hydrogen atom, a substituted or unsubstituted alkyl group, alkenyl group, aryl group or heterocyclic group. The substituted or unsubstituted alkyl group, alkenyl group, aryl group or heterocyclic group represented by $R^{33}$, $R^{34}$ and $R^{35}$ has the same meaning as each group represented by $R^3$, $R^4$ and $R^5$ in formula (I), and the preferred range is also the same.

The molecular weight of the compounds in the invention is preferably from 300 to 2,000. The boiling point of the compounds in the invention is preferably 260° C. or more. A boiling point can be measured with a commercially available measuring instrument (e.g., TG/DTA100, manufactured by Seiko Instruments Inc.).

The specific examples of the compounds having a 1,3,5-triazine ring in the invention are shown below.

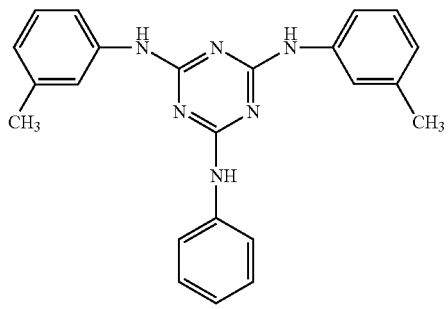

I-(1)

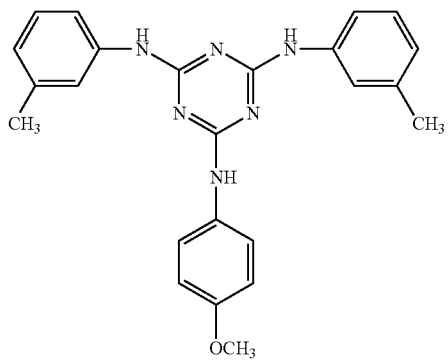

I-(2)

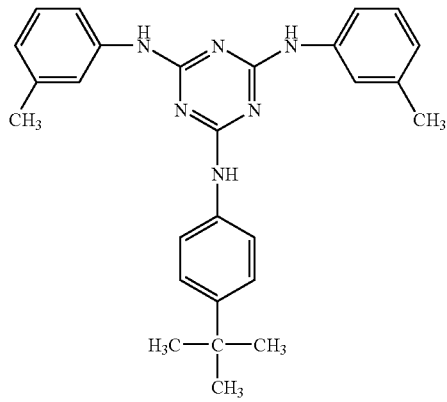

I-(3)

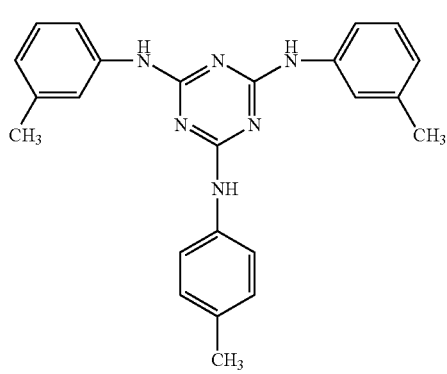

I-(4)

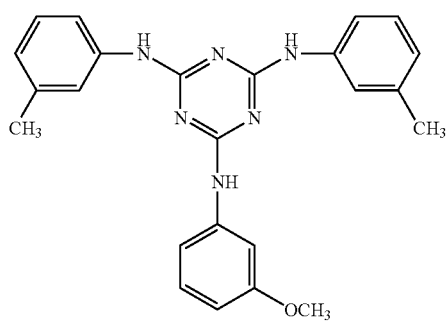

I-(5)

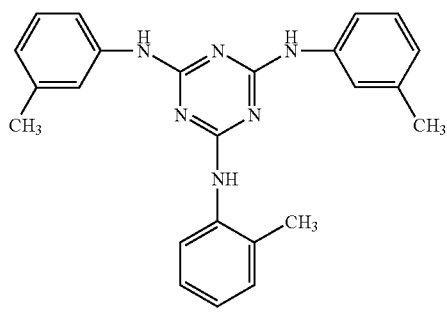

I-(6)

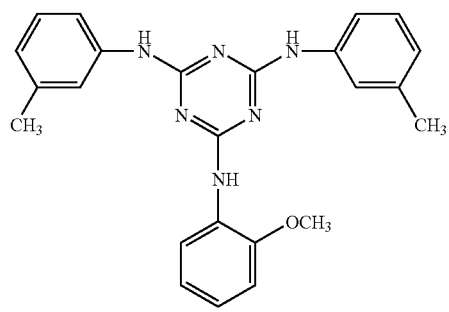
I-(7)
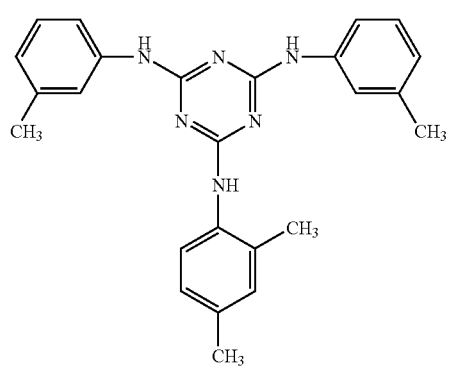
I-(8)
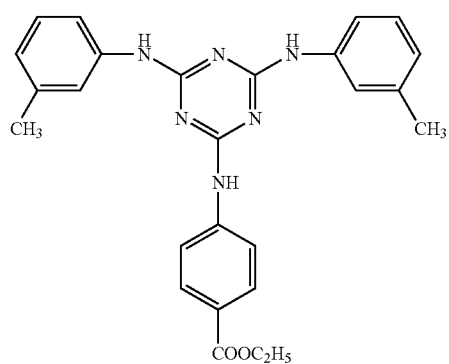
I-(9)
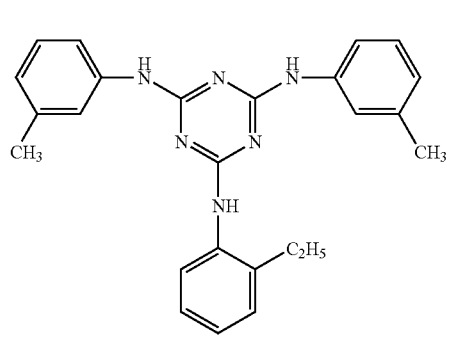
I-(10)
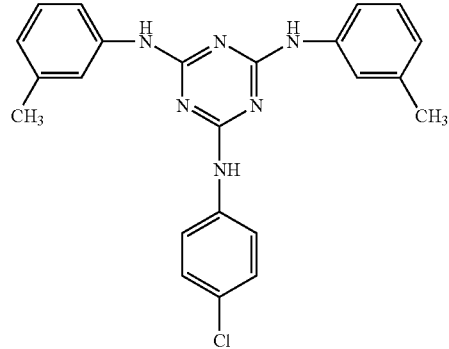
I-(11)
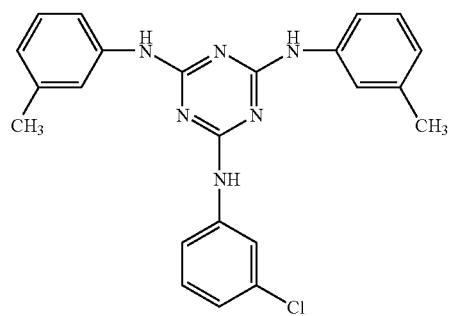
I-(12)
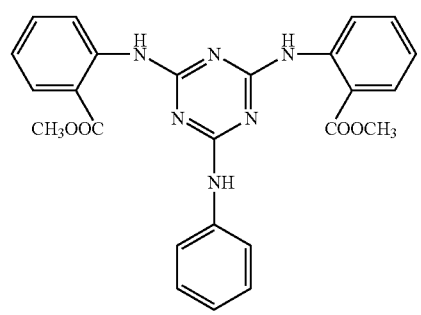
I-(13)
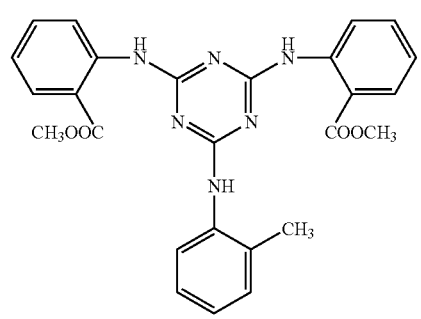
I-(14)
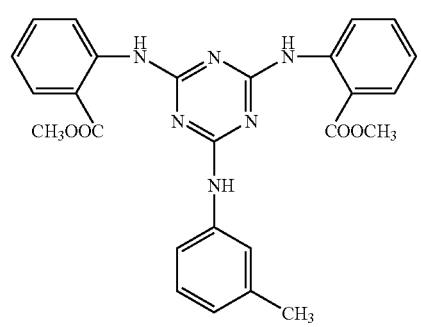
I-(15)

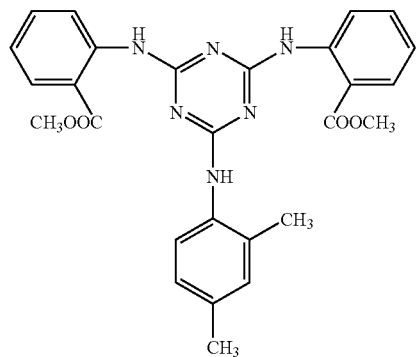
I-(16)
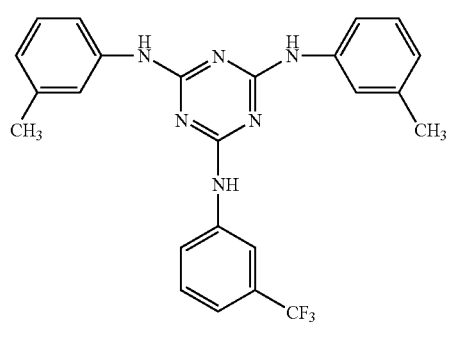
I-(17)
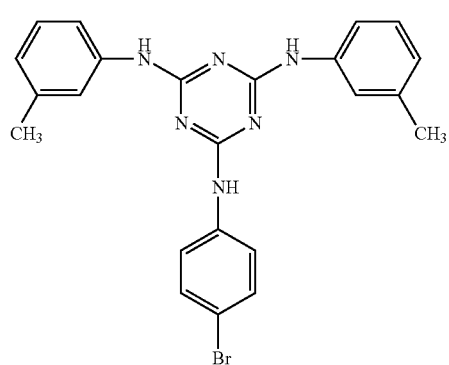
I-(18)
I-(19)
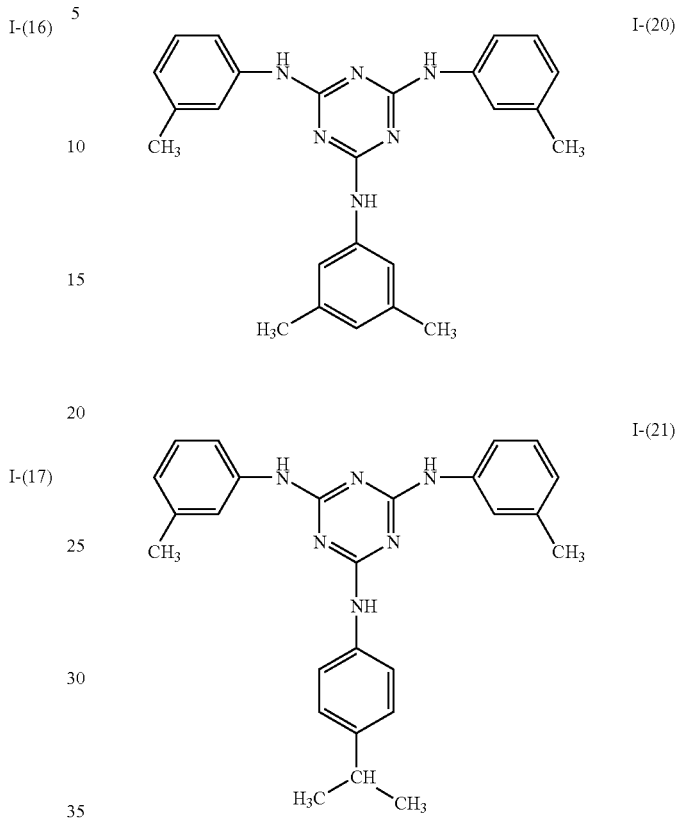
I-(20)
I-(21)
I-(22)
I-(23)

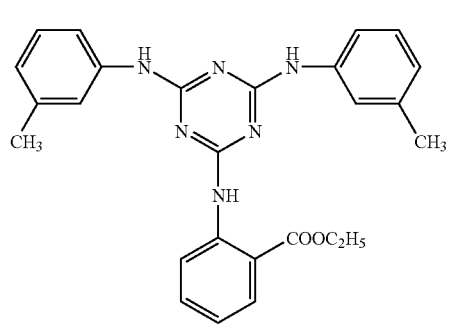
I-(24)
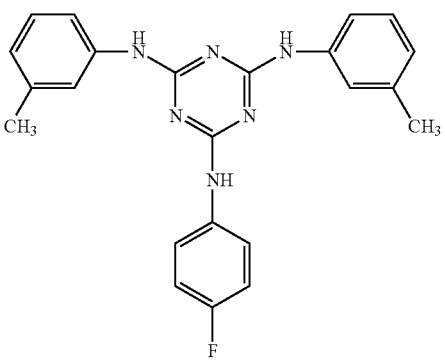
I-(28)
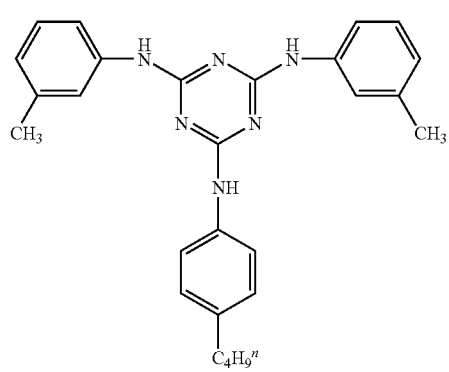
I-(25)
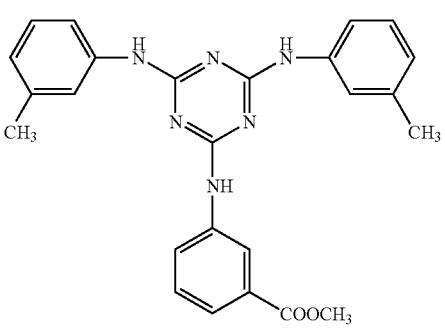
I-(29)
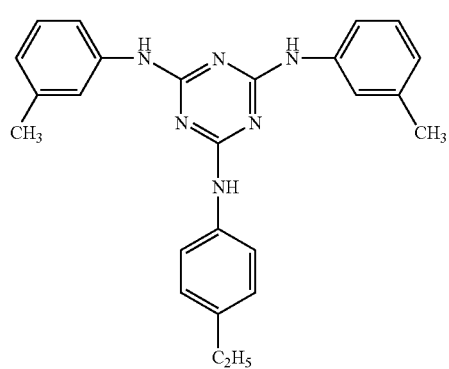
I-(26)
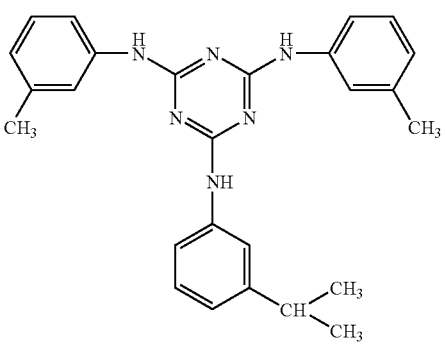
I-(30)
I-(27)
I-(31)

-continued
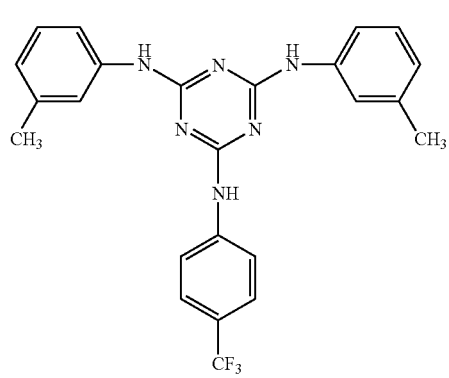
I-(32)
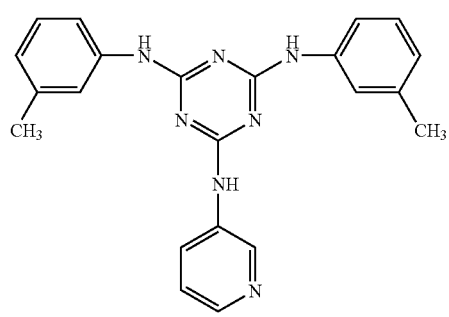
I-(33)
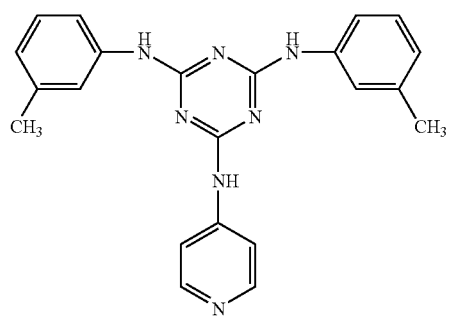
I-(34)
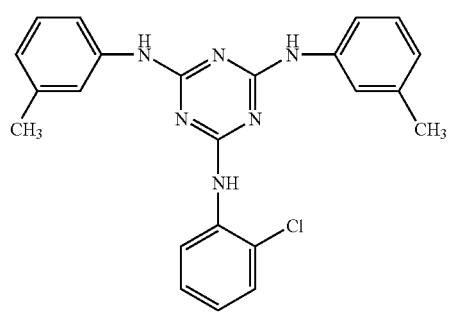
I-(35)
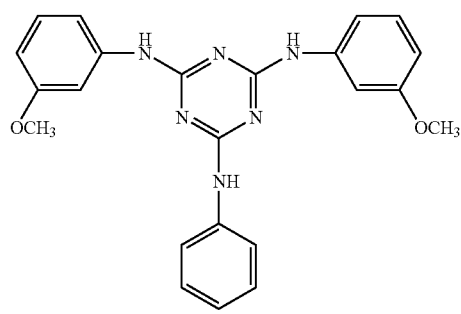
I-(36)
-continued
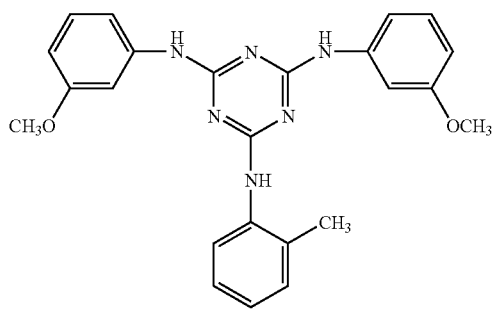
I-(37)
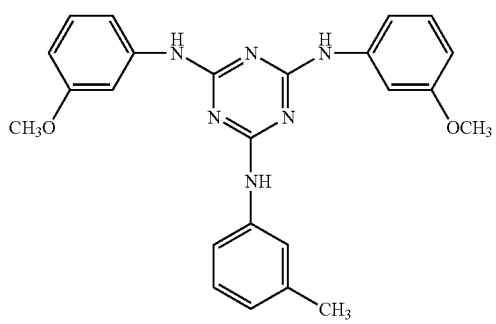
I-(38)
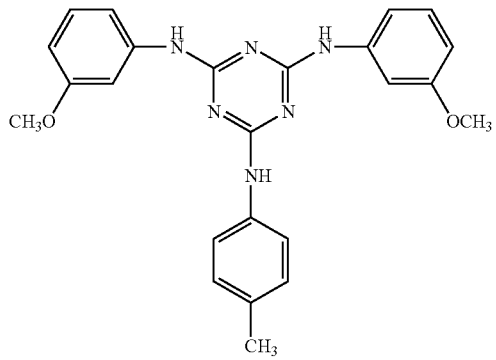
I-(39)
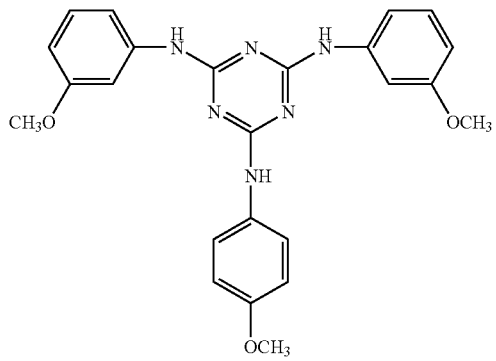
I-(40)

I-(41)
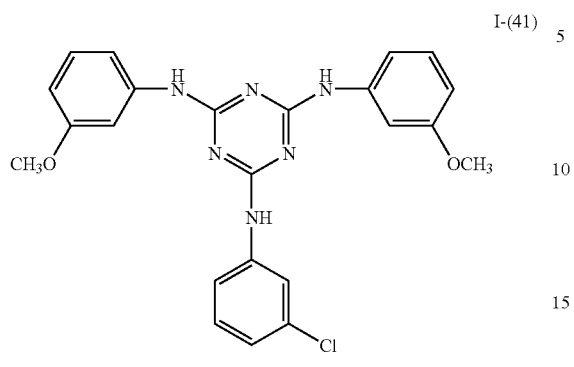
I-(45)
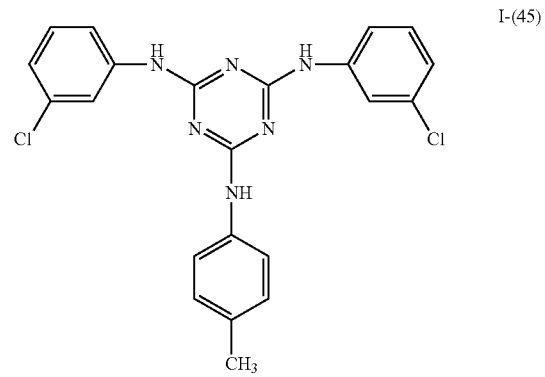
I-(42)
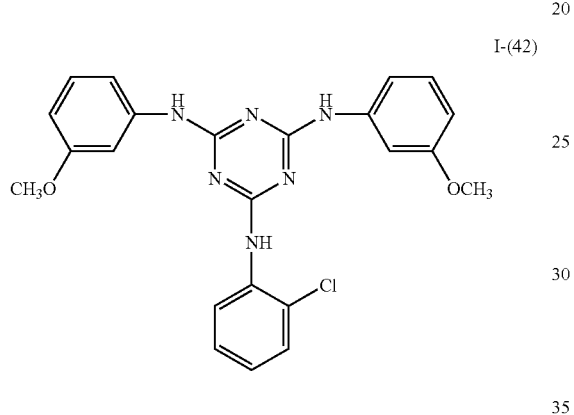
I-(46)
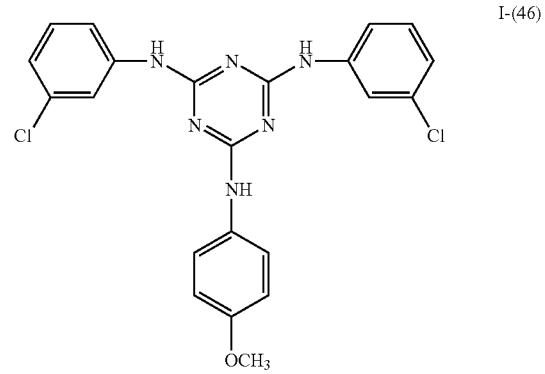
I-(43)
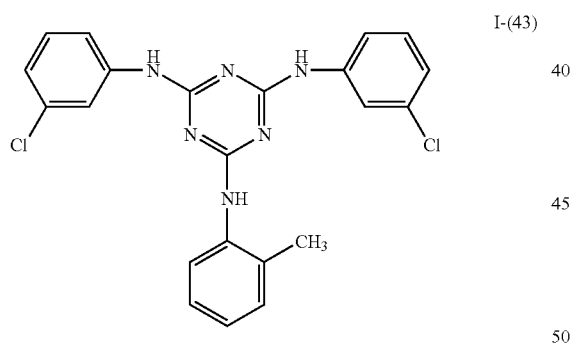
I-(47)
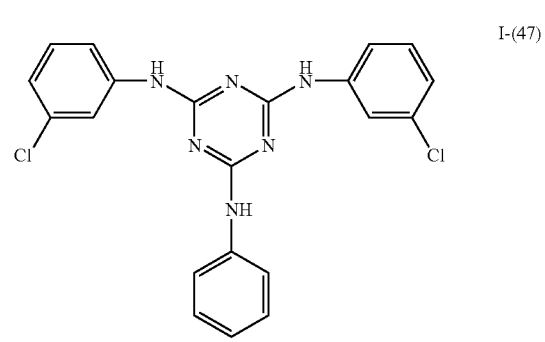
I-(44)
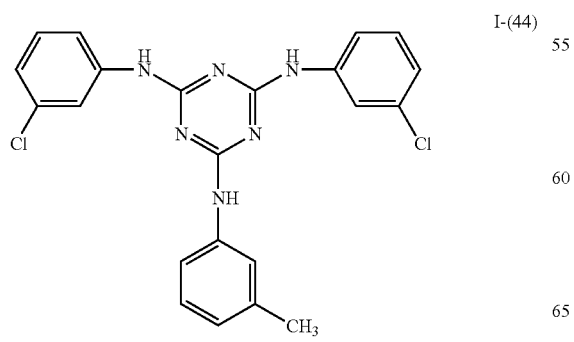
I-(48)
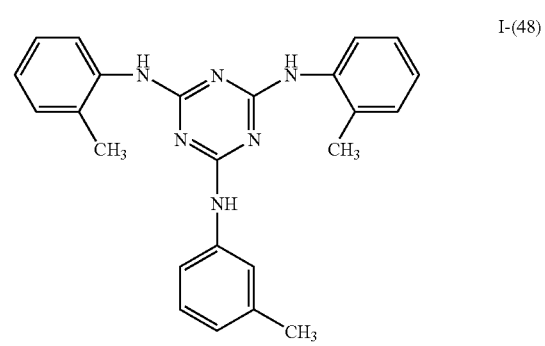

-continued
I-(49)
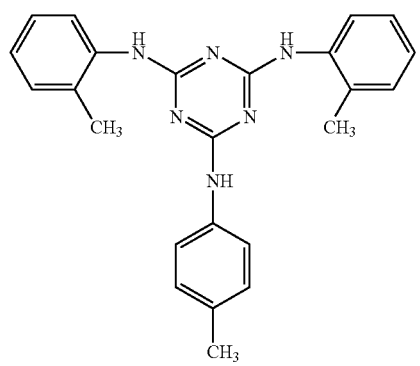
I-(50)
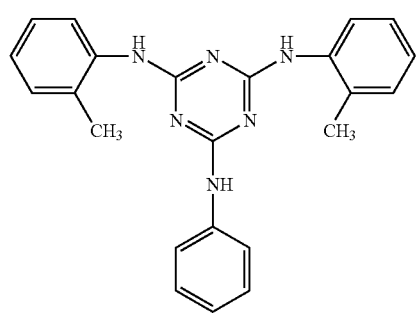
II-(1)
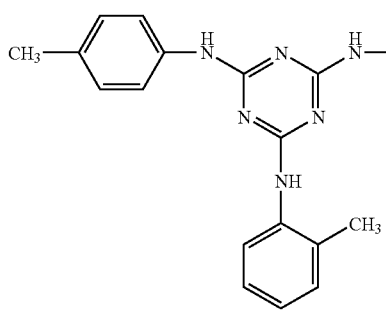
II-(2)
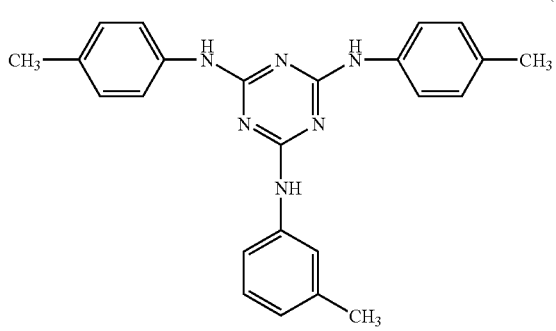
-continued
II-(3)
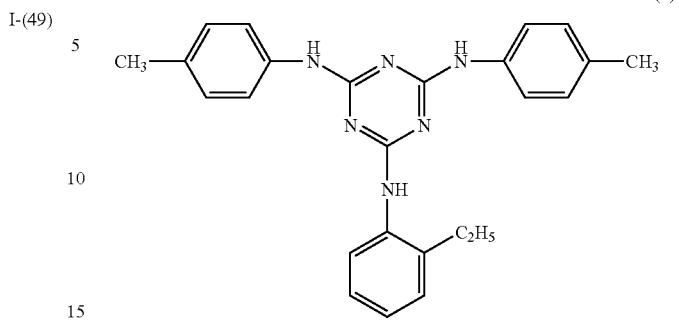
II-(4)
II-(5)
II-(6)
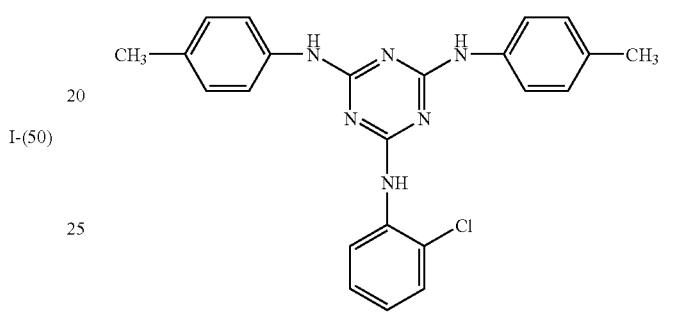
II-(7)
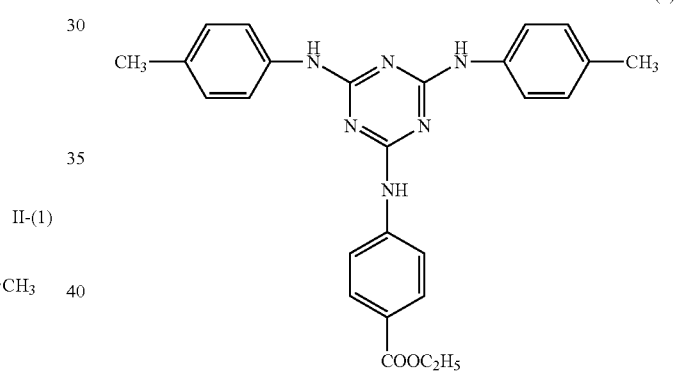

-continued
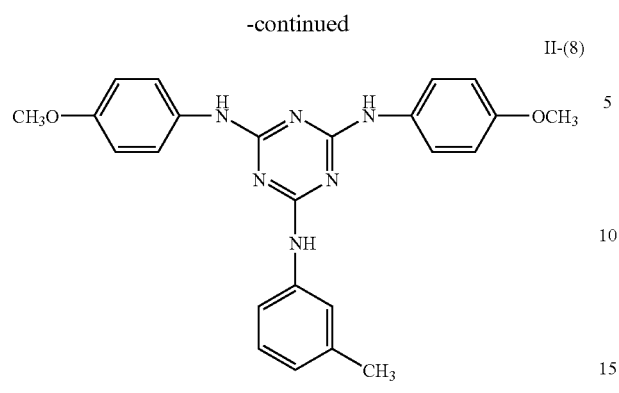
II-(8)
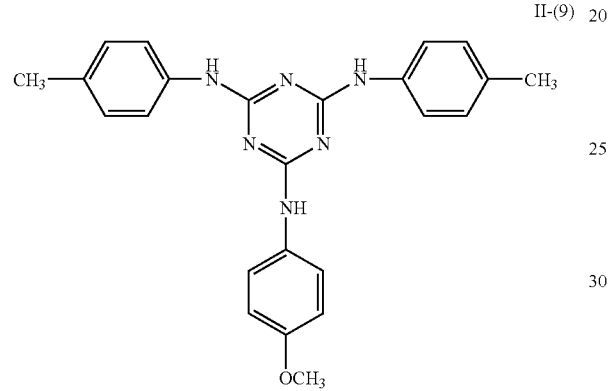
II-(9)
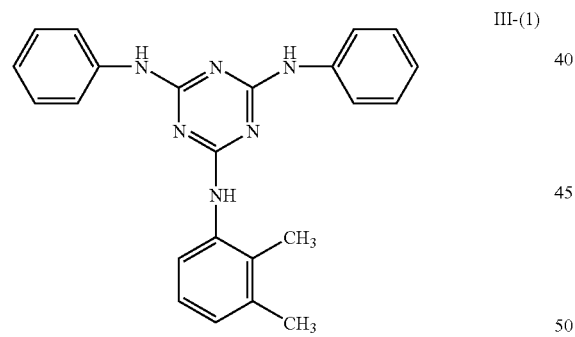
III-(1)
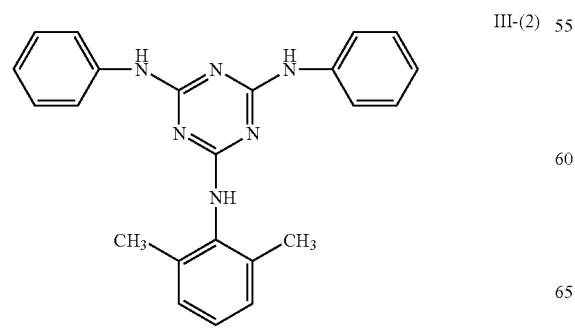
III-(2)
-continued
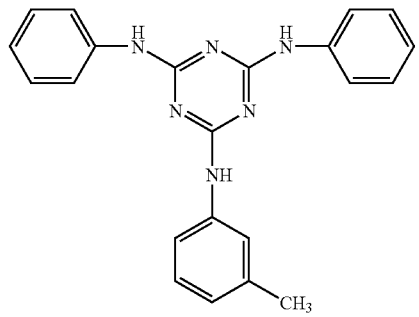
III-(3)
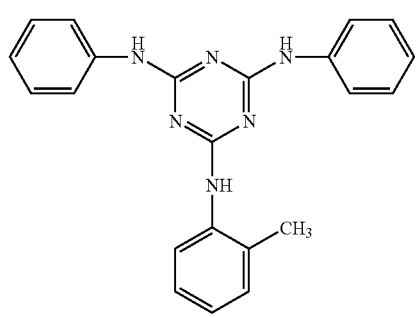
III-(4)
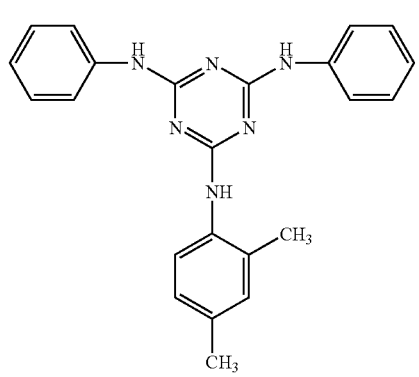
III-(5)
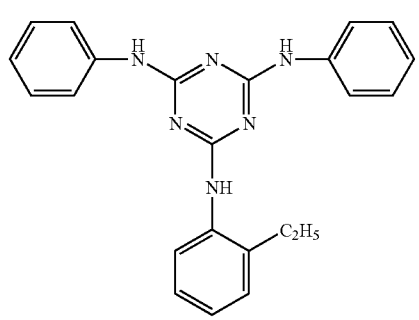
III-(6)
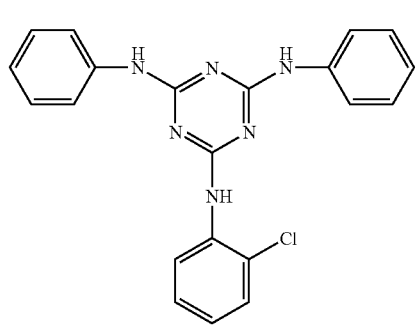
III-(7)

-continued
III-(8)
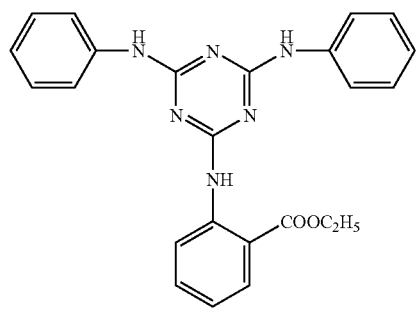
III-(9)
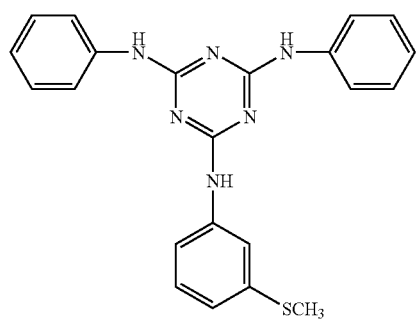
III-(10)
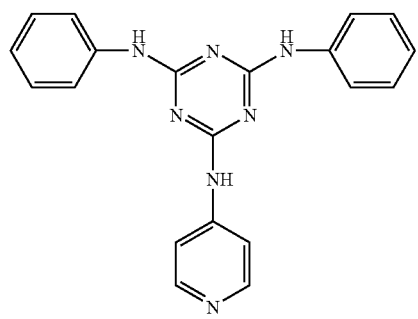
III-(11)
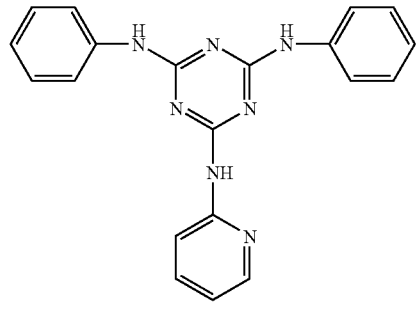
III-(12)
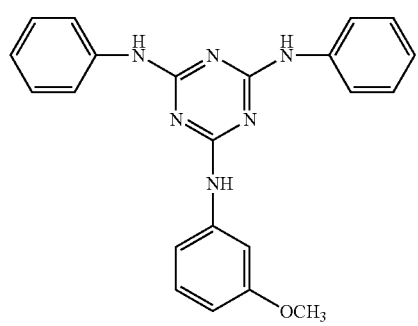
-continued
IV-(1)
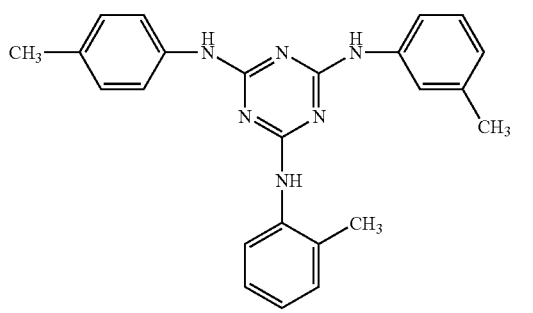
IV-(2)
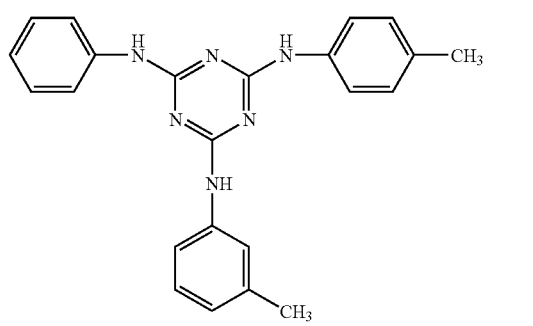
IV-(3)
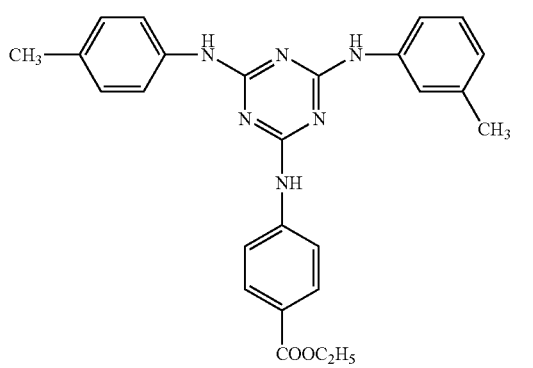
IV-(4)

-continued

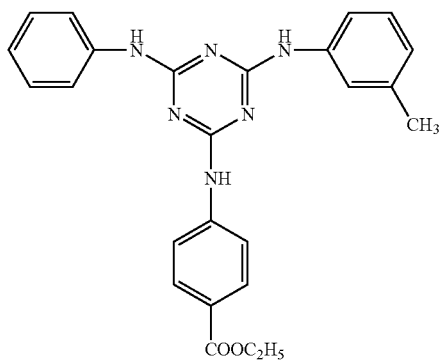
IV-(5)

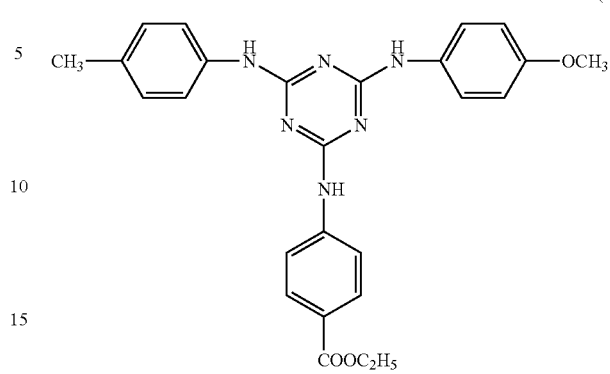
IV-(9)

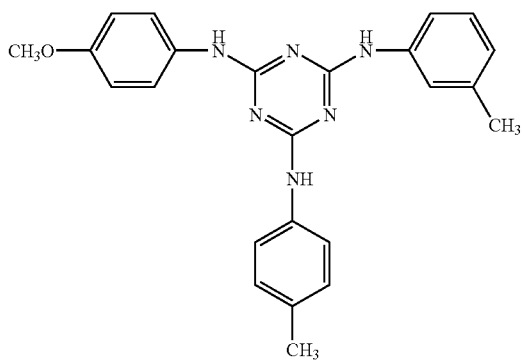
IV-(6)

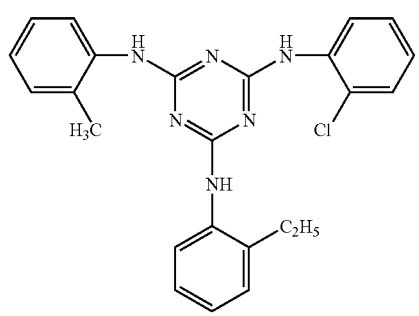
IV-(10)

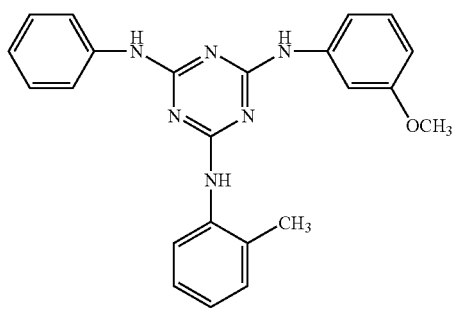
IV-(7)

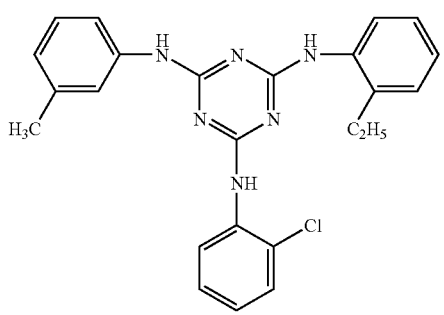
IV-(8)

The compounds disclosed in JP-A-2001-166144 and JP-A-2003-344655 can also be preferably used as retardation developers of the invention.

Cellulose Acylate:

As the material cotton of cellulose acylate for use in the cellulose acylate film in the invention, conventionally known materials can be used (e.g., refer to Hatsumei Kyokai Kokai Giho Kogi No. 2001-1745). The synthesis of cellulose acylate can also be performed according to known methods (Migita, et al., Mokuzai Kagaku (Wood Chemistry), pp. 180-190, Kyoritsu Shuppan Co., Ltd. (1968)). The viscosity average polymerization degree of cellulose acylate is preferably from 300 to 700, more preferably from 350 to 500, and most preferably from 400 to 500.

By making the degree of polymerization greater, the crystallization at the time of manufacture of the cellulose acylate film can be restrained.

The molecular weight distribution Mw/Mn (Mw is a mass average molecular weight and Mn is a number average molecular weight) by gel permeation chromatography of cellulose ester for use in the invention is preferably narrow. The specific value of Mw/Mn is preferably from 1.0 to 5.0, more preferably from 1.5 to 3.5, and most preferably from 2.0 to 3.0.

By making the molecular weight distribution narrower, the crystallization at the time of manufacture of the cellulose acylate film can be restrained.

The acyl group of the cellulose acylate is not especially restricted, but it is preferred to use an acetyl group, a propionyl group or a butyryl group, and an acetyl group is especially preferred. The degree of substitution of all the acyl groups is preferably from 1.5 to 3.0, more preferably from 2.5 to 2.95, and especially preferably from 2.65 to 2.90. The degree of substitution of acyl groups in the specification of the invention is a value computed according to ASTM D817.

The acyl group is most preferably an acetyl group, and when cellulose acetate using acetyl groups as the acyl group is used, the degree of acetylation is preferably from 59.0 to 62.5%, and more preferably from 59.0 to 61.5%. When the degree of acetylation is in this range, Re does not become greater than a desired value by the transporting tension at the time of casting, in-plane fluctuation is little, and the value of retardation hardly fluctuates due to temperature and humidity.

The degree of substitution of acyl group at the 6-position is preferably 0.9 or more from the aspect of restraining the fluctuation of Re and Rth.

Further, in the film comprising a cellulose acylate obtained by substituting the hydroxyl groups of the cellulose with acyl groups having 2 or more carbon atoms, it is preferred to satisfy the following expressions (1) and (2) taking the degree of substitution of acyl group at the 2-position as DS2, the degree of substitution of acyl group at the 3-position as DS3, and the degree of substitution of acyl group at the 6-position as DS6.

$$2.0 \leq DS2+DS3+DS6 \leq 3.0 \quad (1)$$

$$0.310 \leq DS6/(DS2+DS3+DS6) \quad (2)$$

Further, it is preferred that the cellulose acylate comprises a cellulose acylate obtained by substituting the hydroxyl groups of the cellulose with acetyl groups and acyl groups having from 3 to 22 carbon atoms, and the degree of substitution A of the acetyl groups and the degree of substitution B of the acyl groups having from 3 to 22 carbon atoms of the cellulose acylate satisfy the following expression (3):

$$2.0 \leq A+B \leq 3.0 \quad (3)$$

[Manufacture of Cellulose Acylate Film]

In the manufacturing method of the cellulose acylate film in the invention comprising process (1) of casting a dope containing cellulose acylate and an organic solvent on a band or a drum, peeling a cellulose acylate film, and transporting the peeled film, process (2) of holding both ends of the film in the breadth direction, and process (3) of stretching the film in the breadth direction, the cellulose acylate film containing a specified range of residual solvent at the time of beginning of stretching is stretched on the condition of the following expression (4).

$$1\%/\text{min} \leq \text{stretching rate} \leq 50\%/\text{min} \quad (4)$$

The manufacturing method in the invention is described in detail below.

The cellulose acylate film in the invention is manufactured according to a solvent casting method. In the solvent casting method, a film is produced with a solution (a dope) having cellulose acylate dissolved in an organic solvent.

It is preferred for the organic solvent to contain a solvent selected from an ether having from 3 to 12 carbon atoms, a ketone having from 3 to 12 carbon atoms, an ester having from 3 to 12 carbon atoms, and a halogenated hydrocarbon having 1 to 6 carbon atoms.

The ether, the ketone and the ester may each have a cyclic structure. A compound having any two or more of functional groups of the ether, the ketone and the ester (i.e., —O—, —CO—, and —COO—) can be used also as the organic solvent. The organic solvent may have other functional groups such as an alcoholic hydroxyl group. In a case of an organic solvent having two or more functional groups, it is preferred that the number of carbon atoms of the organic solvent is within the above described preferred range of the carbon atom number of the solvent containing any functional group.

The examples of the ethers having from 3 to 12 carbon atoms include diisopropyl ether, dimethoxymethane, dimethoxyethane, 1,4-dioxane, 1,3-dioxolan, tetrahydrofuran, anisole, and phenetole.

The examples of the ketones having from 3 to 12 carbon atoms include acetone, methyl ethyl ketone, diethyl ketone, diisobutyl ketone, cyclohexanone, and methylcyclohexanone.

The examples of the esters having from 3 to 12 carbon atoms include ethyl formate, propyl formate, pentyl formate, methyl acetate, ethyl acetate, and pentyl acetate.

The examples of the organic solvents containing two or more kinds of functional groups include 2-ethoxyethyl acetate, 2-methoxyethanol, and 2-butoxyethanol.

The number of carbon atoms of the halogenated hydrocarbon is preferably 1 or 2, and most preferably 1. The halogen of the halogenated hydrocarbon is preferably chlorine. The proportion of the hydrogen atoms of the halogenated hydrocarbon substituted with the halogen is preferably from 25 to 75 mol %, more preferably from 30 to 70 mol %, still more preferably from 35 to 65 mol %, and most preferably from 40 to 60 mol %. Methylene chloride is a representative halogenated hydrocarbon.

As the organic solvent in the invention, it is preferred to use methylene chloride and an alcohol as mixture. The ratio of the alcohol to the methylene chloride is preferably from 1 to 50 mass %, more preferably from 10 to 40 mass %, and most preferably from 12 to 30 mass %. As the alcohol, methanol, ethanol, and n-butanol are preferred, and a mixture of two or more kinds of alcohols may be used.

A cellulose acylate solution can be prepared according to ordinary methods including the treatment at a temperature of 0° C. or higher (ordinary temperature or a high temperature). In the preparation of the solution, preparation methods of dopes and devices in ordinary solvent casting methods can be used. Further, in the case of ordinary methods, it is preferred to use halogenated hydrocarbon (especially, methylene chloride) as the organic solvent.

The amount of cellulose acylate is preferably adjusted so that it is contained in an amount of from 10 to 40 mass % in the solution to be obtained. The amount of the cellulose acylate is more preferably from 10 to 30 mass %. An arbitrary additive as described later may be added beforehand in the organic solvent (a main solvent).

A cellulose acylate solution can be prepared by stirring cellulose acylate and an organic solvent at ordinary temperature (from 0 to 40° C.). A solution in high concentration may be stirred under pressurizing and heating conditions. Specifically, the cellulose acylate and the organic solvent are put in a pressure vessel, sealing the vessel, and then the mixture is stirred under pressure with heating at a temperature in the range of from the boiling point of the solvent at ordinary temperature to a temperature at which the solvent is not boiled.

The heating temperature is generally 40° C. or higher, preferably from 60 to 200° C., and more preferably from 80 to 110° C.

The components may be previously roughly mixed and then put in a vessel, or alternatively they may be successively put in the vessel. It is necessary that the vessel should be constructed so that stirring can be achieved. The vessel can be pressurized by the injection of inert gas such as nitrogen gas. Further, the increase in vapor pressure of the solvent due to heating may be utilized. Alternatively, the components may be added under pressure after sealing the vessel.

In the case of heating, it is preferred to perform heating from the outside of the vessel. For example, a jacket-type heating device can be used. Further, it is possible to heat the entire vessel by installing a plate heater outside the vessel, piping and circulating a liquid.

It is preferred to provide a stirring blade inside the vessel and perform stirring with the blade. A stirring blade of a length reaching the vicinity of the wall of the vessel is preferred. It is preferred that the tip of a stirring blade is equipped with a scraping blade for renewing a liquid film on the wall of the vessel.

The vessel may be equipped with measuring instruments such as a pressure gauge and a thermometer. Each component is dissolved in a solvent within the vessel. A dope prepared is cooled and then taken out of the vessel, or a dope is taken out of the vessel and then cooled with a heat exchanger, etc.

A solution can also be prepared by a dissolution method under cooling. According to the dissolution method under cooling, cellulose acylate can be dissolved even in an organic solvent that can hardly dissolve cellulose acylate by ordinary dissolution methods. Further, the dissolution method under cooling has an effect of capable of rapidly obtaining a homogeneous solution even with a solvent that can dissolve cellulose acylate according to ordinary dissolution methods.

In the dissolution method under cooling, in the first place, cellulose acylate is added to an organic solvent at room temperature while stirring little by little. It is preferred to adjust the amount of the cellulose acylate to be contained in the mixture in an amount of from 10 to 40 mass %. The amount of the cellulose acylate is more preferably from 10 to 30 mass %. In addition, arbitrary additives as described later may be added in the mixture beforehand.

In the next place, the mixture is cooled to from $-100$ to $-10°$ C., preferably from $-80$ to $-10°$ C., more preferably from $-50$ to $-20°$ C., and most preferably from $-50$ to $-30°$ C. The cooling can be carried out in, e.g., a dry ice-methanol bath (at $-75°$ C.) or a cooled diethylene glycol solution (at from $-30$ to $-20°$ C.). By cooling, the mixture of the cellulose acylate and the organic solvent is solidified.

The cooling rate is preferably $4°$ C./min or more, more preferably $8°$ C./min or more, and most preferably $12°$ C./min or more. It is preferred that the cooling rate is fast as far as possible. However, $10,000°$ C./sec is the theoretical least upper bound, $1,000°$ C./sec is the technical least upper bound, and $100°$ C./sec is the practicable least upper bound. Further, the cooling rate is a value obtained by dividing the difference between the temperature at the time of the beginning of cooling and the final cooling temperature by the time required to reach the final cooling temperature from the beginning of cooling.

Further, when the solid is heated to from 0 to $200°$ C., preferably from 0 to $150°$ C., more preferably from 0 to $120°$ C., and most preferably from 0 to $50°$ C., the cellulose acylate is dissolved in the organic solvent. Temperature rise may be achieved by allowing it to stand at room temperature or by heating it in a warm bath.

The heating rate is preferably $4°$ C./min or more, more preferably $8°$ C./min or more, and most preferably $12°$ C./min or more. It is preferred that the heating rate is fast as far as possible. However, $10,000°$ C./sec is the theoretical least upper bound, $1,000°$ C./sec is the technical least upper bound, and $100°$ C./sec is the practicable least upper bound. Further, the heating rate is a value obtained by dividing the difference between the temperature at the time of the beginning of heating and the final heating temperature by the time required to reach the final heating temperature from the beginning of heating.

Thus, a homogeneous solution can be obtained. Further, when dissolution is insufficient, the procedure of cooling and heating may be repeated. Whether dissolution is sufficient or not can be judged only with visual observation of the appearance of the solution.

In the dissolution method under cooling, in order to avoid the incorporation of water due to dew condensation at the time of cooling, it is preferred to use a closed vessel. Further, in cooling and heating procedure, when pressurization is carried out at the time of cooling and pressure reduction is carried out at the time of heating, the dissolution can be expedited. In performing the pressurization and pressure reduction, it is preferred to use a pressure vessel.

In a 20 mass % solution of cellulose acetate (degree of acetylation: 60.9%, viscosity average polymerization degree: 299) dissolved in methyl acetate by the dissolution method under cooling, according to the measurement with a differential scanning calorimeter (DSC), a pseudo phase transition temperature between a sol state and a gel state is present in the vicinity of $33°$ C., and the solution becomes a homogeneous gel state at a temperature not higher than this temperature. Accordingly, the solution should be maintained at a temperature of the pseudo phase transition temperature or higher, and preferably at a temperature of gel phase transition temperature plus $10°$ C. or so. However, the pseudo phase transition temperature varies depending upon the degree of acetylation, the viscosity average polymerization degree and the solution concentration of cellulose acetate and organic solvents to be used.

A cellulose acylate film is manufactured from the prepared cellulose acylate solution (the dope) by a solvent casting method. It is preferred to add a retardation developer to the dope.

The dope is cast on a drum or a band, and the solvent is vaporized to form a film. It is preferred to adjust the concentration of the dope before casting to solids content of from 18 to 35%. It is preferred to finish beforehand the surface of the drum or the band specularly. It is preferred to cast the dope on the drum or the band of a surface temperature of $10°$ C. or lower.

Drying methods in the solvent casting method are disclosed in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554, JP-B-49-5614, JP-A-60-176834, JP-A-60-203430, and JP-A-62-115035. Drying on a band or a drum can be performed by blowing air or inert gas such as nitrogen.

It is preferred to perform drying of the cellulose acylate film of the invention on a band or a drum at a low temperature as far as possible. The drying temperature at the time of the residual solvent amount of 10 wt % or more is preferably $150°$ C. or less, more preferably $120°$ C. or less, and most preferably $90°$ C. or less.

By performing drying in the above range, the formation of crystallite in the film can be decreased.

It is possible to form a film by casting two or more layers with the prepared cellulose acylate solution (dope). In this case, it is preferred to prepare the cellulose acylate film by the solvent casting method. The dope is cast on a drum or a bad, and the solvent is vaporized to form a film. It is preferred to adjust the concentration of the dope before casting to solids content of from 10 to 40%. It is preferred to finish beforehand the surface of the drum or band specularly.

In the case of casting a plurality of cellulose acylate solutions of two or more layers, solutions containing cellulose acylate may be cast respectively from a plurality of casting nozzles provided at intervals in the advancing direction of a support capable of casting a plurality of cellulose acylate solutions to prepare a film by lamination. For example, the methods as disclosed in JP-A-61-158414, JP-A-1-122419, and JP-A-11-198285 can be used. Further, cellulose acylate solutions can also be cast from two casting nozzles to thereby form a film. For example, the methods as disclosed in JP-B-60-27562, JP-A-61-94724, JP-A-61-947245, JP-A-61-104813, JP-A-61-158413, and JP-A-6-134933 can be used. It is also possible to use a casting method of a cellulose acylate film by enveloping the flow of a high-viscosity cellulose acylate solution in a low-viscosity cellulose acylate solution and simultaneously extruding the high-viscosity and low-viscosity cellulose acylate solutions, as disclosed in JP-A-56-162617.

Further, a film can also be prepared according to a method of using two casting nozzles by peeling a film as molded on a support from a first casting nozzle and then performing second casting on the side of the film having been in contact with the support surface. For example, the method as described in JP-B-44-20235 is exemplified.

As the cellulose acylate solutions to be cast, the same solution may be used, or different cellulose acylate solutions may be used. For imparting functions to a plurality of cellulose acylate layers, cellulose acylate solutions corresponding to the functions may be extruded from respective casting nozzles. Further, the cellulose acylate solutions of the invention can be cast at the same time with other functional layers (e.g., an adhesive layer, a dying layer, an antistatic layer, an antihalation layer, an ultraviolet absorbing layer, a polarizing layer, etc.).

In conventional single layer solutions, it is necessary to extrude a highly viscous cellulose acylate solution in high concentration for the purpose of attaining a necessary film thickness. In that case, there often occurs a problem that solids are generated due to poor stability of the cellulose acylate solution, which causes graininess or failure of flatness. As a method for solving this problem, by casting a plurality of cellulose acylate solutions from casting nozzles, highly viscous solutions can be extruded-on a support at-the same time, therefore, not only the flatness is improved and an excellent planar film can be prepared, but also drying load can be reduced by the use of the concentrated cellulose acylate solutions and the production speed of a film can be raised.

[Stretching Treatment]

The stretching direction of the cellulose acylate film in the invention may be any of the cross direction or the machine direction, but stretching in the cross direction is especially preferred.

Methods for stretching in the cross direction is disclosed in, e.g., JP-A-62-115035, JP-A-4-152125, JP-A-4-284211, JP-A-4-298310, and JP-A-11-48271. In the case of stretching in the machine direction, for example, by adjusting the rate of carrying rollers of a film and making a winding rate faster than a peeling rate, the film is stretched. In the case of stretching in the cross direction, a film can be also stretched by carrying the film while holding its width with a tenter and widening the width of the tenter little by little. It is also possible to stretch a film after drying with a stretching machine (preferably by monoaxial stretching using a long stretching machine).

It is preferred that the cellulose acylate film in the invention is stretched at not higher than a specific content of a residual solvent and at a specific stretching rate. The residual content of the solvent at the time of beginning of stretching is from 1 to 40 mass %, preferably from 1 to 30 mass %, and more preferably from 1 to 25 mass %.

The stretching temperature is preferably (the glass transition temperature of the film+20° C.) or less, and more preferably (the glass transition temperature of the film+10° C.) or less.

By performing stretching at the above residual solvent content, the advancement of crystallization during stretching treatment can be restrained.

The stretching magnification of a film is preferably from 1 to 100%, and more preferably from 5 to 90%. Incidentally, the stretching magnification of a film in the invention means the value obtained according to the following expression (5):

$$[(\text{Dimension after stretching/dimension before stretching})-1] \times 100(\%) \quad (5)$$

Crystallization Index:

The crystallization index of the cellulose acylate film in the invention is defined in accordance with the following expression (A) based on the X-ray diffraction intensity measurement.

$$\text{Crystallization index} = (\text{X-ray diffraction intensity at } 2\theta \text{ of } 27°)/(\text{X-ray diffraction intensity at } 2\theta \text{ of } 25°) \quad (A)$$

The terms "X-ray diffraction intensity at $2\theta$ of 27°" and "X-ray diffraction intensity at $2\theta$ of 25°" here mean respectively the X-ray diffraction intensity based on the crystallized area and the X-ray diffraction intensity based on the (amorphous area+crystallized area). Therefore, the value of (X-ray diffraction intensity at $2\theta$ of 27°)/(X-ray diffraction intensity at $2\theta$ of 25°) can be taken as a value proportional to the content of crystallites, i.e., the crystallization index.

The crystallization index of the stretched cellulose acylate film of the invention is from 0.70 to 1.02, preferably from 0.75 to 0.95, and more preferably from 0.80 to 0.90.

The crystallization index of the cellulose acylate film before stretching of the invention is preferably from 0.70 to 1.00, more preferably from 0.75 to 0.95, and most preferably from 0.80 to 0.90.

By controlling the crystallization index of a cellulose acylate film before stretching in the above range, orientation hindrance of the cellulose acylate molecular chains due to crystallites at the time of stretching can be decreased, the degree of orientation of a stretched cellulose acylate film can be improved, the Re retardation of a stretched cellulose acylate film can be sharply enlarged, and a stretched cellulose acylate film having high retardation and a high Re/Rth ratio can be provided.

Plasticizer:

In order to improve mechanical physical properties or better a drying rate, plasticizers can be used in the cellulose acylate film. As the plasticizer, phosphoric acid esters and carboxylic acid esters are used. The examples of the phosphoric acid esters include triphenyl phosphate (TPP), biphenyl phosphate and tricresyl phosphate (TCP). As the carboxylic acid esters, phthalic acid esters and citric acid esters are representative. The examples of the phthalic acid esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). The examples of the citric acid esters include triethyl O-acetylcitrate (OACTE) and tributyl O-acetylcitrate (OACTB). The examples of other carboxylic acid esters include butyl oleate, methylacetyl licinoleate, dibutyl sebacate, and a variety of trimellitic acid esters. Phthalic acid ester based plasticizers (e.g., DMP, DEP, DBP, DOP, DPP, and DEHP) are preferably used. DEP and DPP are especially preferred.

The addition amount of plasticizers is preferably from 0.1 to 25 mass % of the amount of the cellulose ester, more preferably from 1 to 20 mass %, and most preferably from 3 to 15 mass %.

Ultraviolet Absorber:

The cellulose acylate film of the invention may contain an ultraviolet absorber.

As the ultraviolet absorbers, e.g., oxybenzophenone compounds, benzotriazole compounds, salicylic acid ester compounds, benzophenone compounds, cyano acrylate compounds, and nickel complex salt compounds can be exemplified, and of these compounds, benzotriazole compounds less in coloration are preferred. Besides these compounds, the ultraviolet absorbers disclosed in JP-A-10-182621 and JP-A-8-337574, and high molecular ultraviolet absorbers disclosed in JP-A-6-148430 are also preferably used. When the cellulose acylate film in the invention is used as the protective film of a polarizing plate, ultraviolet absorbers excellent in absorption of ultraviolet rays of wavelengths of 370 nm or lower are preferably used in view of the prevention of degradation of a polarizer and liquid crystal, and ultraviolet absorbers having less absorption of visible rays of wavelengths of 400 nm or higher are preferably used in the light of liquid crystal display properties.

The specific examples of the benzotriazole ultraviolet absorbers useful in the invention include 2-(2'-hydroxy-5'-methylphenyl)benzotriazole, 2-(2'-hydroxy-3',5'-di-t-butyl-phenyl)benzotriazole, 2-(2'-hydroxy-3'-t-butyl-5'-methyl-phenyl)benzotriazole, 2-(2'-hydroxy-3',5'-di-t-butyl-phenyl)-5-chlorobenzothiazole, 2-[2'-hydroxy-3'-(3",4",5", 6"-tetrahydrophthalimidomethyl)-5'-methyl-phenyl] benzotriazole, 2,2-methylenebis[4-(1,1,3,3-tetramethylbutyl)-6-(2H-benzotriazol-2-yl)phenol], 2-(2'-hydroxy-3'-t-butyl-5'-methylphenyl)-5-chlorobenzothiazole, 2-(2H-benzotriazol-2-yl)-6-(straight chain and side chain dodecyl)-4-methylphenol, a mixture of octyl-3-[3-t-butyl-4-hydroxy-5-(chloro-2H-benzotriazol-2-yl)phenyl]propionate and 2-ethylhexyl-3-[3-t-butyl-4-hydroxy-5-(5-chloro-2H-benzotriazol-2-yl)phenyl]propionate, and the like. However, the invention is not restricted to these compounds.

As commercially available products, TINUVIN 109, TINUVIN 171, TINUVIN 326, and TINUVIN 328 (the products of Ciba Specialty Chemicals Inc.) can be preferably used.

Degradation Preventing Agent:

Further, a degradation preventing agent (e.g., an antioxidant, a peroxide decomposer, a radical inhibitor, a metal deactivator, an acid scavenger, and amine) may be added to the cellulose acylate film. With respect to degradation preventing agents, JP-A-3-199201, JP-A-5-1907073, JP-A-5-194789, JP-A-5-271471, and JP-A-6-107854 can be referred to. In view of revealing the effect by the addition of degradation preventing agent and restraining the bleeding out (oozing) of the degradation preventing agent on the film surface, the addition amount of degradation preventing agents is preferably from 0.01 to 1 mass % of the solution (dope) to be prepared, and more preferably from 0.01 to 0.2 mass %. As the examples of especially preferred degradation preventing agents, butylated hydroxytoluene (BHT) and tribenzylamine (TBA) can be exemplified.

Matting Agent Fine Particles:

It is preferable to add fine particles to the cellulose acylate film of the invention as a matting agent. As the fine particles for use in the invention, silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate, and calcium phosphate can be exemplified. Of these fine particles, fine particles containing silicon are preferred because the turbidity is low, and silicon dioxide is especially preferred. The fine particles of silicon dioxide preferably have an average primary particle size of from 1 to 20 nm and an apparent specific gravity of 70 g/liter or more. The average primary particle size is preferably from 1 to 20 nm, and those having a smaller size of from 5 to 16 nm are more preferred for capable of reducing haze. The apparent specific gravity is preferably from 90 to 200 g/liter, and more preferably from 100 to 200 g/liter. The greater the apparent specific gravity, the more is it possible to prepare a dispersion with high concentration, and haze and aggregation are improved, and so preferred.

These fine particles usually form secondary particles having an average particle size of from 0.05 to 2.0 μm, and they are present as agglomerates in the film, and form unevenness of from 0.05 to 2.0 μm on the surface of the film. The average secondary particle size is preferably from 0.05 to 1.0 μm, more preferably from 0.1 to 0.7 μm, and most preferably from 0.1 to 0.4 μm. A particle in the film is observed with a scanning electron microscope, and the diameter of the circumscribing circle of the particle is defined as the particle size of the primary or secondary particle. Further, 200 particles in different places are observed, and the average value of these particles is defined as the average particle size.

As the fine particles of silicon dioxide, commercially available products, e.g., AEROSIL R972, R972V, R974, R812, 200, 200V, 300, R202, OX50, and TT600 (manufactured by Nippon Aerosil Co., Ltd.) can be used. As the fine particles of zirconium oxide, commercially available products, e.g., AEROSIL R976 and R811 (manufactured-by Nippon Aerosil Co., Ltd.) can be used.

Of these products, AEROSIL 200V and AEROSIL R972V are especially preferred for the reasons that they are silicon dioxide fine particles having an average primary particle size of 20 nm or less and an apparent specific gravity of 70 g/liter or more, and capable of decreasing the friction coefficient while maintaining the haze of an optical film low.

It is preferred to manufacture a matting agent for use in the invention by the following method. That is, a method of preparing a fine particle dispersion by stirring and mixing a solvent and fine particles in advance, adding the fine particle dispersion to a separately prepared first additive solution having a cellulose acylate concentration of less than 5 mass % and a molecular weight of from 200 to 2,000, stirring and dissolving the solution, further adding a second additive solution to the above solution, stirring and dissolving, and then mixing with a main cellulose acylate dope solution is preferred.

Since the surface of a matting agent has been subjected to hydrophobitizing treatment, when a hydrophobic additive is added, the additive is adsorbed onto the surface of the matting agent, and agglomerates of the additive are liable to occur with the adsorbates as the nuclei. When a mixture of a hydrophilic additive with the dispersion of a matting agent is mixed with a hydrophobic additive relatively, occurring of agglomerates on the surface of the matting agent can be restrained, so that a film having low haze can be obtained, and hardly accompanied with light leakage in black display when assembled into a liquid crystal device.

It is preferred to use an in-line mixer for the mixing of the dispersion of a matting agent with an additive solution and a cellulose acylate solution. Although the method is not limitative, in mixing silicon dioxide fine particles with a solvent, etc., and dispersing the mixture, the concentration of the silicon dioxide is preferably from 5 to 30 mass %, more preferably from 10 to 25 mass %, and most preferably from 15 to 20 mass %. The turbidity against the same addition amount is low when dispersing concentration is high, and the haze and agglomerate are bettered. The addition amount of a matting agent in the final dope solution of cellulose acylate is preferably from 0.001 to 1.0 mass %, more preferably from 0.005 to 0.5 mass %, and most preferably from 0.01 to 0.1 mass %.

Retardation of Film:

In the specification of the invention, Re and Rth respectively represent in-plane retardation and retardation in the thickness direction. Re is measured by making light having wavelength of 590 nm incident into the normal line direction in KOBRA 21ADH (manufactured by Oji Scientific Instruments). Rth is computed by KOBRA 21 ADH on the basis of retardation values, measured in three directions in total, of the above Re, a retardation value measured by making light having wavelength of 590 nm incident from a direction inclined by +40° against the normal line direction of the film with making the in-plane slow axis (judged by KOBRA 21ADH) serve as a tilt axis (rotational-axis), and a retardation-value measured by making light having wavelength of 590 nm incident from a direction inclined by −40° against the normal line direction of the film with making the in-plane slow axis serve as a tilt axis (rotational axis). As hypothetical values of average refractive index, values described in Polymer Handbook (John Wiley & Sons, Inc.) and various catalogs of optical films can be used. When an average refractive index value is not known, it can be measured with an Abbe's refractometer. The average refractive index values of major optical films are exemplified below: cellulose acylate (1.48), cycloolefin polymer (1.52), polycarbonate (1.59), polymethyl methacrylate (1.49), and polystyrene (1.59). By inputting the hypothetical value of the average refractive index and the film thickness, nx, ny and nz are computed by KOBRA 21ADH.

The Re retardation value of the cellulose acylate film of the invention is preferably adjusted to 20 to 200 nm, and more preferably from 30 to 100 nm. The Rth retardation value is preferably adjusted to 70 to 400 nm, and more preferably from 100 to 300 nm. The Re/Rth ratio is preferably adjusted to 0.1 to 0.8, and more preferably from 0.25 to 0.6. The adjustment of these values can be effected by the selection of the kind and the addition amount of a retardation developer and stretching condition of the cellulose acylate film.

Distribution of Orientation Angle:

The distribution of orientation angle of a polymer film can be measured with OPTIPRO (XY scanning stage, halogen lamp light+550 nm interference filter). The measuring area at this time is a 60 mm×60 mm square, and measurement is performed with a beam of 3 mm aperture at intervals of 4 mm.

The range of the difference between the maximum value and the minimum value of the orientation angle in the 60 mm×60 mm square thus measured is preferably from 0° to 0.40°, more preferably from 0° to 0.30°, and still more preferably 0.20° or less. Such a film that is improved in the distribution of orientation angle in a minute area can conspicuously improve unevenness in viewing by the crossed Nicols arrangement, so that a panel free from unevenness can be provided.

"Orientation angle" in the invention does not mean the angle formed-by the orientation direction of a polymer film and the specific direction of in-plane of the film as a standard. However, in the case of "the difference between the maximum value and the minimum value of the orientation angle", orientation angle means the difference between the maximum value and the minimum value of the angle formed by the orientation direction of a polymer film and the common direction as a standard, although arbitrary, so that the value can be determined unconditionally.

Modulus of Elasticity:

The modulus of elasticity of a cellulose acylate film in the invention both in the transfer direction and the orthogonal direction to the transfer direction (hereinafter referred to as cross direction) at the time of manufacture is from 3,800 to 6,000 MPa. By controlling the modulus of elasticity of a film in the above range, leakage of light can be restrained when a liquid crystal display device is kept on under a high humidity condition.

A sample having a size of 10 mm×200 mm is subjected to humidity conditioning at 25° C., 60% RH for 2 hours, and the modulus of elasticity can be computed from the initial tensile stress and elongation by an initial sample length of 100 mm and a pulling rate of 10 mm/min with a tensile tester (Strograph R2, manufactured by Toyo Seiki Seisaku-Sho, Ltd.).Haze:

The haze value of the cellulose acylate film in the invention measured with a haze meter (1001DP, manufactured by Nippon Denshoku Industries Co., Ltd.) is preferably from 0 to 1.0, and more preferably from 0 to 0.8.

Failure of Flatness:

A value of failure of flatness of the cellulose acylate film of the invention found by sampling, e.g., a cellulose ester film, and counting the foreign matters or agglomerates having a length of 30 μm or more on 30 cm width of both ends and length of 1 m of the sampling film is preferably from 0 to 50, more preferably from 0 to 40, and especially preferably from 0 to 30.

Surface Treatment of Cellulose Acylate Film:

To make the surface energy of a cellulose acylate film from 55 to 75 mN/m, it is preferred to subject the cellulose acylate film to surface treatment. As the examples-of surface treatments, saponification treatment, plasma treatment, flame treatment, and ultraviolet irradiation treatment are exemplified. The saponification treatment includes acid saponification treatment and alkali saponification treatment. The plasma treatment includes corona discharge treatment and glow discharge treatment. To maintain flatness of the film, the temperature of the cellulose acylate film in the surface treatment is preferably the glass transition temperature (Tg) or lower, specifically 150° C. or lower. The surface energy of the cellulose acetate film after these surface treatments is preferably from 55 to 75 mN/m.

The glow discharge treatment may be low temperature plasma treatment occurring in low-pressure gas of $10^{-3}$ to 20 Torr, or may be plasma treatment in the atmospheric pressure. Plasma exciting gas is gas capable of plasma excitation under the above condition, e.g., argon, helium, neon, krypton, xenon, nitrogen, carbon dioxide and fluorocarbons, e.g., tetrafluoromethane, and mixtures of these gases are exemplified. These treatments are described in detail in Hatsumei Kyokai Kokai Giho Kogi No. 2001-1745 (on Mar. 15, 2001, published by Hatsumei Kyokai), pp. 30-32. Plasma treatment in the atmospheric pressure now attracting public attention uses irradiation energy of from 20 to 500 kGy at 10 to 1,000 keV, and preferably from 20 to 300 kGy at 30 to 500 keV. Alkali saponification treatment is especially preferred for the surface treatment of cellulose acylate film.

Alkali saponification treatment is preferably performed by a method of directly immersing a cellulose acylate film in a saponification solution tank, or a method of coating a saponification solution on a cellulose acylate film. Dip coating, curtain coating, extrusion coating, bar coating, and E-type coating can be used as coating methods. For coating a saponification solution on a transparent support, it is preferred that the solvent of a coating solution for alkali saponification treatment has a good wetting property, does not form unevenness on the surface of a transparent support, and is capable of maintaining a good flatness. Specifically, alcohol solvents are preferred, and an isopropyl alcohol is especially preferred. It is also possible to use an aqueous solution of surfactant as the solvent. The alkali of a coating solution for alkali saponification treatment is preferably alkali soluble in the above solvents, and KOH and NaOH are more preferred. The pH of an alkali saponification treatment coating solution is preferably 10 or more, and more preferably 12 or more. The reaction conditions in alkali saponification are preferably room temperature and from 1 second to 5 minutes, more preferably from 5 seconds to 5 minutes, and especially preferably from 20 seconds to 3 minutes. After alkali saponification reaction, it is preferred that a surface coated with a saponification solution is washed with water, or acid and then water.

The surface energy of the solid obtained by these methods can be found according to a contact angle method, a wetting heat method, and an adsorption method as described in Nure no Kiso to Oyo (The Elements and Applications of Wetting), Realize Advanced Technology Limited (Dec. 10, 1989). In the case of the cellulose acylate film in the invention, a contact angle method is preferably used. Specifically, two kinds of solutions the surface energies of which are already known are dripped onto the cellulose acylate film, at the point of intersection of the surface of the droplet and the film surface, the angle containing the droplet is defined as a contact angle of the angle formed by the tangent line drawn on the droplet and the film surface, and the surface energy of the film can be computed.

A cellulose acylate film having the surface energy of from 55 to 75 mN/m can be obtained by subjecting a cellulose acylate film to the above surface treatments. The adhesion of a polarizing film and a cellulose acylate film can be increased by the use of this cellulose acylate film as the transparent protective film of a polarizing plate. When the cellulose acylate film of the invention is used in an OCB mode liquid crystal display device, the optically compensatory sheet of the invention may form the orientation film on the cellulose acylate film and an optically anisotropic layer containing a disc-like compound or a rod-like compound may be provided thereon. The optically anisotropic layer is formed by the orientation of a disc-like compound (or a rod-like compound) and solidification of the orientation state of the compound. When an optically anisotropic layer is formed on the cellulose acylate film as above, for securing the adhesion of a cellulose acylate film and the orientation film, it has been conventionally necessary to provide a gelatin undercoat layer between them, however, by the use of the cellulose acylate film having the surface energy of from 55 to 75 mN/m of the invention, the gelatin undercoat layer can be unnecessary.

[Optical Materials Using Cellulose Acylate Film]

Optically Compensatory Sheet:

The cellulose acylate film containing at least one of the above retardation developers, satisfying the retardation values Re and Rth, and Re/Rth ratio, and having a thickness of from 40 to 110 μm functions as an optically compensatory sheet only one sheet alone.

The cellulose acylate film of the invention is preferably used as an optically compensatory sheet.

Polarizing Plate:

A polarizing plate consists of a polarizing film and two sheets of a transparent protective film provided on both sides of the polarizing film. An optically compensatory sheet comprising the cellulose acylate film can be used as one protective film. Ordinary cellulose acetate films may be used as other protective film.

As polarizing films, an iodine polarizing film, a dye polarizing film using a dichroic dye and a polyene polarizing film are known. Iodine polarizing films and dye polarizing films are generally manufactured with polyvinyl alcohol films.

The slow axis of an optically compensatory sheet comprising a cellulose acylate film and the transmission axis of a polarizing film are disposed so as to be substantially parallel.

Antireflection Layer:

It is preferred to provide an antireflection layer on the transparent protective film of a polarizing plate disposed on the side opposite to the side on which a liquid crystal cell is provided. Particularly in the invention, (1) an antireflection layer comprising at least a light scattering layer and a low refractive index layer laminated on a transparent protective film in this order, or (2) an antireflection layer comprising a middle refractive index layer, a high refractive index layer and a low refractive index layer laminated on a transparent protective film in this order is preferably used. The preferred examples of antireflection layers are described below.

(1) An Antireflection Layer Having Provided a Light Scattering Layer and a Low Refractive Index Layer on a Transparent Protective Film Matting particles are dispersed in the light scattering layer of the invention, and the refractive index of the components other than the matting particles in the light scattering layer is preferably in the range of from 1.50 to 2.00, and the refractive index of the low refractive index layer is preferably in the range of from 1.35 to 1.49. In the invention, the light scattering layer doubles as antiglare and hard coat properties, and the light scattering layer may comprise one layer, or a plurality of layers, e.g., two to four layers.

As the surface unevenness of the antireflection layer, it is preferred to design to provide central line average roughness Ra of from 0.08 to 0.40 μm, ten point average roughness Rz of 10 times Ra or less, average peak and valley distance Sm of from 1 to 100 μm, the standard deviation of the height of convexity from the deepest point of the unevenness is 0.5 μm or less, the standard deviation of average peak and valley distance Sm with the central line as standard is 20 μm or less, and the surface having inclination angle of from 0 to 5° of 10% or more, whereby sufficient antiglare property and uniform matte feeling by visual observation can be achieved. By making the tint of reflected light under C light source a* value of −2 to 2, a b* value of −3 to 3, and the ratio of the minimum value and the maximum value of the reflectance in the range of from 380 to 780 nm of from 0.5 to 0.99, the tint of reflected light becomes neutral and preferred. Further, by making a b* value of transmitted light under C light source of from 0 to 3, a yellowish color in white display is reduced when the antireflection layer is applied to a display device and preferred. When a lattice of 120 μm×40 μm is inserted between a surface light source and the antireflection film of the invention and the standard deviation of luminance distribution measured on the film is 20 or less, glare at the time when the film of the invention is applied to a high precision panel is preferably reduced.

When the antireflection layer in the invention has optical characteristics such as mirror reflectivity of 2.5% or less, transmittance of 90% or more, and 60° glossiness of 70% or less, the reflectance of outer light can be restrained and visibility is improved. Mirror reflectivity is more preferably 1% or less, and most preferably 0.5% or less. By making a haze value from 20 to 50%, the ratio of inside haze value/total haze value from 0.3 to 1, the reduction of the haze value from the haze value at the time of providing the light scattering layer after the time of providing a low refractive index layer 15% or less, the visibility of transmitted image at comb breadth of 0.5 mm from 20 to 50%, and the transmittance ratio of perpendicularly transmitted light/the transmitted light in the direction inclined by 2° from perpendicularity from 1.5 to 5.0, glare on a high precision LCD panel can be prevented and the reduction of halation of letters and the like can be achieved.

Low Refractive Index Layer:

The refractive index of the low refractive index layer of the antireflection film in the invention is from 1.20 to 1.49, and preferably from 1.30 to 1.44. It is preferred for the low refractive index layer to satisfy the following expression (6) for reducing the refractive index.

$$(m/4) \times 0.7 < n_1 d_1 < (m/4) \times 1.3 \qquad (6)$$

In the expression, m represents a positive odd number, $n_1$ represents a refractive index of a low refractive index layer, and $d_1$ represents a layer thickness (nm) of a low refractive index layer. $\lambda$ is wavelength, which is in the range of from 500 to 550 nm.

The materials for forming the low refractive index layer in the invention are described below.

The low refractive index layer in the invention contains a fluorine-containing polymer as the low refractive index binder. As the fluorine polymers, fluorine-containing polymers having a dynamic friction coefficient of from 0.03 to 0.20, a contact angle to water of from 90 to 120°, and capable of crosslinking by heat or ionizing radiation having the falling angle of pure water of 70° or less are preferably used. When the antireflection film of the invention is mounted on an image display device, the lower the peeling force from commercially available adhesive tapes, the more easy is the peeling of a sticker, a memo pad and the like after sticking them, preferably 500 gf or less, more preferably 300 gf or less, and most preferably 100 gf or less. Further, the harder the surface hardness measured with a micro-hardness tester, the more hardly scratched is the surface, preferably 0.3 GPa or more, and more preferably 0.5 GPa or more.

As the fluorine-containing polymers for use in the low refractive index layer, hydrolyzed products and dehydrated and condensed products of perfluoroalkyl group-containing silane compounds (e.g., (heptadecafluoro-1,1,2,2-tetrahydrodecyl)-triethoxysilane), and fluorine-containing copolymers comprising a fluorine-containing monomer unit and a constitutional unit for providing crosslinking reactivity as the constitutional components are exemplified.

The specific examples of the fluorine-containing monomers include fluoroolefins (e.g., fluoroethylene, vinylidene fluoride, tetrafluoroethylene, perfluorooctyl-ethylene, hexafluoropropylene, perfluoro-2,2-dimethyl-1,3-dioxole, etc.), partially or completely fluorinated alkyl ester derivatives of (meth)acrylic acid (e.g., Viscoat 6FM (manufactured by Osaka Organic Chemical Industry Ltd.), M-2020 (manufactured by Daikin Industries Ltd.), etc.), and completely or partially fluorinated vinyl ethers, preferably fluoroolefins, and especially preferably hexafluoropropylene for refractive index, solubility, transparency and availability.

As the constitutional units for providing crosslinking reactivity, constitutional units obtainable by the polymerization of monomers having a self-crosslinkable functional group in the molecule in advance, e.g., glycidyl (meth)acrylate and glycidyl vinyl ether, constitutional units obtainable by the polymerization of monomers having a carboxyl group, a hydroxyl group, an amino group, or a sulfo group (e.g., (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid, etc.), and constitutional units obtained by introducing a cross-linking reactive group such as a (meth)acryloly group to these constitutional units by polymer reaction (e.g., a crosslinking reactive-group can be introduced by a technique of reacting acrylic acid chloride to a hydroxyl group) are exemplified.

From the viewpoint of solubility in solvents and for providing transparency to films, besides the above fluorine-containing monomer units and constitutional units for providing crosslinking reactivity, monomers not containing fluorine can also be arbitrarily copolymerized.

Monomer units usable in combination are not especially restricted, e.g., olefins (ethylene, propylene, isoprene, vinyl chloride, vinylidene chloride, etc.), acrylates (e.g., methyl acrylate, ethyl acrylate, 2-thylhexyl acrylate, etc.), methacrylates (e.g., methyl methacrylate, ethyl methacrylate, butyl methacrylate, ethylene glycol dimethacrylate, etc.), styrene derivatives (e.g., styrene, divinylbenzene, vinyltoluene, a-methylstyrene, etc.), vinyl ethers (e.g., methyl vinyl ether, ethyl vinyl ether, cyclohexyl vinyl ether, etc.), vinyl esters (e.g., vinyl acetate, vinyl propionate, vinyl cinnamte, etc.), acrylamides (e.g., N-tert-butylacrylamide, N-cyclohexyl-acrylamide, etc.), methacrylamides, and acrylonitrile derivatives can be exemplified.

Curing agents may be arbitrarily used in these polymers as disclosed in JP-A-10-25388 and JP-A-10-147739.

Light Scattering Layer:

A light scattering layer is formed for the purpose of providing the film the light diffusibility by light scattering at the surface and/or light scattering in the inner part, and a hard coat property to improve scratch resistance of the film. Accordingly, the light scattering layer is formed by containing a binder for providing a hard coat property, matting particles for providing light diffusibility and, if necessary, inorganic fillers for increasing refractive index, preventing shrinkage by crosslinking, and increasing intensity.

The thickness of the light scattering layer is preferably from 1 to 10 μm, and more preferably from 1.2 to 6 μm, from the viewpoints of providing a hard coat property. Too small a layer thickness results in a shortage of hardness, and too great a layer thickness results in the occurrence of curling and the deterioration of brittleness.

As the binders of the light scattering layer, polymers having a saturated hydrocarbon chain or a polyether chain as the main chain are preferred, and polymers having a saturated hydrocarbon chain as the main chain are more preferred. Further, it is preferred for the binder polymers to have a crosslinking structure. As the binder polymers having a saturated hydrocarbon chain as the main chain, polymers of ethylenic unsaturated monomers are preferred. As the binder polymers having a saturated hydrocarbon chain as the main chain and also having a crosslinking structure, (co)polymers of monomers having two or more ethylenic unsaturated groups are preferred. For making the binder polymers high refractive index, it is effective to use monomers having an aromatic ring and at least one kind of atom selected from a halogen atom other than a fluorine atom, a sulfur atom, a phosphorus atom, and a nitrogen atom.

The examples of the monomers having two or more ethylenic unsaturated groups include esters of polyhydric alcohol and (meth)acrylic acid (e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa-(meth)acrylate, pentaerythritol hexa(meth)acrylate, 1,2,3-cyclohexane tetra(meth)acrylate, polyurethane polyacrylate, and polyester polyacrylate), ethylene oxide-modified products of the above monomers, vinylbenzene and derivatives thereof (e.g., 1,4-divinylbenzene, 4-vinylbenzoic acid-2-acryloyl-ethyl ester, and 1,4-divinylcyclohexanone), vinyl sulfone (e.g., divinyl sulfone), acrylamide (e.g., methyl-enebis-acrylamide), and methacrylamide. These monomers may be used in combination of two or more kinds.

As the specific examples of high refractive index monomers, bis(4-methacryloylthiophenyl) sulfide, vinyl-naphthalene, vinylphenyl sulfide, and 4-methacryloxyphenyl-4-methoxyphenyl thioether are exemplified. These monomers may also be used in combination of two or more kinds.

Polymerization of these monomers having an ethylenic unsaturated group can be performed by irradiation with ionizing radiation or heating in the presence of a photo-radical polymerization initiator or a thermal radical polymerization initiator.

Accordingly, an antireflection film can be formed by preparing a coating solution containing a monomer having an ethylenic unsaturated group, a photo-radical polymerization initiator or a thermal radical polymerization initiator, matting particles and an inorganic filler, coating the prepared coating solution on a transparent support, and then performing polymerization reaction by irradiation with ionizing radiation or heating to thereby cure the coated layer. Well-known photo-radical polymerization initiators can be used.

As polymers having a polyether chain as the main chain, ring opening polymers of polyfunctional epoxy compounds are preferred. Ring opening polymerization of a polyfunctional epoxy compound can be effected by irradiation with ionizing radiation or by heating in the presence of a photo-acid generator or a heat-acid generator.

Accordingly, an antireflection film can be formed by preparing a coating solution containing a polyfunctional epoxy compound, a photo-acid generator or a heat-acid generator, matting particles and an inorganic filler, coating the prepared coating solution on a transparent support, and then performing polymerization reaction with ionizing radiation or heating to thereby cure the coated layer.

In place of or in addition to a monomer having two or more ethylenic unsaturated groups, crosslinkable functional groups may be introduced into a polymer by using a monomer having crosslinkable functional groups, and a crosslinking structure may be introduced to a binder polymer by the reaction of the crosslinkable functional groups.

The examples of the crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, cyano acrylate derivative, melamine, etherified methylol, ester and urethane, and metal-alkoxide, such as tetramethoxy-silane, can also be used as monomets for introducing a crosslinking structure. A functional group showing a crosslinking property as a result of decomposition reaction, such as a block isocyanate group, can also be used as a crosslinkable functional group. That is, in the invention, crosslinkable functional groups may be those that show reactivity as a result of decomposition even if they do not show reactivity at once.

By coating binder polymers having these crosslinkable functional groups and then heating, a crosslinking structure can be formed.

For the purpose of imparting an antiglare property, matting particles having an average particle size of from 1 to 10 μm, and preferably from 1.5 to 7.0 μm, which are greater than filler grains, e.g., particles of inorganic compounds or resin particles, are contained in a light scattering layer.

As the specific examples of the matting particles, such as particles of inorganic compounds, e.g., silica particles and $TiO_2$ particles, and resin particles, e.g., acrylic particles, crosslinked acrylic particles, polystyrene particles, crosslinked styrene particles, melamine resin particles, and benzoguanamine resin particles are preferably exemplified. Of these particles, crosslinked styrene particles, crosslinked acrylic particles, crosslinked acrylstyrene particles, and silica particles are preferred.

The matting particles may be spherical or amorphous.

Further, two or more matting particles each having different particle size may be used together. It is possible to give an antiglare property by larger size matting particles and give other optical properties by smaller size matting particles.

The grain size distribution of the matting particles is most preferably monodispersion. The particle sizes of all the particles are preferably equivalent as far as possible. Taking the particles having particle sizes greater than the average particle size by 20% or more as coarse particles, the proportion of the coarse particles is preferably 1% or less of all the particle number, more preferably 0.1% or less, and still more preferably 0.01% or less. Matting particles having such particle size distribution are obtained by classification after ordinary synthesizing reaction. By increasing the number of times of classification or raising the degree of classification, matting particles having more preferred particle size distribution can be obtained.

The matting particles are added so that the amount contained in a formed light scattering layer is preferably from 10 to 1,000 $mg/m^2$, and more preferably from 100 to 700 $mg/m^2$.

The particle size distribution of matting particles is measured with a coulter counter method and the measured particle size distribution is converted to particle number distribution.

For increasing the refractive index of the layer, it is preferred to add an inorganic filler to the light scattering layer in addition to the matting particles. For example, inorganic fillers comprising at least one oxide of metal selected from titanium, zirconium, aluminum, indium, zinc, tin and antimony, and having an average particle size of 0.2 μM or less, preferably 0.1 μm or less, and more preferably 0.06 μm or less are preferably used.

Contrary to this, in a light scattering layer containing high refractive index matting particles for the purpose of increasing the refractive index difference from the matting particles, it is also preferred to use a silicon oxide for maintaining the refractive index of the layer lowish. The preferred particle size is the same as that of the above inorganic fillers.

The specific examples of the inorganic fillers for use in a light scattering layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are especially preferred for increasing a refractive index. It is also preferred for the surfaces of inorganic fillers to be treated with a silane coupling agent or a titanium coupling agent, and surface treating agents having functional groups capable of reacting with the binder are preferably used on the surfaces of fillers.

The addition amount of these inorganic fillers is preferably from 10 to 90% of the entire mass of the light scattering layer, more preferably from 20 to 80%, and especially preferably from 30 to 75%.

The particle sizes of these fillers are sufficiently smaller than the wavelength of light, so that light scattering does not occur and a dispersion comprising a binder polymer having dispersed therein these fillers behaves as an optically uniform material.

The total refractive index of the mixture of a binder and an inorganic filler in a light scattering layer is preferably from 1.48 to 2.00, and more preferably from 1.50 to 1.80. The above range of refractive index can be reached by the selection of the ratio of the kinds and amounts of the binder and the inorganic filler. The selection can be easily known experimentally in advance.

For securing uniform flatness, e.g., resistance to coating unevenness, drying unevenness and point defects, a light scattering layer contains surfactants, e.g., fluorine surfactants or silicone surfactants, or both of them, in a coating composition for forming an antiglare layer. Fluorine surfactants are especially preferably used for the reason that fluorine surfactants have the effect of improving flatness defects such as coating unevenness, drying unevenness and point defects of the antireflection film of the invention with a smaller addition amount. The object of the addition of fluorine surfactants is to increase productivity by high speed coating aptitude while increasing the uniformity of flatness property.

(2) An Antireflection Layer Comprising a Middle Refractive Index Layer, a High Refractive Index Layer and a Low Refractive Index Layer Laminated on a Transparent Protective Film in this Order An antireflection layer having a layer constitution comprising a substrate having thereon at least a middle refractive index layer, a high refractive index layer, and a low refractive index layer (the outermost layer) in this order is designed so as to have refractive indexes satisfying the relationship shown below.

The refractive index of a high refractive index layer>the refractive index of a middle refractive index layer>the refractive index of a transparent support>the refractive index of a low refractive index layer A hard coat layer may be provided between a transparent support and a middle refractive index layer. Further, the antireflection layer may comprise a middle refractive index hard coat layer, a high refractive index layer, and a low refractive index layer.

For example JP-A-8-122504, JP-A-8-110401, JP-A-10-300902, JP-A-2002-243906 and JP-A-2000-111706 can be referred to. Each layer may have other function and as such examples, e.g., an antifouling low refractive index layer and an antistatic high refractive index layer (e.g., JP-A-10-206603 and JP-A-2002-243906) are exemplified.

The haze value of an antireflection film is preferably 5% or less, and more preferably 3% or less. The film strength is preferably H or higher by a pencil hardness test according to JIS K5400, more preferably 2H or higher, and most preferably 3H or higher.

High Refractive Index Layer and Middle Refractive Index Layer:

A layer having a high refractive index of an anti-reflection film comprises a hard film containing at least super fine particles of a high refractive index inorganic compound having an average particle size of 100 nm or less and a matrix binder.

As the inorganic compound fine particles having a high refractive index, inorganic compounds having a refractive index of 1.65 or more, preferably a refractive index of 1.9 or more, are exemplified. For example, oxides of Ti, Zn, Sb, Sn, Zr, Ce, Ta, La, In, etc., and compound oxides containing these metal atoms are exemplified.

For obtaining such super fine particles, treating the surfaces of particles with a surface treating agent (e.g., with a silane coupling agent as disclosed in JP-A-11-295503, JP-A-11-153703 and JP-A-2000-9908, with an anionic compound or an organic metal coupling agent as disclosed in JP-A-2001-310432), taking a core/shell structure with high refractive index grains as core (e.g., JP-A-2001-166104), and using a specific dispersant in combination (e.g., JP-A-11-153703, U.S. Pat. No. 6,210,858 and JP-A-2002-2776069) are exemplified.

As the materials forming the matrix, well-known thermoplastic resins and thermosetting resins are exemplified.

Further, at least one kind of composition selected from a composition containing a polyfunctional compound having at least two polymerizable groups of radical polymerizable and/or cationic polymerizable groups, and a composition containing an organic metal compound having a hydrolyzable group and a partial-condensation product of the compound is preferred. For example, the compositions disclosed in JP-A-2000-47004, JP-A-2001-315242, JP-A-2001-31871 and JP-A-2001-296401 are exemplified.

Further, cured films obtainable from colloidal metal oxide obtained from hydrolyzed and condensed products of metal alkoxide and metal alkoxide composition are also preferred, as disclosed, e.g., in JP-A-2001-293818.

The refractive index of a high refractive index layer is generally from 1.70 to 2.20. The thickness of a high refractive index layer is preferably from 5 nm to 10 μm, and more preferably from 10 nm to 1 μm.

The refractive index of a middle refractive index layer is adjusted to be between the refractive index of a low refractive index layer and the refractive index of a high refractive index layer. The refractive index of a middle refractive index layer is preferably from 1.50 to 1.70. The thickness of a middle refractive index layer is preferably from 5 nm to 10 μm, and more preferably from 10 nm to 1 μm.

Low Refractive Index Layer:

A low refractive index layer is laminated on a high refractive index layer. The refractive index of a low refractive index layer is from 1.20 to 1.55, and preferably from 1.30 to 1.50.

A low refractive index layer is preferably formed as the outermost layer having scratch resistance and an antifouling property. As a means to conspicuously improve scratch resistance, it is effective to provide a sliding property to the surface, and providing a thin layer comprising the introduction of well-known silicone and the introduction of fluorine can be applied as this means.

The refractive index of the fluorine-containing compounds is preferably from 1.35 to 1.50, and more preferably from 1.36 to 1.47. As the fluorine-containing compounds, compounds having crosslinkable or polymerizable functional groups containing fluorine atoms from 35 to 80 mass % are preferred.

For example, as such compounds, the compounds disclosed in JP-A-9-222503, paragraphs [0018] to [0026], JP-A-11-38202, paragraphs [0019] to [0030]; JP-A-2001-40284, paragraphs [0027] and [0028], and JP-A-2000-284102 are exemplified.

Silicone compounds are compounds having a polysiloxane structure, and those having a curable functional group or a polymerizable functional group in the polymer chain, and a crosslinking structure in the film are preferred. For example, reactive silicone (e.g., Silaplane, manufactured by Chisso Corporation), and polysiloxane containing silanol groups at both terminals (e.g., JP-A-11-258403) are exemplified.

It is preferred that the crosslinking reaction or polymerization reaction of fluorine-containing and/or siloxane polymers having a crosslinkable group or a polymerizable group is performed simultaneously with or immediately after coating a coating composition containing a polymerization initiator and a sensitizer for forming the outermost layer with light irradiation or heating.

A sol/gel cured film of curing by condensation reaction of an organic metal compound such as a silane coupling agent and a silane coupling agent containing a specific fluorine-containing hydrocarbon in the presence of a catalyst is also preferred.

For example, polyfluoroalkyl group-containing silane compound or partially hydrolysis condensates of the compound (the compounds disclosed in JP-A-58-142958, JP-A-58-147483, JP-A-58-147484, JP-A-9-157582 and JP-A-11-106704), and silyl compounds containing a poly (perfluoroalkyl ether) group, i.e., a fluorine-containing long chain group (the compounds disclosed in JP-A-2000-117902, JP-A-2001-48590 and JP-A-2002-53804) are exemplified.

Besides the above additives, a low refractive index layer can contain low refractive index inorganic compounds having an average particle size of primary particles of from 1 to 150 nm such as fillers (e.g., silicon dioxide (silica)), fluorine-containing particles (e.g., magnesium fluoride, calcium fluoride, barium fluoride), the organic fine particles disclosed in JP-A-11-3820, paragraphs from [0020] to [0038], silane coupling agents, sliding agents, and surfactants.

When a low refractive index layer is formed as the lower layer of the outermost layer, the low refractive index layer may be formed by gaseous phase methods (e.g., a vacuum evaporation method, a sputtering method, an ion plating method, a plasma CVD method). Coating methods are preferred in the point of capable of manufacturing inexpensively.

The thickness of a low refractive index layer is preferably from 30 to 200 nm, more preferably from 50 to 150 nm, and most preferably from 60 to 120 nm.

(3) Other Layers of Antireflection Layer:

Further, a hard coat layer, a forward scattering layer, a primer layer, an antistatic layer, an undercoat layer and a protective layer may be provided.

Hard Coat Layer:

A hard coat layer is provided on the surface of a transparent support for the purpose of giving physical strength to a transparent protective film having provided an antireflection layer. It is particularly preferred to provide a hard coat layer between a transparent support and a high refractive index layer.

A hard coat layer is preferably provided by a crosslinking reaction or a polymerization reaction of a photo- and/or thermo-curable compound.

As the curable functional groups, photo-polymerizable functional groups are preferred, and as the organic metal compounds containing a hydrolysis decomposable functional group, organic alkoxysilyl compounds are preferred.

As the specific examples of these compounds, the same compounds as shown in the high refractive index layer can be exemplified. The specific constitutional compositions of a hard coat layer are disclosed, e.g., in JP-A-2002-144913, JP-A-2000-9908 and WO 00/46617.

A high refractive index layer can double as a hard coat layer. When a high refractive index layer doubles as a hard coat layer, it is preferred to form the hard coat layer by adding fine particles to the hard coat layer as fine dispersion according to the method as described in the high refractive index layer.

A hard coat layer can also double as an antiglare layer (described later) having an antiglare function by containing particles having an average particle size of from 0.2 to 10 µm.

The thickness of a hard coat layer can be appropriately designed according to purposes. The thickness of a hard coat layer is preferably from 0.2 to 10 µm, and more preferably from 0.5 to 7 µm.

The strength of a hard coat layer is preferably H or higher by a pencil hardness test according to JIS K5400, more preferably 2H or higher, and most preferably 3H or higher. In a taper test according to JIS K5400, the abrasion loss of a sample piece before and after the test is preferably as small as possible.

Antistatic Layer:

When an antistatic layer is provided, it is preferred to give electric conductivity of volume resistivity of $10^{-8}$ ($\Omega\,cm^{-3}$) or less. It is possible to provide volume resistivity of $10^{-8}$ ($\Omega\,cm^{-3}$) or less by the use of moisture-absorbing materials, water-soluble inorganic salts, certain kinds of surfactants, cationic polymers, anionic polymers and colloidal silica, but there is a problem that the temperature and moisture-dependency is great and sufficient electric conductivity cannot be secured at low moisture. Therefore, metal oxides are preferred as the electric conductive materials. There are colored metal oxides, but when such colored metal oxides are used as electric conductive materials, the film at large is colored, so that not preferred. As the metals forming metal oxides not colored, Zn, Ti, Al, In, Si, Mg, Ba, Mo, W and V can be exemplified, and it is preferred to use metal oxides comprising these metals as the main component. As the specific examples, $ZnO$, $TiO_2$, $SnO_2$, $Al_2O_3$, $In_2O_3$, $SiO_2$, $MgO$, $BaO$, $MoO_3$, $V_2O$, etc., or compound oxides of them are preferred, and $ZnO$, $TiO_2$ and $SnO_2$ are especially preferred. As the examples containing other kinds of atoms, e.g., the addition of Al and In to $ZnO$, Sb, Nb and halogen atoms to $SnO_2$, and Nb and TA to $TiO_2$ are effective. Further, as disclosed in JP-B-59-6235, materials obtained by adhering the above metal oxides to other crystalline metal particles or fibrous substances (e.g., titanium oxide) may be used. Although a volume resistive value and a surface resistive value are different physical values and they cannot be easily compared, for securing electric conductivity of volume resistivity of $10^{-8}$ ($\Omega\,cm^{-3}$) or less, it is sufficient that the electric conductive layer has in general a surface resistive value of $10^{-10}$ ($\Omega/\square$) or less, and more preferably $10^{-8}$ ($\Omega/\square$) or less. It is necessary that the surface resistive value of an electric conductive layer is measured as the value of the time with an antistatic layer as the outermost layer, and this value can be measured in the midway of forming the lamination film described in this specification.

Liquid Crystal Display:

The polarizing plate using the cellulose acylate film of the invention is advantageously used in a liquid crystal display device. The polarizing plate of the invention can be used in liquid crystal cells of various modes, e.g., TN (Twisted Nematic), IPS (In-Plane Switching), FLC (Ferroelectric Liquid Crystal), AFLC (Anti-Ferroelectric Liquid Crystal), OCB (Optically Compensatory Bend), STN (Super Twisted Nematic), VA (Vertically Aligned), and HAN (Hybrid Aligned Nematic) are suggested. Of these modes, the polarizing plates of the invention can be preferably used for an OCB mode or a VA mode.

OCB mode liquid crystal cell is a liquid crystal display device using liquid crystal cell of bend orientation mode of orientating rod-like liquid crystal molecules substantially reverse directions (symmetrically) at the upper and lower of the liquid crystal cell. OCB mode liquid crystal cells are disclosed in U.S. Pat. Nos. 4,583,825 and 5,410,422. Since rod-like liquid crystal molecules are orientated symmetrically at the upper and lower of the liquid crystal cell, the liquid crystal cell of bend orientation mode has a self-optical compensation function. Therefore, the liquid crystal mode is also called OCB (Optically Compensatory Bend) liquid crystal mode. The liquid crystal display of bend orientation mode has the advantage that response speed is quick.

In a VA mode liquid crystal cell, rod-like liquid crystal molecules are substantially perpendicularly orientated when no voltage is applied.

A VA mode liquid crystal cell includes (1) a VA mode liquid crystal cell in a narrow sense of substantially perpendicularly orientating rod-like liquid crystal molecules when no voltage is applied, and substantially-horizontally orientating when voltage is applied (e.g., JP-A-2-176625), (2) a liquid crystal cell having multi-domains of a VA mode (MVA mode) for widening angle of visibility (SID97, described in Digest of Tech. Papers, (drafts) 28, 845 (1997)), (3) a liquid crystal cell of a mode of substantially perpendicularly orientating rod-like liquid crystal molecules when no voltage is applied, and twisted multi-domain orientating when voltage is applied (n-ASM mode) (described in the drafts of Liquid Crystal Forum, Japan, 58-59 (1998)), and (4) s SURVAIVAL mode liquid crystal cell (released at LCD International 98).

In OCB mode and VA mode liquid crystal display devices, two polarizing plates may be disposed on both sides of the liquid crystal cell, and in the case of a VA mode, the polarizing plate may be arranged on the backlight side of the cell. The liquid crystal cell carries liquid crystal between two electrode substrates.

EXAMPLE

The invention will be described further specifically with reference to Examples and Comparative Examples. The materials, the use amounts, the ratios, the contents of treatment, and the procedure of treatments can be changed without departing from the spirit and scope thereof. Accordingly, it should not be construed that the invention is limited to the following specific examples.

Example 1

Manufacture of Cellulose Acylate Film 101:

Preparation of Cellulose Acylate Solution 01:

The following composition was put into a mixing tank and stirred to dissolve each component to prepare cellulose acylate solution 01.

Composition of Cellulose Acylate Solution 01:

| | |
|---|---|
| Cellulose acetate (degree of acetylation: 2.80, degree of polymerization: 420) | 100.0 mass parts |
| Triphenyl phosphate (plasticizer) | 6.0 mass parts |
| Biphenyl phosphate (plasticizer) | 3.0 mass parts |
| Methylene chloride (first solvent) | 402.0 mass parts |
| Methanol (second solvent) | 60.0 mass parts |

Preparation of Matting Agent Solution 11:

The following composition was put into a disperser and stirred to dissolve each component to prepare matting agent solution 11.

Composition of Matting Agent Solution 11:

| | |
|---|---|
| Silica particles having an average particle size of 20 nm (AEROSIL R972, manufactured by Nippon Aerosil Co., Ltd.) | 2.0 mass parts |
| Methylene chloride (first solvent) | 75.0 mass parts |
| Methanol (second solvent) | 12.7 mass parts |
| Cellulose acylate solution 01 | 10.3 mass parts |

Preparation of Retardation Developer Solution 21:

The following composition was put into a mixing tank and stirred with heating to dissolve each component to prepare retardation developer solution 21.

Composition of Retardation Developer Solution 21:

| | |
|---|---|
| Retardation developer (A-7) | 10.0 mass parts |
| Methylene chloride (first solvent) | 67.2 mass parts |
| Methanol (second solvent) | 10.0 mass parts |
| Cellulose acylate solution 01 | 12.8 mass parts |

Matting agent solution 11 (1.3 mass parts) and 7.8 mass parts of retardation developer solution 21 were filtered and mixed with an in-line mixer, 91.1 mass parts of cellulose acylate solution was added to the above mixture mixed with the in-line mixer, the resulting solution was cast with a band casting machine, dried at 70° C. until the residual solvent content reached 25%, and the film was peeled off. The film having a residual solvent content of 15% was subjected to stretching in the cross direction with a tenter by a stretching magnification of 15% in atmosphere of 140° C., and the film was held at 140° C. for 30 seconds. The residual solvent content at the time of beginning of stretching was 10%. After that, the clips were taken off and the film was dried at 130° C. for 40 minutes, whereby cellulose acylate film 101 was manufactured. The residual solvent content of the manufactured cellulose acylate film 101 was 0.1% and the thickness was 79 μm.

Example 2 to 7

Manufacture of Cellulose Acylate Films 102 to 107:

Cellulose acylate films 102 to 107 were manufactured in the same manner as in Example 1, except that the kind of cellulose acylate, the kind and amount of retardation developer, drying temperature on the band, content of residual solvent at beginning of stretching treatment and stretching magnification were changed as shown in Table 1 below. Incidentally, the residual solvent contents at the time of beginning of stretching of the samples in Examples 2 to 7 were in the range of from 20 to 40%.

Comparative Examples 1 and 2

Manufacture of Cellulose Acylate Films 201 and 202:

Comparative cellulose acylate films 201 and 202 were manufactured in the same manner as in Example 1, except that the kind of cellulose acylate, the kind and amount of retardation developer, drying temperature on the band, and stretching magnification were changed as shown in Table 1 below. Incidentally, the residual solvent content at the time of beginning of stretching of the sample in Comparative Example 1 was 29%, and that in Comparative Example 2 was 20%.

X-rays were generated at 50 kV-100 mA with RAPID R-AIXS (manufactured by Rigaku Denki Co.) and Cu was used as a rotational counter cathode. A collimator of 0.8 mm$\phi$ was used, and a film sample was fixed with a transmission sample table. The exposure time was set up at 180 seconds. The diffraction intensities at 2θ of 25° and 27° were read out and the crystallization index was found according to the following expression (A):

Crystallization index=(X-ray diffraction intensity at 2θ of 27°)/(X-ray diffraction intensity at 2θ of 25°)     (A)

Measurement of Distribution of Orientation Angle of Film:

Measurement of Modulus of Elasticity:

A sample having a size of 10 mm×200 mm was subjected to humidity conditioning at 25° C., 60% RH for 2 hours, and the modulus of elasticity was computed from the initial ten-

TABLE 1

| Sample No. | Cellulose Acylate | | | | | Retardation Developer | | Drying Temp. on Band (° C.) | Content of Residual Solvent at Beginning of Stretching Treatment (%) | Stretching Magnification (%) |
|---|---|---|---|---|---|---|---|---|---|---|
| | Degree of Polymerization | Mol. Wt. Distribution Mw/Mn*2 | Total Degree of Substitution of Acyl Group | Degree of Acetylation | Degree of Propionylation | Kind | Addition Amount*1 (mass %) | | | |
| Cellulose Acylate Film 101 | 420 | 2.5 | 2.80 | 2.80 | 0 | A-7 | 4.9 | 70 | 20 | 15 |
| Cellulose Acylate Film 102 | 470 | 2.6 | 2.86 | 2.86 | 0 | A-7 | 4.7 | 80 | 36 | 15 |
| Cellulose Acylate Film 103 | 420 | 2.5 | 2.80 | 2.80 | 0 | B-22 | 4.3 | 70 | 35 | 20 |
| Cellulose Acylate Film 104 | 370 | 2.6 | 2.70 | 2.70 | 0 | B-17 | 4.1 | 70 | 22 | 15 |
| Cellulose Acylate Film 105 | 470 | 2.6 | 2.86 | 2.86 | 0 | A-7 | 4.9 | 100 | 21 | 20 |
| Cellulose Acylate Film 106 | 470 | 4.3 | 2.80 | 2.80 | 0 | A-7 | 4.9 | 140 | 22 | 15 |
| Cellulose Acylate Film 107 | 420 | 2.5 | 2.80 | 2.80 | 0 | I-2 | 4.9 | 70 | 23 | 30 |
| Cellulose Acylate Film 201 | 250 | 4.2 | 2.80 | 2.80 | 0 | A-7 | 4.9 | 115 | 29 | 15 |
| Cellulose Acylate Film 202 | 250 | 4.2 | 2.80 | 2.80 | 0 | A-7 | 4.9 | 140 | 20 | 15 |

Addition amount*1: In mass % based on the mass of the film
Mw/Mn*2: Mw is a mass average molecular weight, and Mn is a number average molecular weight.

Measurement of Physical Values of Films:

With each cellulose acetate film manufactured, Re retardation value and Rth retardation value at wavelength of 590 nm were measured with KOBRA 21ADH (manufactured by Oji Scientific Instruments).

The crystallization indexes of each film before and after stretching, the modulus of elasticity of each film after stretching and the distribution of orientation angle of each film were measured in the following manner. The results obtained are shown in Table 2 below. Measurement of crystallization index of film:

sile stress and elongation by an initial sample length of 100 mm and a pulling rate of 10 mm/min with a tensile tester (Strograph R2, manufactured by Toyo Seiki Seisaku-Sho, Ltd.).

The distribution of orientation angle of a polymer film was measured with OPTIPRO (XY scanning stage, halogen lamp light+550 nm interference filter). The measuring area was 60 mm×60 mm square, and measurement was performed with a beam of 3 mm aperture at intervals of 4 mm. The difference was found from the maximum value and the minimum value of the distribution of orientation angle in the range of 60 mm×60 mm square thus measured.

TABLE 2

| Sample No. | Crystallization Index before Stretching | Film Thickness (μm) | Retardation Value Re (nm) | Retardation Value Rth (nm) | Re/Rth | Crystallization Index after Stretching | Modulus of Elasticity (MPa) Cross Direction | Modulus of Elasticity (MPa) Transfer Direction | Orientation Angle (maximum value - minimum value) (°) | Remarks |
|---|---|---|---|---|---|---|---|---|---|---|
| Cellulose acylate film 101 | 0.87 | 79 | 71 | 152 | 0.47 | 0.88 | 4,600 | 4,100 | 0.2 | Invention |
| Cellulose acylate film 102 | 0.91 | 81 | 52 | 133 | 0.39 | 0.93 | 4,800 | 4,200 | 0.3 | Invention |
| Cellulose acylate film 103 | 0.86 | 80 | 75 | 230 | 0.33 | 0.95 | 4,800 | 4,000 | 0.3 | Invention |
| Cellulose acylate film 104 | 0.91 | 65 | 72 | 190 | 0.38 | 0.91 | 4,500 | 4,000 | 0.3 | Invention |
| Cellulose acylate film 105 | 0.97 | 90 | 60 | 164 | 0.37 | 0.98 | 4,900 | 4,100 | 0.4 | Invention |
| Cellulose acylate film 106 | 0.99 | 81 | 57 | 169 | 0.34 | 1.01 | 4,800 | 4,000 | 0.4 | Invention |
| Cellulose acylate film 107 | 0.88 | 67 | 48 | 121 | 0.40 | 0.89 | 5,300 | 3,900 | 0.2 | Invention |
| Cellulose acylate film 201 | 1.05 | 80 | 46 | 174 | 0.26 | 1.06 | 4,000 | 3,500 | 0.7 | Comparison |
| Cellulose acylate film 202 | 1.12 | 80 | 42 | 182 | 0.23 | 1.13 | 4,100 | 3,500 | 1.0 | Comparison |

From the results in Table 2, it can be seen that the cellulose acylate films according to the invention preferably exhibit high retardation and Re/Rth ratio as compared with the comparative cellulose acylate films.

Example 8

Manufacture of Polarizing Plate 101:

Saponification Treatment of Cellulose Acylate Film:

Cellulose acylate film 101 manufactured in Example 1 was immersed in 1.3 mol/liter of a sodium hydroxide aqueous solution at 55° C. for 2 minutes, and then washed in a washing tank at room temperature, neutralized with 0.05 mol/liter of sulfuric acid at 30° C., again washed in the washing tank at room temperature, and then dried with hot air at 100° C. Thus, the surface of cellulose acylate film 101 was saponified, and used in the manufacture of the following polarizing plate sample.

A commercially available cellulose acylate film (Fuji Tac TD80UF, manufactured by Fuji Photo Film Co., Ltd.) was subjected to saponification treatment on the same conditions and used in the manufacture of the following polarizing plate sample.

Manufacture of Polarizer:

A polarizer was manufactured by adsorbing iodine onto a stretched polyvinyl alcohol film, and the saponification-treated cellulose acylate film was stuck on one side of the polarizer with a polyvinyl alcohol adhesive. The transmission axis of the polarizer and the slow axis of the cellulose acylate film were disposed so as to be parallel.

Further, the saponification-treated cellulose acylate film was stuck on the opposite side of the polarizer with a polyvinyl alcohol adhesive. Thus, polarizing plate 101 was manufactured.

Example 9

Manufacture of Polarizing Plates 102 to 107:

Polarizing plates 102 to 107 were manufactured with cellulose acylate films 102 to 107 in the same manner as in Example 8.

Comparative Example 3

Manufacture of Polarizing Plates 201 and 202:

Polarizing plates 201 and 202 were manufactured with cellulose acylate films 201 and 202 in the same manner as in Example 8.

Example 10

Manufacture of VA Liquid Crystal Display Devices 101 to 107:

A liquid crystal display device shown in FIG. 1 was manufactured. That is, from the viewing direction (upper side), upper polarizing plate 30, a VA mode liquid crystal cell 31 (an upper substrate, a liquid crystal layer, and a lower substrate), and lower polarizing plate 32 were laminated, and further, a backlight light source was disposed. In the following example, a commercially available polarizing plate (HLC2-5618, manufactured by SANRITZ CORPORATION) was used as upper polarizing plate 30, and the above prepared polarizing plate was used as lower polarizing plate 32.

Manufacture of Liquid Crystal Cell:

A liquid crystal cell was manufactured by injecting drop by drop a liquid crystal material (MLC 6608, manufactured by Merck Japan Ltd.) having negative dielectric constant anisotropy between the substrates, with a cell gap between the substrates being 3.6 μm, and then sealing to thereby form a liquid crystal layer between the substrates. The retardation of the liquid crystal layer (that is, the product Δn·d of the thickness d (μm) of the liquid crystal layer and the refractive index anisotropy Δn) was 300 nm. The liquid crystal material was oriented so as to be perpendicularly oriented.

Manufacture of Liquid Crystal Display Device:

Liquid crystal display devices 101 to 107 were manufactured. Commercially available super high contrast product (HLC2-5618, manufactured by SANRITZ CORPORATION) was used as the upper polarizing plate 30 of the liquid crystal display device using perpendicularly oriented liquid crystal cell 31 (FIG. 1), and as the lower polarizing plate 32, polarizing plate 101 manufactured in Example 8 or any of polarizing plates 102 to 107 manufactured in Example 9 was stuck on VA mode cell 31 with an adhesive one by one on the viewer side and on the backlight side in a manner that any of cellulose acylate films 101 to 107 of the invention facing the liquid crystal cell side. The polarlizing plates were disposed in the crossed Nicols arrangement so that the transmission axis of the polarizing plate on the viewer side pointed to the up and down directions and the transmission axis of the polarizing plate on the backlight side pointed to the left and right directions.

Comparative Example 4

Manufacture of VA Mode Liquid Crystal Display Devices 201 and 202:

Liquid crystal display devices 201 and 202 were manufactured in the same manner as in Example 10, except for using polarizing plates 201 and 202 prepared in Comparative Example 3 as the lower polarizing plate 32.

Evaluation:

Contrast was measured with each of the liquid crystal display devices manufactured above as follows.

A white image and a black image were displayed on each of the obtained liquid crystal display devices, and a Y value, an x value and a y value in the XYZ color system were measured with a luminance meter (Ez-Contrast 160D, trade name, manufactured by ELDI). From the Y value in the white image (Yw) and the Y value in the black image (Yb), the contrast ratio was found as Yw/Yb. Measurement of contrast was performed from the omnidirection inclined in the range of 0 to 80° with the normal line of the display screen as basis, thus the contrast variation due to the visual angle was evaluated. Display unevenness was also visually observed.

As a result, it was found that VA mode liquid crystal display devices 101 to 107 using the polarizing plates including the cellulose acylate films of the invention showed high contrast, and little in display unevenness as compared with comparative liquid crystal display devices 201 and 202 and preferred.

Further, the occurrence of display unevenness was observed by keeping liquid crystal display devices 101 to 107 of the invention and comparative liquid crystal display devices 201 and 202 on for 1,000 hours in the atmosphere of 30° C. 80% RH. Liquid crystal display devices 101 to 107 of the invention did not generate display unevenness and showed good display property, contrary to this, white unevenness was generated in comparative liquid crystal display device 202.

The cellulose acylate film in the invention is high in retardation and also in Re/Rth ratio, so that useful as an optically compensatory sheet. The polarizing plate in the invention using this cellulose acylate film is successful in adding an optical compensatory function to the polarizing plate without increasing the number of constituents of the polarizing plate. Further, the liquid crystal display device in the invention manufactured by using these optical compensatory sheet and polarizing plate is high in display grade.

The entire disclosure of each and every foreign patent application from which the benefit of foreign priority has been claimed in the present application is incorporated herein by reference, as if fully set forth.

What is claimed is:

1. A cellulose acylate film that has a crystallization index expressed by expression (A) of from 0.75 to 0.95 and a modulus of elasticity in every arbitrary direction of an in-plane of the cellulose acylate film of from 3,800 MPa to 6,000 MPa, Crystallization index=(X-ray diffraction intensity at 2θ of 27°)/(X-ray diffraction intensity at 2θ of 25°),   (A)

wherein a viscosity average polymerization degree of the cellulose acylate is from 350 to 500, and a value of Mw/Mn of the cellulose acylate is 2.0 to 3.0 in which Mw is a mass average molecular weight of the cellulose acylate and Mn is a number average molecular weight of the cellulose acylate.

2. The cellulose acylate film according to claim 1, wherein the cellulose acylate is a cellulose acetate.

3. The cellulose acylate film according to claim 1, which comprises a retardation developer.

4. The cellulose acylate film according to claim 3, wherein the retardation developer is a compound represented by formula (1):

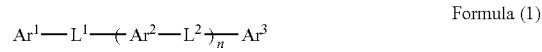

Formula (1)

wherein $Ar^1$, $Ar^2$ and $Ar^3$ each independently represents an aryl group or an aromatic heterocyclic ring;
$L^1$ and $L^2$ each independently represents a single bond or a divalent linking group; and
n represents an integer of 3 or more, and a plurality of $Ar^2$'s and a plurality of $L^2$'s each may be the same or different.

5. The cellulose acylate film according to claim 4, wherein the compound represented by formula (1) is a compound represented by formula (2):

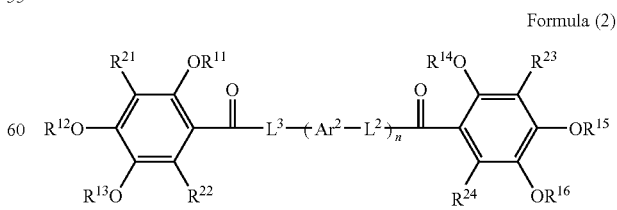

Formula (2)

wherein $R^{11}$, $R^{12}$, $R^{13}$, $R^{14}$, $R^{15}$, $R^{16}$, $R^{21}$, $R^{22}$, $R^{23}$ and $R^{24}$ each independently represents a hydrogen atom or a substituent;

Ar$^2$ represents an aryl group or an aromatic heterocyclic ring;

L$^2$ and L$^3$ each independently represents a single bond or a divalent linking group; and n represents an integer of 3 or more, and each of a plurality of Ar$^2$'s and a plurality of L$^2$'s may be the same or different.

6. The cellulose acylate film according to claim 3, wherein the retardation developer is at least one compound selected from compounds represented by any of formulae (I), (II), (III) and (IV):

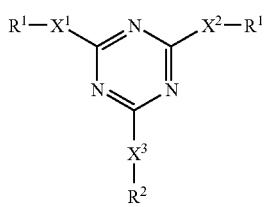

Formula (I)

wherein R$^1$ represents an aromatic ring having a substituent on at least one of ortho- and meta-positions, or a heterocyclic ring;

R$^2$ represents an aromatic ring having a substituent, or a heterocyclic ring, provided that when R$^1$ represents an aromatic ring having a substituent on at least one of ortho- and meta-positions and R$^2$ represents an aromatic ring having a substituent, R$^1$ and R$^2$ are not the same;

X$^1$ represents a single bond or —NR$^3$—;
X$^2$ represents a single bond or —NR$^4$—;
X$^3$ represents a single bond or —NR$^5$—; and
R$^3$, R$^4$ and R$^5$ each independently represents a hydrogen atom, a substituted or unsubstituted alkyl group, alkenyl group, aryl group or heterocyclic group;

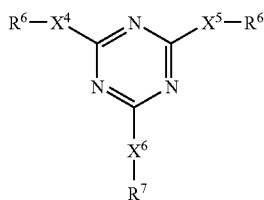

Formula (II)

wherein R$^6$ represents an aromatic ring having a substituent on para-position, or a heterocyclic ring;

R$^7$ represents an aromatic ring having a substituent, or a heterocyclic ring, provided that when R$^6$ represents an aromatic ring having a substituent on para-position and R$^7$ represents an aromatic ring having a substituent, R$^6$ and R$^7$ are not the same;

X$^4$ represents a single bond or —NR$^{13}$—;
X$^5$ represents a single bond or —NR$^{14}$—;
X$^6$ represents a single bond or —NR$^{15}$—; and
R$^{13}$, R$^{14}$ and R$^{15}$ each independently represents a hydrogen atom, a substituted or unsubstituted alkyl group, alkenyl group, aryl group or heterocyclic group;

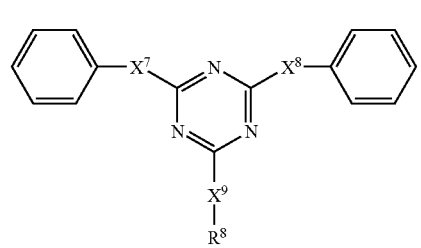

Formula (III)

wherein R$^8$ represents an aromatic ring having a substituent on at least one of ortho- and meta-positions, or a heterocyclic ring;

X$^7$ represents a single bond or —NR$^{23}$—;
X$^8$ represents a single bond or —NR$^{24}$—;
X$^9$ represents a single bond or —NR$^{25}$—; and
R$^{23}$, R$^{24}$ and R$^{25}$ each independently represents a hydrogen atom, a substituted or unsubstituted alkyl group, alkenyl group, aryl group or heterocyclic group;

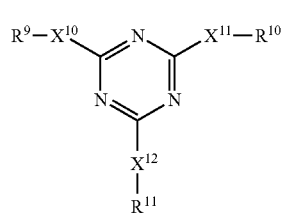

Formula (IV)

wherein R$^9$, R$^{10}$ and R$^{11}$ each independently represents a different aromatic ring or heterocyclic ring;

X$^{10}$ represents a single bond or —NR$^{33}$—;
X$^{11}$ represents a single bond or —NR$^{34}$—;
X$^{12}$ represents a single bond or —NR$^{35}$—; and
R$^{33}$, R$^{34}$ and R$^{35}$ each independently represents a hydrogen atom, a substituted or unsubstituted alkyl group, alkenyl group, aryl group or heterocyclic group.

7. The cellulose acylate film according to claim 1, wherein the cellulose acylate film has an in-plane retardation value (Re) of from 20 to 200 nm and a retardation value in a thickness direction (Rth) of from 70 to 400 nm.

8. The cellulose acylate film according to claim 1, wherein a difference between a maximum value and a minimum value of an orientation angle in an arbitrary 60 mm×60 mm square in the cellulose acylate film is from 0° to 0.40°.

9. An optically compensatory sheet comprising a cellulose acylate film according to claim 1.

10. The optically compensatory sheet according to claim 9, which further comprises an optically anisotropic layer directly or indirectly on the cellulose acylate film.

11. A polarizing plate comprising:
a polarizing film; and
at least two transparent protective films, wherein at least one transparent protective film is disposed on each side of the polarizing film,
wherein at least one of the at least two transparent protective films is an optically compensatory sheet according to claim 9.

12. A liquid crystal display device comprising:
a liquid crystal cell; and
at least two polarizing plates, wherein at least one polarizing plate is disposed on each side of the liquid crystal cell,
wherein at least one of the at least two polarizing plates is a polarizing plate according to claim 11.

13. The liquid crystal display device according to claim 12, wherein a display mode of the liquid crystal display device is a VA mode.

14. A manufacturing method of a cellulose acylate film comprising:
casting a dope on a support;
drying the dope on the support, so as to form a film;
peeling the film from the support; and
subjecting the film to a stretching treatment,
wherein a crystallization index expressed by expression (A) of the film after peeling and before stretching is from 0.75 to 0.95, Crystallization index=(X-ray diffraction intensity at $2\theta$ of $27°$)/(X-ray diffraction intensity at $2\theta$ of $25°$)     (A)

wherein a modulus of elasticity in every arbitrary direction of an in-plane of the cellulose acylate film is from 3,800 MPa to 6,000 MPa, wherein a viscosity average polymerization degree of the cellulose acylate is from 350 to 500, and a value of Mw/Mn of the cellulose acylate is 2.0 to 3.0, in which Mw is a mass average molecular weight of the cellulose acylate and Mn is a number average molecular weight of the cellulose acylate.

15. The manufacturing method of a cellulose acylate film according to claim 14,
wherein a content of a residual solvent in the film at a time of beginning of the stretching treatment expressed by following expression is from 1 to 40 mass %, Residual solvent content=(mass of residual solvent)/(mass of solids content).

16. A cellulose acylate film obtained by the manufacturing method according to claim 14.

* * * * *